US012244827B2

(12) United States Patent
Sugio et al.

(10) Patent No.: US 12,244,827 B2
(45) Date of Patent: Mar. 4, 2025

(54) MOVING PICTURE ENCODING METHOD, MOVING PICTURE DECODING METHOD, MOVING PICTURE ENCODING APPARATUS, AND MOVING PICTURE DECODING APPARATUS

(71) Applicant: Panasonic Intellectual Property Corporation of America, Torrance, CA (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 40 days.

(21) Appl. No.: 14/533,151

(22) Filed: Nov. 5, 2014

(65) Prior Publication Data
US 2015/0063446 A1 Mar. 5, 2015

Related U.S. Application Data

(63) Continuation of application No. PCT/JP2013/003687, filed on Jun. 12, 2013.
(Continued)

(51) Int. Cl.
*H04N 19/60* (2014.01)
*H04N 19/105* (2014.01)
(Continued)

(52) U.S. Cl.
CPC ........... *H04N 19/18* (2014.11); *H04N 19/105* (2014.11); *H04N 19/129* (2014.11); *H04N 19/13* (2014.11);
(Continued)

(58) Field of Classification Search
CPC ...... H04N 19/18; H04N 19/105; H04N 19/13; H04N 19/463; H04N 19/157; H04N 19/61;
(Continued)

(56) References Cited

U.S. PATENT DOCUMENTS 6,658,157 B1 * 12/2003 Satoh ................... H04N 19/146
375/E7.177
7,079,692 B2 * 7/2006 Lan ........................ H04N 19/18
375/E7.25
(Continued)

FOREIGN PATENT DOCUMENTS

GB 2492333 * 6/2011
JP 2000-250894 9/2000
(Continued)

OTHER PUBLICATIONS

Bross, B.; "High Efficiency Video Coding (HEVC) Text Specification Draft 7", Apr. 27-May 7, 2012 (Year: 2012).*
(Continued)

*Primary Examiner* — Philip P. Dang
(74) *Attorney, Agent, or Firm* — Wenderoth, Lind & Ponack, L.L.P.

(57) ABSTRACT

A moving picture encoding method for increasing coding efficiency includes: determining whether or not to apply orthogonal transformation, to calculate a value of an orthogonal transform skip flag; performing the orthogonal transformation on a prediction residual according to the value of the orthogonal transform skip flag, to calculate at least one orthogonal transform coefficient; performing quantization on at least the one orthogonal transform coefficient, to calculate at least one quantized coefficient; performing variable-length encoding on the orthogonal transform skip flag; and changing a scan order for at least the one quantized coefficient according to the value of the orthogonal trans-
(Continued)

form skip flag, and performing variable-length encoding on at least the one quantized coefficient in the scan order after the change.

1 Claim, 42 Drawing Sheets

Related U.S. Application Data

(60) Provisional application No. 61/659,054, filed on Jun. 13, 2012, provisional application No. 61/658,589, filed on Jun. 12, 2012.

(51) Int. Cl.
*H04N 19/129* (2014.01)
*H04N 19/13* (2014.01)
*H04N 19/157* (2014.01)
*H04N 19/18* (2014.01)
*H04N 19/463* (2014.01)
*H04N 19/61* (2014.01)
*H04N 19/124* (2014.01)
*H04N 19/176* (2014.01)

(52) U.S. Cl.
CPC ......... *H04N 19/157* (2014.11); *H04N 19/463* (2014.11); *H04N 19/61* (2014.11); *H04N 19/124* (2014.11); *H04N 19/176* (2014.11)

(58) Field of Classification Search
CPC ... H04N 19/129; H04N 19/176; H04N 19/124
See application file for complete search history.

(56) References Cited

U.S. PATENT DOCUMENTS

| | | | | |
|---|---|---|---|---|
| 7,200,275 | B2* | 4/2007 | Srinivasan | H04N 19/61 |
| | | | | 375/E7.199 |
| 7,289,673 | B2* | 10/2007 | Lin | H04N 19/196 |
| | | | | 375/E7.199 |
| 7,295,609 | B2* | 11/2007 | Sato | H04N 19/186 |
| | | | | 382/250 |
| 7,426,311 | B1* | 9/2008 | Chun | H04N 19/61 |
| | | | | 382/250 |
| 9,338,458 | B2* | 5/2016 | Chiu | H04N 19/129 |
| 2004/0234143 | A1* | 11/2004 | Hagai | H04N 19/51 |
| | | | | 375/E7.257 |
| 2005/0196062 | A1* | 9/2005 | Cho | H04N 19/86 |
| | | | | 382/238 |
| 2006/0088222 | A1* | 4/2006 | Han | H04N 19/635 |
| | | | | 382/232 |
| 2007/0030911 | A1* | 2/2007 | Yoon | H04N 19/132 |
| | | | | 375/E7.181 |
| 2008/0165849 | A1* | 7/2008 | Moriya | H04N 19/593 |
| | | | | 375/240.15 |
| 2008/0165861 | A1* | 7/2008 | Wen | H04N 19/176 |
| | | | | 375/E7.176 |
| 2009/0003441 | A1* | 1/2009 | Sekiguchi | H04N 19/436 |
| | | | | 375/240.13 |
| 2009/0034856 | A1* | 2/2009 | Moriya | H04N 19/147 |
| | | | | 382/238 |
| 2009/0123066 | A1* | 5/2009 | Moriya | H04N 19/174 |
| | | | | 382/166 |
| 2009/0207911 | A1* | 8/2009 | Minamoto | H04N 19/14 |
| | | | | 375/240.03 |
| 2010/0119169 | A1* | 5/2010 | Haddad | H04N 19/61 |
| | | | | 382/250 |
| 2011/0026583 | A1* | 2/2011 | Endresen | H04N 19/176 |
| | | | | 375/E7.127 |
| 2011/0047155 | A1* | 2/2011 | Sohn | H04N 19/134 |
| | | | | 707/E17.014 |
| 2011/0103485 | A1* | 5/2011 | Sato | H04N 19/109 |
| | | | | 375/E7.123 |
| 2011/0103486 | A1* | 5/2011 | Sato | H04N 19/46 |
| | | | | 375/E7.123 |
| 2011/0182362 | A1* | 7/2011 | Kim | H04N 19/61 |
| | | | | 375/240.16 |
| 2011/0249743 | A1* | 10/2011 | Zhao | H04N 19/176 |
| | | | | 375/240.24 |
| 2012/0082231 | A1* | 4/2012 | Rojals | H04N 19/91 |
| | | | | 375/240.18 |
| 2012/0114039 | A1* | 5/2012 | Wang | H04N 11/02 |
| | | | | 375/E7.243 |
| 2012/0127003 | A1* | 5/2012 | Shibahara | H04N 19/129 |
| | | | | 341/87 |
| 2012/0128066 | A1* | 5/2012 | Shibahara | H04N 19/129 |
| | | | | 375/240.03 |
| 2014/0056362 | A1* | 2/2014 | Mrak | H04N 19/61 |
| | | | | 375/240.18 |

FOREIGN PATENT DOCUMENTS

| | | |
|---|---|---|
| JP | 2007-020201 | 1/2007 |
| JP | 2009-027541 | 2/2009 |

OTHER PUBLICATIONS

Mrak, M.; "Transform Skip Mode", Jul. 14-22, 2011 (Year: 2011).*
Mrak, M.; "Results for SCC withTransform Skip Mode", Jul. 14-22, 2011 (Year: 2011).*
Gabriellini, A.; Spatial Transform Skip in the Emerging High Efficiency Video Coding Standard, ICIP 2012 (Year: 2012).*
H.264 Standard (Year: 2012).*
International Search Report issued Sep. 17, 2013 in International (PCT) Application No. PCT/JP2013/003687.
"Advanced video coding for generic audiovisual services", ITU-T Recommendation H. 264, Mar. 2010.
Marta Mrak et al., "Transform skip mode", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F077_r1.
Cuiling Lan et al., "Intra transform skipping,", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-I0408.
Dae-Yeon Kim et al., "Enhanced intra coding", ITU-Telecommunications Standardization Sector Study Group 16 Question 6 Video Coding Experts Group (VCEG) 34th Meeting: Antalya, Turkey, Jan. 12-13, 2008, VCEG-AH11.
Sakae Ohkabo et al., "H.264/AVC Textbook", Third Revision, First Edition, Impress R&D, pp. 24, Jan. 1, 2009, with partial English Translation.
Naccari et al., "CE5.a: Quantization for transform skipping", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0208_r1, version 3.

* cited by examiner

FIG. 29

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 40
| Corresponding standard | Driving frequency |
|---|---|
| MPEG-4 AVC | 500 MHz |
| MPEG-2 | 350 MHz |
| ⋮ | ⋮ |
FIG. 41A
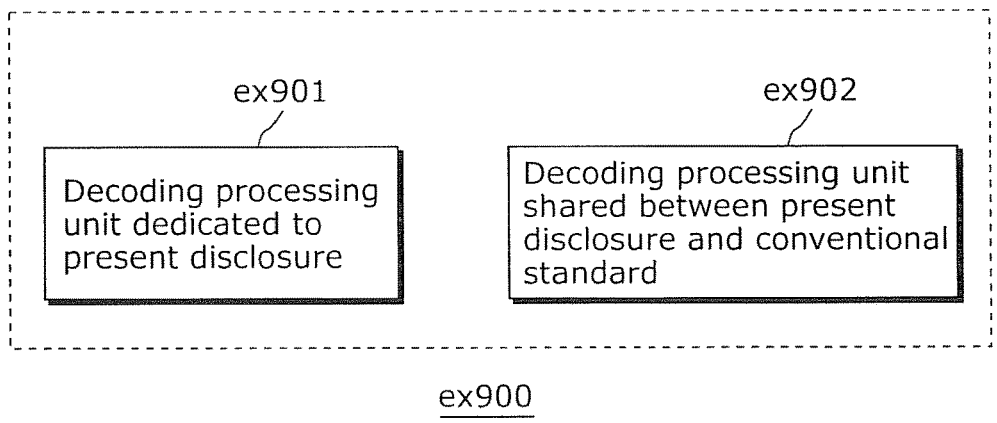
FIG. 41B
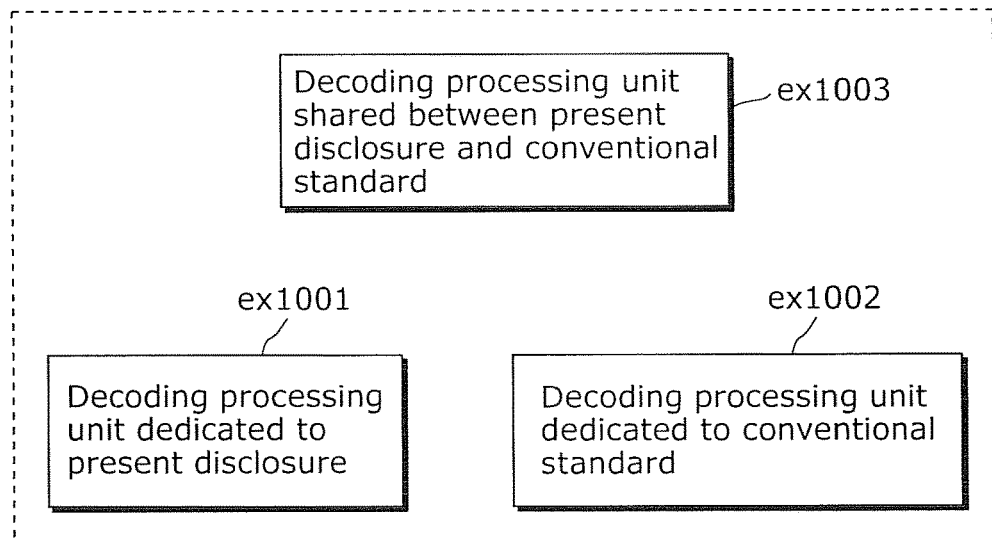

MOVING PICTURE ENCODING METHOD, MOVING PICTURE DECODING METHOD, MOVING PICTURE ENCODING APPARATUS, AND MOVING PICTURE DECODING APPARATUS

CROSS REFERENCE TO RELATED APPLICATIONS

This is a continuation application of PCT International Application No. PCT/JP2013/003687 filed on Jun. 12, 2013, designating the United States of America, which is based on and claims priority of US Provisional Patent Applications No. 61/658,589 filed on Jun. 12, 2012 and No. 61/659,054 filed on Jun. 13, 2012. The entire disclosures of the above-identified applications, including the specifications, drawings and claims are incorporated herein by reference in their entirety.

FIELD

The present disclosure relates to moving picture encoding methods, moving picture decoding methods, and the like.

BACKGROUND

In moving picture encoding processes, the quantity of information is generally reduced using redundancy of the moving pictures in spatial and temporal directions. Here, a method using the redundancy in the spatial direction is generally represented by the transformation into the frequency domain. A method using the redundancy in the temporal direction is represented by an inter-picture prediction (hereinafter referred to as inter prediction) encoding process. In the inter prediction encoding process, when encoding a certain picture, an encoded picture located, in display time order, before or after a current picture to be encoded is used as a reference picture. Subsequently, a motion vector is derived through motion estimation of the current picture with respect to the reference picture, and a difference is calculated between image data of the current picture and prediction image data resulting from motion compensation based on the motion vector, to remove the redundancy in the temporal direction. Here, in the motion estimation, values of difference between blocks within the reference picture and a current block to be encoded which is included in the current picture are calculated, and one of the blocks within the reference picture that has the smallest value of difference is defined as a reference block. Using the current block and the reference block, a motion vector is then estimated. In the intra prediction encoding process, when encoding a certain current block to be encoded, a pixel within an encoded block located around the current block is used as a reference pixel. Subsequently, a difference is calculated between image data of the current block and prediction image data calculated using the reference pixel, to remove the redundancy in the spatial direction. For such moving picture encoding methods, the moving picture encoding scheme called H. 264 has already been standardized (see ITU-T Recommendation H. 264 "Advanced video coding for generic audiovisual services," March 2010 (Non Patent Literature 1)).

CITATION LIST

Non Patent Literature

[Non Patent Literature 1] ITU-T Recommendation H. 264 "Advanced video coding for generic audiovisual services," March 2010

SUMMARY

Technical Problem

However, recent years have seen the development of high definition (4K×2K) broadcasts and content distribution, which requires improved coding efficiency higher than in the moving picture encoding scheme that has already been standardized.

Thus, one non-limiting and exemplary embodiment provides a moving picture encoding method and a moving picture decoding method that increase coding efficiency.

Solution to Problem

In one general aspect, the techniques disclosed here feature a moving picture encoding method for encoding a moving picture per block, which comprises: generating a prediction image of a current block to be encoded, using a reference block that is adjacent to the current block or included in a reference picture different from a current picture to be encoded, and generating a prediction residual which is a difference between the current block and the prediction image; determining whether or not to apply transformation to the prediction residual; performing the transformation on the prediction residual according to a result of the determining, to derive transform coefficients; performing quantization on the transform coefficients to derive quantized coefficients; encoding a transform skip flag indicating the result of the determining; and encoding the quantized coefficients either in a first scan order when the result of the determining indicates to apply the transformation or a second scan order when the result of the determining indicates not to apply the transformation, the second scan order being different from the first scan order.

These general and specific aspects may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Advantageous Effects

Coding efficiency can be increased with the moving picture encoding method and moving picture decoding method according to the present disclosure.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 29 illustrates a structure of multiplexed data.

FIG. 40 shows an example of a look-up table in which video data standards are associated with driving frequencies.

FIG. 41A shows an example of a configuration for sharing a module of a signal processing unit.

FIG. 41B shows another example of a configuration for sharing a module of the signal processing unit.

Figure 1:
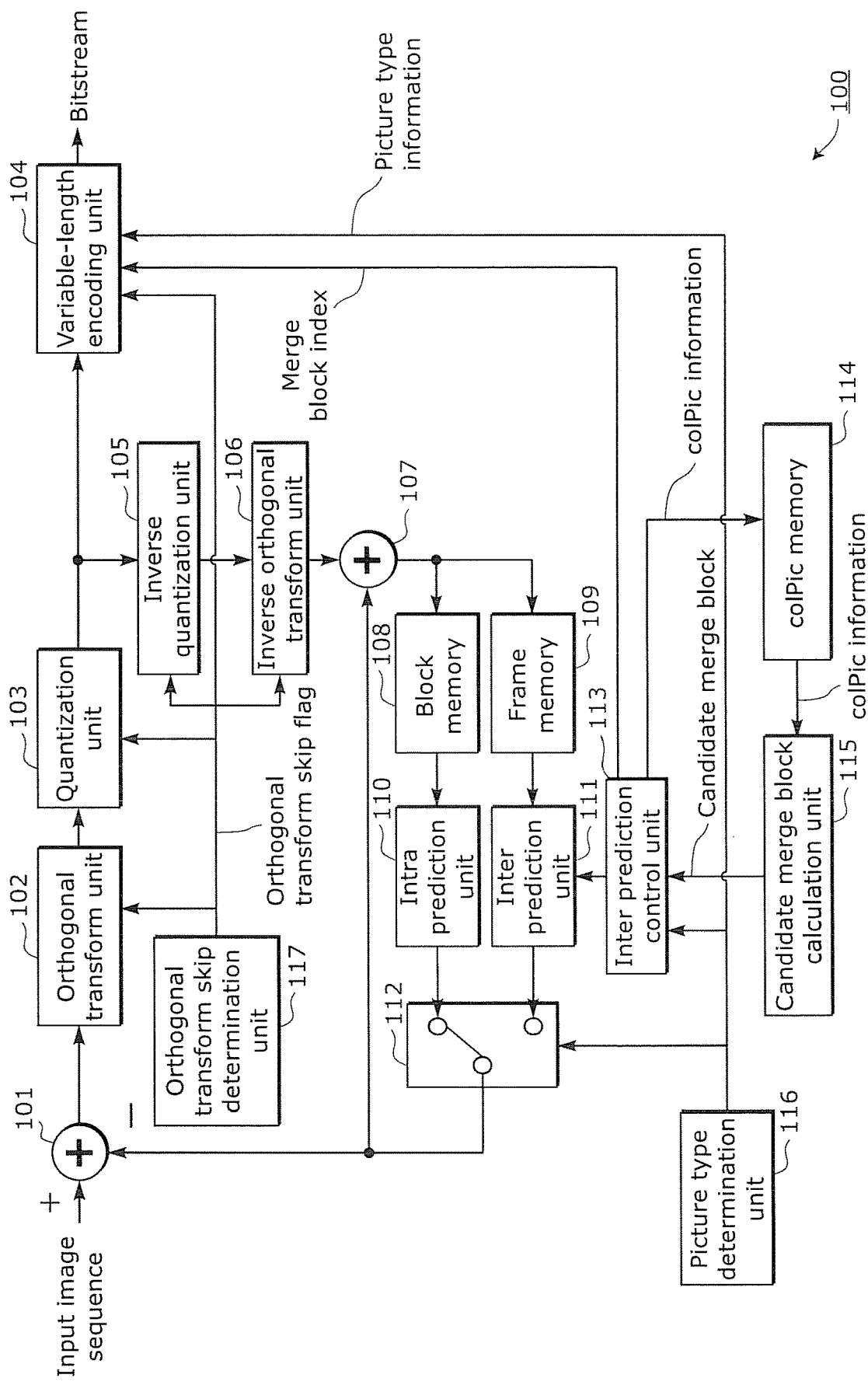
FIG. 1 is a block diagram illustrating a structure of a moving picture encoding apparatus that uses a moving picture encoding method according to Embodiment 1.

DESCRIPTION OF EMBODIMENTS (Underlying Knowledge Forming Basis of the Present Disclosure)

In the moving picture encoding scheme called H. 264, which has already been standardized, three types of pictures: I-picture, P-picture, and B-picture, are used to reduce the quantity of information. The I-picture is a picture on which no inter prediction encoding process is performed, that is, on which only an intra-picture prediction (hereinafter referred to as intra prediction) encoding process is performed. The P-picture is a picture on which the inter prediction encoding process is performed with reference to only one encoded picture located before or after the current picture in display time order. The B-picture is a picture on which the inter prediction encoding process is performed with reference to two encoded pictures located before or after the current picture in display time order.

In the intra prediction encoding process, when encoding a certain current block to be encoded, a pixel within an encoded block located around the current block is used as a reference pixel. Subsequently, a difference is calculated between image data of the current block and prediction image data calculated using the reference pixel, to remove the redundancy in the spatial direction. An orthogonal transformation is then performed on the calculated value of difference so that signals are gathered in a particular frequency component, followed by quantization which deletes unnecessary components. By doing so, coding efficiency increases.

However, there is a problem in that the quantization after the orthogonal transformation may lead to a decrease in coding efficiency depending on the calculated value of difference (prediction residual). Thus, one or more exemplary embodiments or features disclosed herein provide a moving picture encoding method in which a mode in which no orthogonal transformation is performed but the quantization is performed is selectable.

Specifically, a moving picture encoding method according to an aspect of the present disclosure is a moving picture encoding method for encoding a moving picture per block, which includes: generating a prediction image of a current block to be encoded, using a reference block that is adjacent to the current block or included in a reference picture different from a current picture to be encoded, and generating a prediction residual which is a difference between the current block and the prediction image; determining whether or not to apply orthogonal transformation to the prediction residual, to calculate a value of an orthogonal transform skip flag; performing the orthogonal transformation on the prediction residual according to the value of the orthogonal transform skip flag, to calculate at least one orthogonal transform coefficient; performing quantization on the at least one orthogonal transform coefficient, to calculate at least one quantized coefficient; performing variable-length encoding on the orthogonal transform skip flag; and changing a scan order for the at least one quantized coefficient according to the value of the orthogonal transform skip flag, and performing variable-length encoding on the at least one quantized coefficient in the scan order after the change.

By doing so, the orthogonal transformation is performed according to a value of the orthogonal transform skip flag, meaning that switching between applying and not applying the orthogonal transformation can be performed, and furthermore, the scan order for the quantized coefficients is changed according to a value of the orthogonal transform skip flag so that appropriate variable-length encoding can be performed on the quantized coefficient. As a result, coding efficiency can be increased.

Furthermore, it may be that in the determining, the value of the orthogonal transform skip flag is calculated to be 1 when the orthogonal transformation is determined to be applied to the prediction residual, and in the changing of a scan order, the scan order is changed to a sequential order along a horizontal direction when the orthogonal transform skip flag has a value of 1 and the prediction image is generated by intra prediction in a horizontal prediction direction.

Furthermore, it may be that in the determining, the value of the orthogonal transform skip flag is calculated to be 1 when the orthogonal transformation is determined to be not applied to the prediction residual, and in the changing of a scan order, the scan order is changed to a sequential order along a vertical direction when the orthogonal transform skip flag has a value of 1 and the prediction image is generated by intra prediction in a vertical prediction direction.

Furthermore, it may be that in the performing of the orthogonal transformation, the orthogonal transformation is not performed when the orthogonal transform skip flag has a value of 1.

Furthermore, in the performing of variable-length encoding on the orthogonal transform skip flag, the variable-length encoding may be performed on the orthogonal transform skip flag only when the prediction image is generated by intra prediction and the orthogonal transformation is on a 4 by 4 size basis.

Furthermore, in the performing of quantization, the at least one transform coefficient may be quantized according to the value of the orthogonal transform skip flag.

Furthermore, it may be that in the determining, the value of the orthogonal transform skip flag is calculated to be 1 when the orthogonal transformation is determined to be not applied to the prediction residual, and in the performing of quantization, the at least one orthogonal transform coefficient is quantized without use of a quantization matrix.

Furthermore, a moving picture decoding method according to an aspect of the present disclosure is a moving picture decoding method for decoding a moving picture in an encoded bitstream per block, which includes: performing variable-length decoding on an orthogonal transform skip flag indicating whether or not to apply inverse orthogonal transformation to a current block to be decoded; changing a scan order for at least one quantized coefficient included in the current block, according to a value of the orthogonal transform skip flag, and performing variable-length decoding on the at least one quantized coefficient in the scan order after the change; performing inverse quantization on the at least one quantized coefficient after the variable-length decoding, to calculate at least one inverse quantized coefficient; performing inverse orthogonal transformation on the at least one inverse quantized coefficient according to the value of the orthogonal transform skip flag, to calculate a prediction residual of the current block; and generating a prediction image of the current block using a reference block that is adjacent to the current block or included in a reference picture different from a current picture to be decoded, and generating a reconstructed image by adding up the prediction residual and the prediction image.

By doing so, the inverse orthogonal transformation is performed according to a value of the orthogonal transform skip flag, meaning that switching between applying and not applying the inverse orthogonal transformation can be performed, and furthermore, the scan order for the quantized coefficients is changed according to a value of the orthogonal transform skip flag so that appropriate variable-length decoding can be performed on the quantized coefficient. As a result, it is possible to appropriately decode a bitstream of encoded moving pictures with increased coding efficiency.

Furthermore, in the changing of a scan order, the scan order may be changed to a sequential order along a horizontal direction when the orthogonal transform skip flag has a value of 1 and the prediction image is generated by intra prediction in a horizontal prediction direction.

Furthermore, in the changing of a scan order, the scan order may be changed to a sequential order along a vertical direction when the orthogonal transform skip flag has a value of 1 and the prediction image is generated by intra prediction in a vertical prediction direction.

Furthermore, it may be that in the performing of inverse orthogonal transformation, the inverse orthogonal transformation is not performed when the orthogonal transform skip flag has a value of 1.

Furthermore, in the performing of variable-length decoding on an orthogonal transform skip flag, the variable-length decoding may be performed on the orthogonal transform skip flag only when the prediction image is generated by intra prediction and the inverse orthogonal transformation is on a 4 by 4 size basis.

Furthermore, in the performing of inverse quantization, the at least one quantized coefficient after the variable-length decoding may be inversely quantized according to the value of the orthogonal transform skip flag.

Furthermore, in the performing of inverse quantization, the at least one quantized coefficient may be inversely quantized without use of a quantization matrix when the orthogonal transform skip flag has a value of 1.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims indicating the broadest concept are described as arbitrary structural elements. In addition, the wording "coding" in the following descriptions may have the same meaning of "encoding."

Embodiment 1

FIG. 1 is a block diagram illustrating a structure of a moving picture encoding apparatus that uses a moving picture encoding method according to this embodiment.

A moving picture encoding apparatus 100 includes, as illustrated in FIG. 1, an orthogonal transform skip determination unit 117, a subtractor 101, an orthogonal transform unit 102, a quantization unit 103, an inverse quantization unit 105, an inverse orthogonal transform unit 106, an adder 107, a block memory 108, a frame memory 109, an intra prediction unit 110, an inter prediction unit 111, a switch 112, an inter prediction control unit 113, a picture type determination unit 116, a candidate merge block calculation unit 115, a colPic memory 114, and a variable-length encoding unit 104.

The subtractor 101 generates a prediction residual by subtracting a prediction image from an input image included in an input image sequence.

The orthogonal transform skip determination unit 117 determines, in the hereinafter-described manner, whether or not an orthogonal transformation is to be applied to a prediction residual calculated using a current block to be encoded, and when the orthogonal transformation is to be applied, sets an orthogonal transform skip flag to 0, while, when the orthogonal transformation is not to be applied, sets the orthogonal transform skip flag to 1.

The orthogonal transform unit 102 transforms the prediction residual from an image domain to a frequency domain according to a value of the orthogonal transform skip flag. The quantization unit 103 performs, according to the value of the orthogonal transform skip flag, a quantization process on coefficient data which is a prediction residual resulting from the transformation to the frequency domain. The inverse quantization unit 105 performs, according to the value of the orthogonal transform skip flag, an inverse quantization process on coefficient data resulting from the quantization process performed by the quantization unit 103. The inverse orthogonal transform unit 106 generates a decoded prediction residual by transforming, from the frequency domain to the image domain, coefficient data resulting from the inverse quantization process, according to the value of the orthogonal transform skip flag. The adder 107 generates a reconstructed image by adding the prediction image to the decoded prediction residual.

The block memory 108 stores the reconstructed image as a reference image per block. The frame memory 109 stores the reconstructed image as a reference image per frame. The picture type determination unit 116 determines into which one of the picture types including I-picture, B-picture, and P-picture, the input image is to be encoded, and generates picture type information. The intra prediction unit 110 performs intra prediction on the current block using the per-block reference image stored in the block memory 108, thereby generating a prediction image. The inter prediction unit 111 performs inter prediction on the current block using the per-frame reference image stored in the frame memory 109 and a motion vector derived through motion estimation or the like, thereby generating a prediction image.

The switch 112 switches, based on the picture type information generated by the picture type determination unit 116, the prediction image that is to be output to the subtractor 101 and the adder 107, between the prediction image generated by the intra prediction unit 110 and the prediction image generated by the inter prediction unit 111.

The candidate merge block calculation unit 115 derives a candidate merge block in a merge mode and a skip mode by using an adjacent block of the current block and colPic information, such as a motion vector of a co-located block, stored in the colPic memory 114, and calculates a size of a list of candidate merge blocks. Furthermore, the candidate merge block calculation unit 115 assigns a value of a merge block index to the derived candidate merge block. The candidate merge block calculation unit 115 then sends the candidate merge bock and the merge block index to the inter prediction control unit 113.

The inter prediction control unit 113 controls whether or not the current block is to be encoded in the merge mode or a motion vector encoding mode in which a motion vector derived through motion estimation is used. Furthermore, the inter prediction control unit 113 transfers colPic information including a motion vector of the current block to the colPic memory 114.

The variable-length encoding unit 104 performs, in the hereinafter-described manner, a variable-length encoding process on the orthogonal transform skip flag and the coefficient data resulting from the quantization process, thereby generating a bitstream. Furthermore, the variable-length encoding unit 104 performs variable-length encoding on the picture type information. Moreover, the variable-length encoding unit 104 assigns, to the merge block index that is to be used in encoding, a bit sequence that corresponds to a size of the list of the candidate merge blocks, and performs variable-length encoding on that bit sequence.

Figure 2:
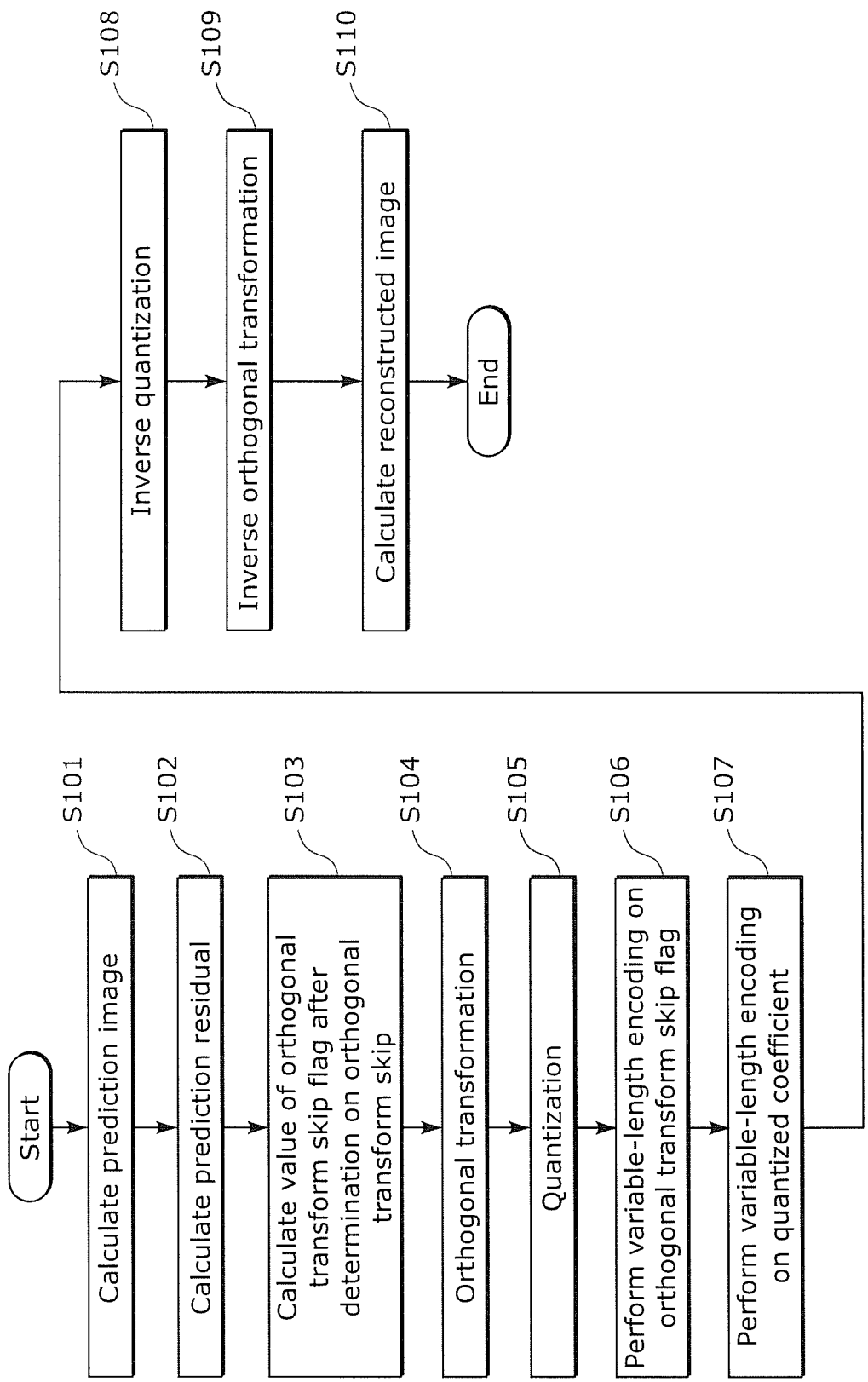
FIG. 2 is a flowchart illustrating an outline process of a moving picture encoding method according to Embodiment 1.

FIG. 2 is a flowchart illustrating an outline process of a moving picture encoding method according to this embodiment.

In Step S101, a prediction image of the current block is calculated. For example, in the case of encoding the current block in an intra prediction mode, a prediction image is generated using a reference pixel adjacent to the current block. In the case of an inter prediction mode, a prediction image is generated using a value of a pixel in a reference block that is specified through motion estimation or the like and is located inside a reference picture that is an encoded picture different from a current picture to be encoded.

In Step S102, a prediction residual (prediction difference) is calculated by calculating a difference between the current block and the prediction image calculated in Step S101. In Step S103, whether or not to apply the orthogonal transformation to the prediction residual is determined, and a value of the orthogonal transform skip flag is calculated, in the hereinafter-described manner.

In Step S104, the orthogonal transform process is performed in the hereinafter-described manner, with the result that the above-mentioned coefficient data that includes an orthogonal transform coefficient is calculated. In Step S105, whether or not to perform quantization using a quantization matrix is determined according to the value of orthogonal transform skip flag, and when the quantization is determined to be performed, the quantization process using the quantization matrix is performed in the hereinafter-described manner, with the result that quantized coefficient data including a quantized coefficient is calculated. In Step S106, variable-length encoding is performed on the orthogonal transform skip flag in the hereinafter-described manner. In Step S107, variable-length encoding is performed on the quantized coefficient.

In Step S108, the inverse quantization process is performed on the quantized coefficient in the hereinafter-described manner, with the result that coefficient data including an inverse quantized coefficient is calculated. In Step S109, the inverse orthogonal transform process is applied to the inverse quantized coefficient according to the orthogonal transform skip flag in the hereinafter-described manner, with the result that the above-mentioned decoded prediction residual that includes an inverse orthogonal transform coefficient is calculated. In Step S110, the prediction image calculated in Step S101 and the decoded prediction residual including the inverse orthogonal transform coefficient calculated in Step S109 are added up, with the result that a reconstructed image is calculated.

Figure 3:
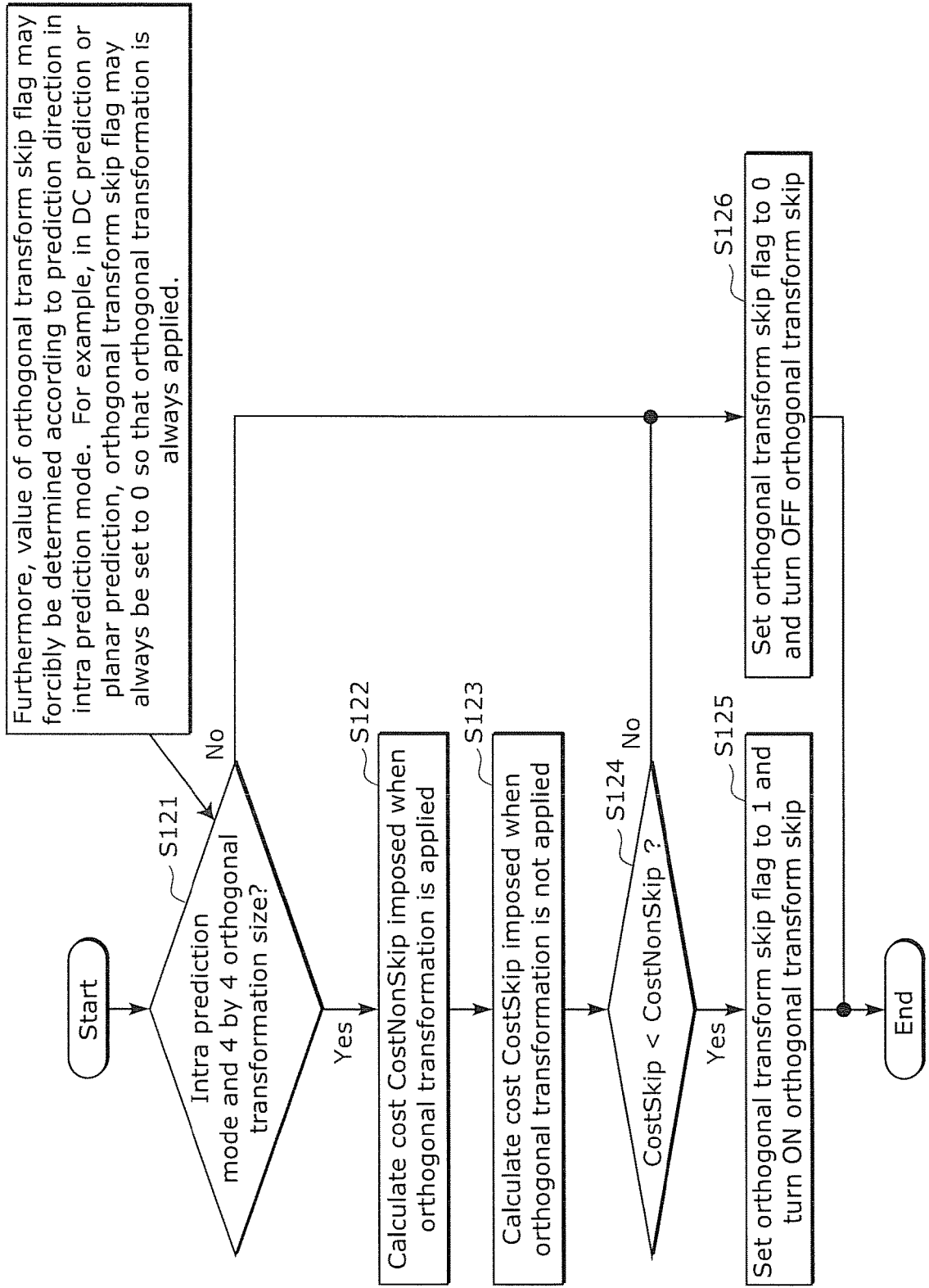
FIG. 3 is a flowchart illustrating a detailed process of Step S103 of FIG. 2 according to Embodiment 1.

FIG. 3 is a flowchart illustrating a detailed process of Step S103 of FIG. 2. Specifically, this FIG. 3 is a flowchart illustrating an example of a process in which whether or not to apply the orthogonal transformation to the prediction residual of the current block is determined and a value of the orthogonal transform skip flag is calculated. The following explains FIG. 3.

In Step S121, whether or not the intra prediction mode is used for the current block and an orthogonal transformation size is 4 by 4 is determined, and when this is true (Yes), a cost for encoding with the orthogonal transformation on the prediction residual, denoted by CostNonSkip, is calculated in Step S122. Subsequently, a cost for encoding without the orthogonal transformation on the prediction residual, denoted by CostSkip, is calculated in Step S123. Here, the cost is calculated with the following Equation 1 in R-D optimization model, for example.

$$\text{Cost} = D + \lambda R \qquad \text{(Equation 1)}$$

In Equation 1, D represents coding distortion. For example, a sum of absolute values of differences between pixel values obtained by encoding and decoding the current block using the prediction image generated in a certain intra prediction mode and original pixel values of the current block is used as D. In the equation, R represents a generated coding load. A coding load necessary to encode a flag in the intra prediction mode used to generate the prediction image, the quantized coefficient, and the like is used as R. In the equation, $\lambda$ represents an undetermined multiplier in the Lagrange method.

In Step S124, whether or not a value of CostSkip is smaller than a value of CostNonSkip is determined, and when this is true (Yes), the orthogonal transform skip flag is set to 1 (ON) in Step S125, meaning that the orthogonal transformation is determined to be not applied to the prediction residual. Meanwhile, when the result of the determining in Step S121 or Step S124 is false (No), the orthogonal transform skip flag is set to 0 (OFF) in Step S126, meaning that the orthogonal transformation is determined to be applied to the prediction residual.

Thus, in the case of a certain prediction mode or a certain orthogonal transformation size, the cost imposed when the orthogonal transformation is applied and the cost imposed when the orthogonal transformation is not applied are compared, and when the cost imposed when the orthogonal transformation is not applied is smaller than the cost imposed when the orthogonal transformation is applied, the orthogonal transform skip flag is set to 1 so that the orthogonal transformation is not applied. By doing so, coding efficiency can increase.

It should be noted that although whether or not to apply the orthogonal transformation is determined only in the case where Step S121 shows the intra prediction mode and the 4 by 4 orthogonal transformation size in this embodiment, this is not the only example. For example, whether or not to apply the orthogonal transformation may be determined in the case of the inter prediction mode as well. Likewise, whether or not to apply the orthogonal transformation may be determined also in the case where the orthogonal transformation size is larger than 4 by 4. This allows a further increase in coding efficiency. Furthermore, a value of the orthogonal transform skip flag may forcibly be determined based on a prediction direction in the intra or inter prediction or the like. For example, in the case of direct-current (DC) or planar prediction in the intra prediction mode, the orthogonal transform skip flag may always be set to 0 so that the orthogonal transformation is always applied. By doing so, it is possible to increase coding efficiency while reducing a processing load for cost calculation for the determination and so on.

Figure 4:
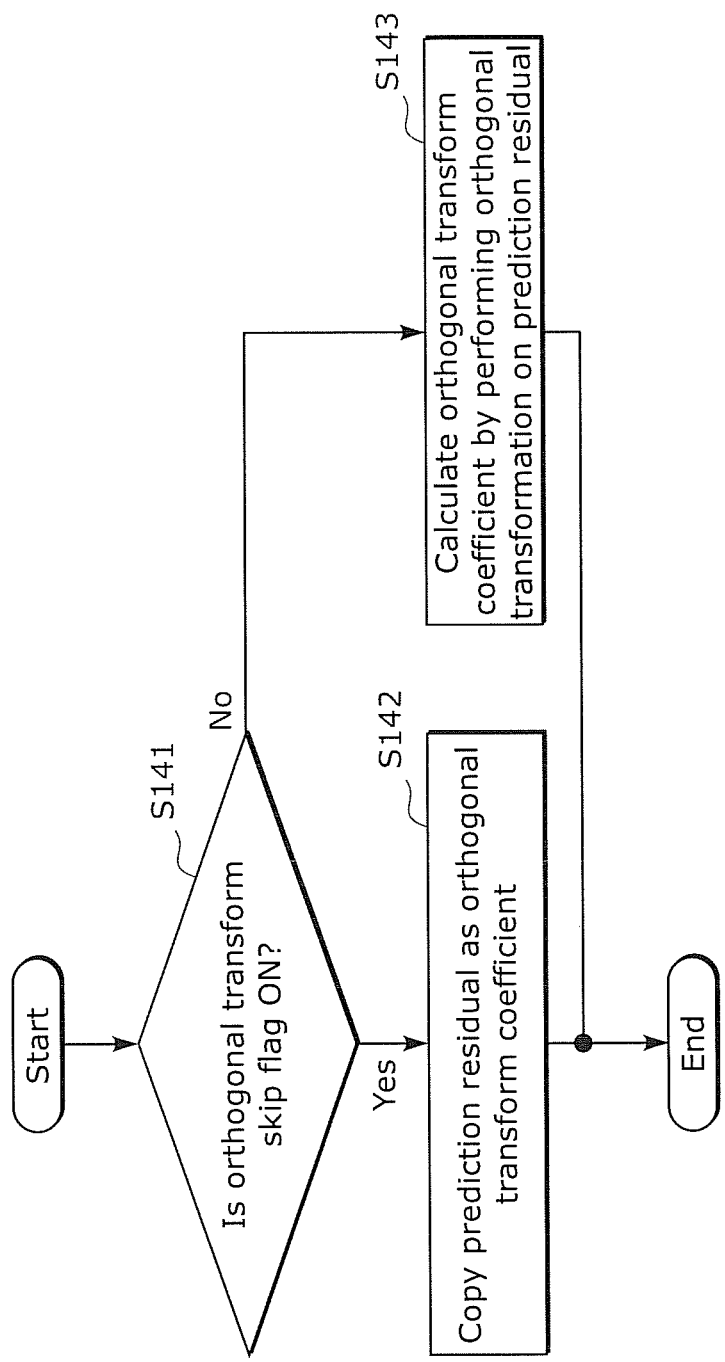
FIG. 4 is a flowchart illustrating a detailed process of Step S104 of FIG. 2 according to Embodiment 1.

FIG. 4 is a flowchart illustrating a detailed process of Step S104 of FIG. 2. Specifically, FIG. 4 is a flowchart illustrating a method of calculating an orthogonal transform coefficient according to a value of the orthogonal transform skip flag. The following explains FIG. 4.

In Step S141, whether or not the orthogonal transform skip flag is ON, that is, this flag has a value of 1, is determined, and when this is true (Yes), a prediction residual is copied as the orthogonal transform coefficient in Step S142 so that the orthogonal transform coefficient is calculated without application of the orthogonal transformation. Meanwhile, when the result of the determining in Step S141 is false (No), the orthogonal transformation is applied to the prediction residual to calculate the orthogonal transform coefficient in Step S143.

Thus, when the orthogonal transform skip flag is 1, the prediction residual is directly copied as the orthogonal transform coefficient, with the result that the orthogonal transform coefficient can be calculated without application of the orthogonal transformation. It should be noted that although the prediction residual is copied as the orthogonal transform coefficient to calculate the orthogonal transform coefficient without application of the orthogonal transformation in Step S142 in this embodiment, this is not necessarily the only example; any method is possible as long as it is a method of calculating the orthogonal transform coefficient without applying the orthogonal transformation to the prediction residual.

Figure 5:
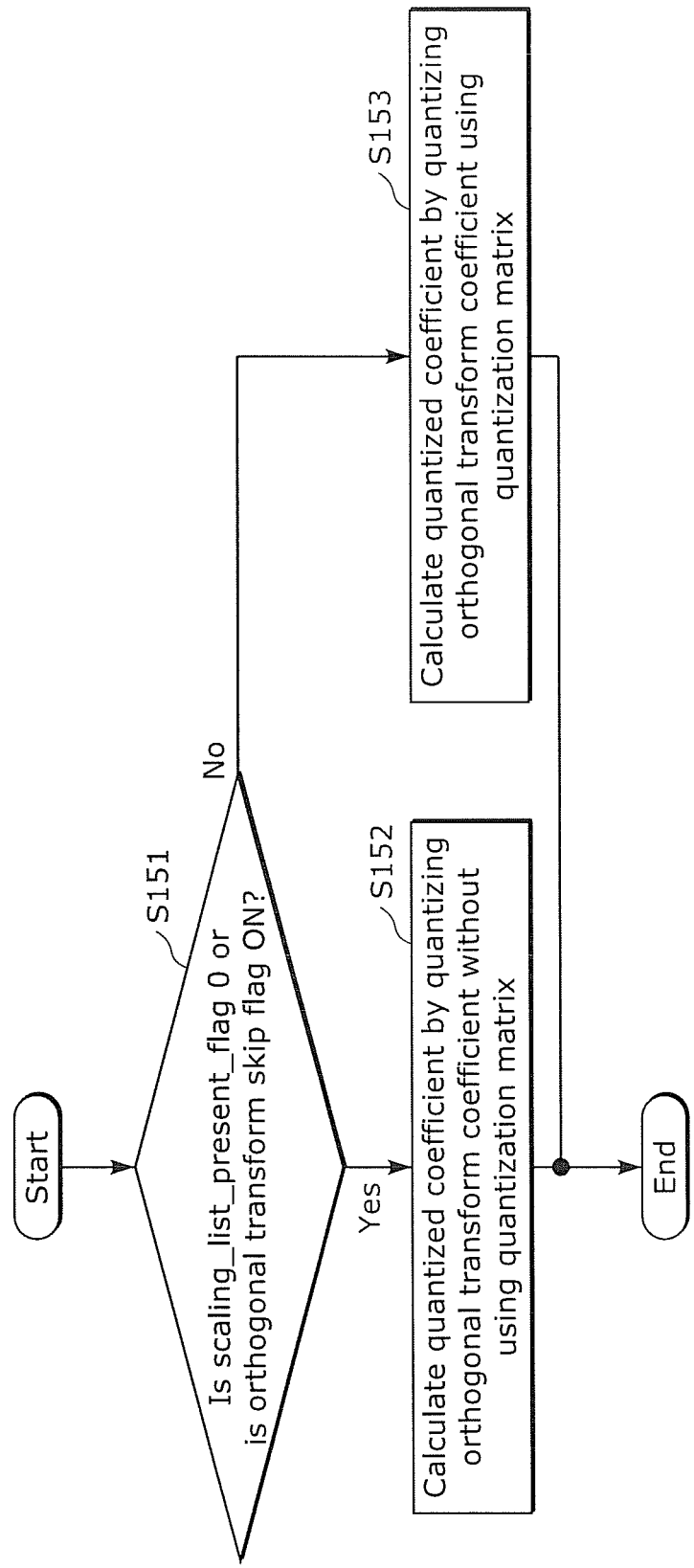
FIG. 5 is a flowchart illustrating a detailed process of Step S105 of FIG. 2 according to Embodiment 1.

FIG. 5 is a flowchart illustrating a detailed process of Step S105 of FIG. 2. Specifically, FIG. 5 is a flowchart illustrating a method of calculating a quantized coefficient according to a value of the orthogonal transform skip flag. The following explains FIG. 5.

In Step S151, whether or not scaling_list_present_flag is 0 or whether or not the orthogonal transform skip flag is ON, that is, this flag has a value of 1, is determined. When the result of this determination is true (Yes in Step S151), the quantization process is performed on the orthogonal transform coefficient without the use of the quantization matrix, with the result that a quantized coefficient is calculated in Step S152.

Here, scaling_list_present_flag is a flag indicating whether or not to use the quantization matrix in performing the quantization process, and is added to the bitstream as header information of a sequence parameter set (SPS), a picture parameter set (PPS), an adaption parameter set (APS), a slice header, and the like. When scaling_list_present_flag has a value of 1, this indicates that the quantization matrix is used in performing the quantization process. In this embodiment, an example has been described in which scaling_list_present_flag is used to determine whether or not to use the quantization matrix in performing the quantization process. However, this is not necessarily the only example; any flag or parameter included in the SPS, PPS, APS, slice header, or the like may be used as long as it indicates whether or not to use the quantization matrix in performing the quantization.

When the result of the determining in Step S151 is false (No), that is, when scaling_list_present_flag has a value of 1 and the orthogonal transform skip flag has a value of 0, the quantization process is performed on the orthogonal transform coefficient with the use of the quantization matrix, with the result that a quantized coefficient is calculated in Step S153.

Thus, when scaling_list_present_flag has a value of 0 or the orthogonal transform skip flag has a value of 1, the orthogonal transform coefficient is quantized without the use of the quantization matrix, with the result that a quantized coefficient is calculated. By doing so, it is possible to control the operation so that the quantization matrix is not applied when the orthogonal transformation is not applied. The quantization matrix is a parameter that is used to perform, after the orthogonal transformation, the quantization during which important frequency components are maintained while unnecessary frequency components are reduced. The use of the quantization matrix after the orthogonal transformation can efficiently increase coding efficiency. Therefore, the operation is controlled so that the quantization matrix is applied only when the orthogonal transform skip flag has a value of 0, that is, when the orthogonal transformation is applied, while, the quantization matrix is not applied when the orthogonal transform skip flag has a value of 1, that is, when the orthogonal transformation is not applied. This makes it possible to appropriately apply the quantization matrix, thereby allowing an increase in coding efficiency.

Figure 6:
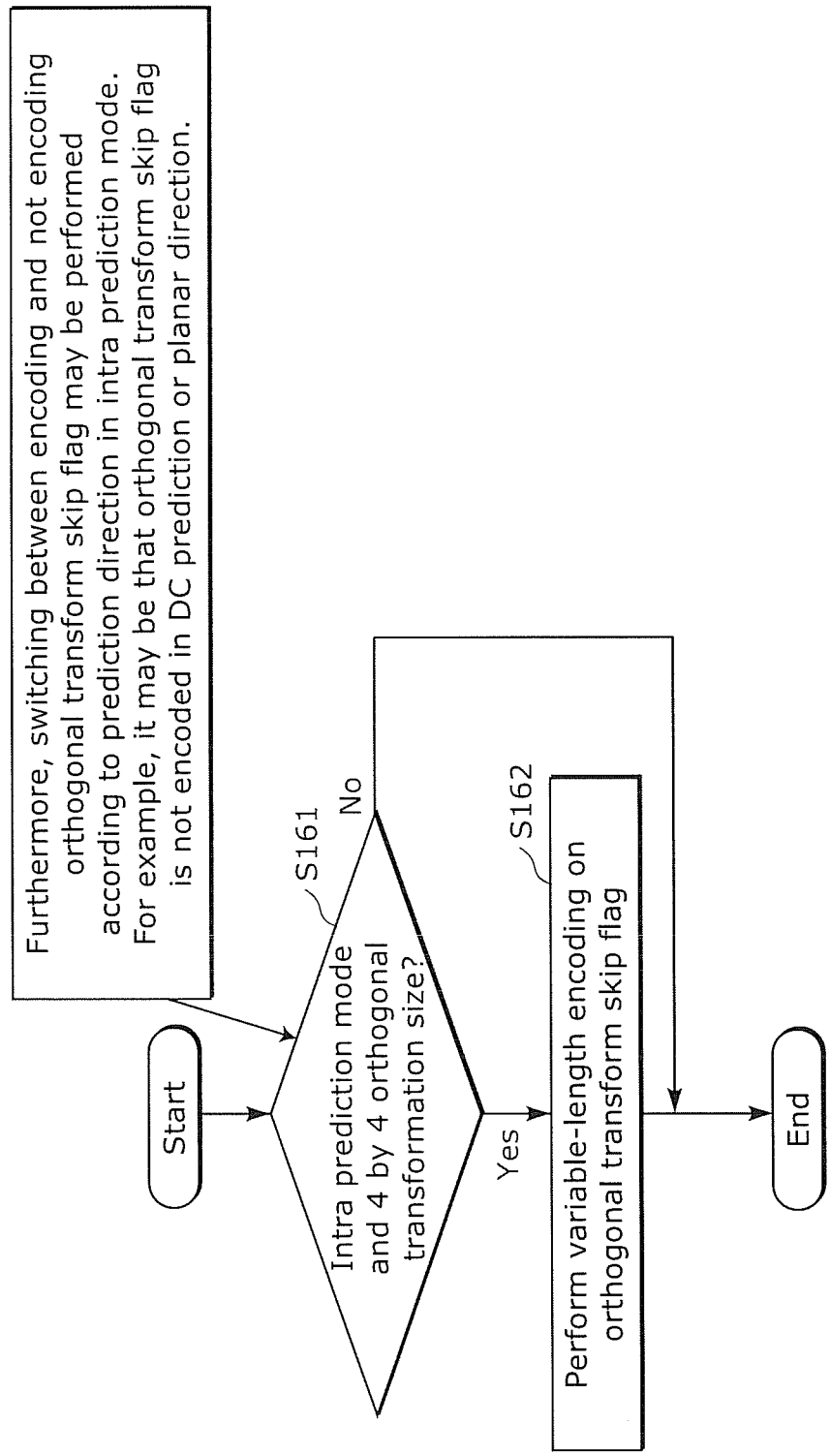
FIG. 6 is a flowchart illustrating a detailed process of Step S106 of FIG. 2 according to Embodiment 1.

FIG. 6 is a flowchart illustrating a detailed process of Step S106 of FIG. 2. Specifically, FIG. 6 is a flowchart illustrating a method of performing variable-length encoding on the orthogonal transform skip flag. The following explains FIG. 6.

In Step S161, whether or not the intra prediction mode is used for the current block and the orthogonal transformation size is 4 by 4 is determined. When the result of this determination is true (Yes in S161), the variable-length encoding is performed on the orthogonal transform skip flag and the resultant orthogonal transform skip flag is added to the bitstream in Step S162.

Thus, the variable-length encoding is performed on the orthogonal transform skip flag only in the case of a certain prediction mode or a certain orthogonal transformation size in synchronization with the condition in Step S121 of FIG. 3, with the result that the coding efficiency can increase. It should be noted that although the orthogonal transform skip flag is encoded only in the case where Step S161 shows the intra prediction mode and the 4 by 4 orthogonal transformation size in this embodiment, this is not the only example. For example, the orthogonal transform skip flag may be encoded in the case of the inter prediction mode as well. Likewise, the orthogonal transform skip flag may be encoded also in the case where the orthogonal transformation size is larger than 4 by 4. This allows a further increase in coding efficiency. Furthermore, switching between encoding and not encoding the orthogonal transform skip flag may be performed based on a prediction direction in the intra or inter prediction or the like. For example, it may be set that the orthogonal transform skip flag is not encoded in the case of DC or planar prediction in the intra prediction mode. By doing so, it is possible to increase coding efficiency while reducing overhead in the header information.

Figure 7:
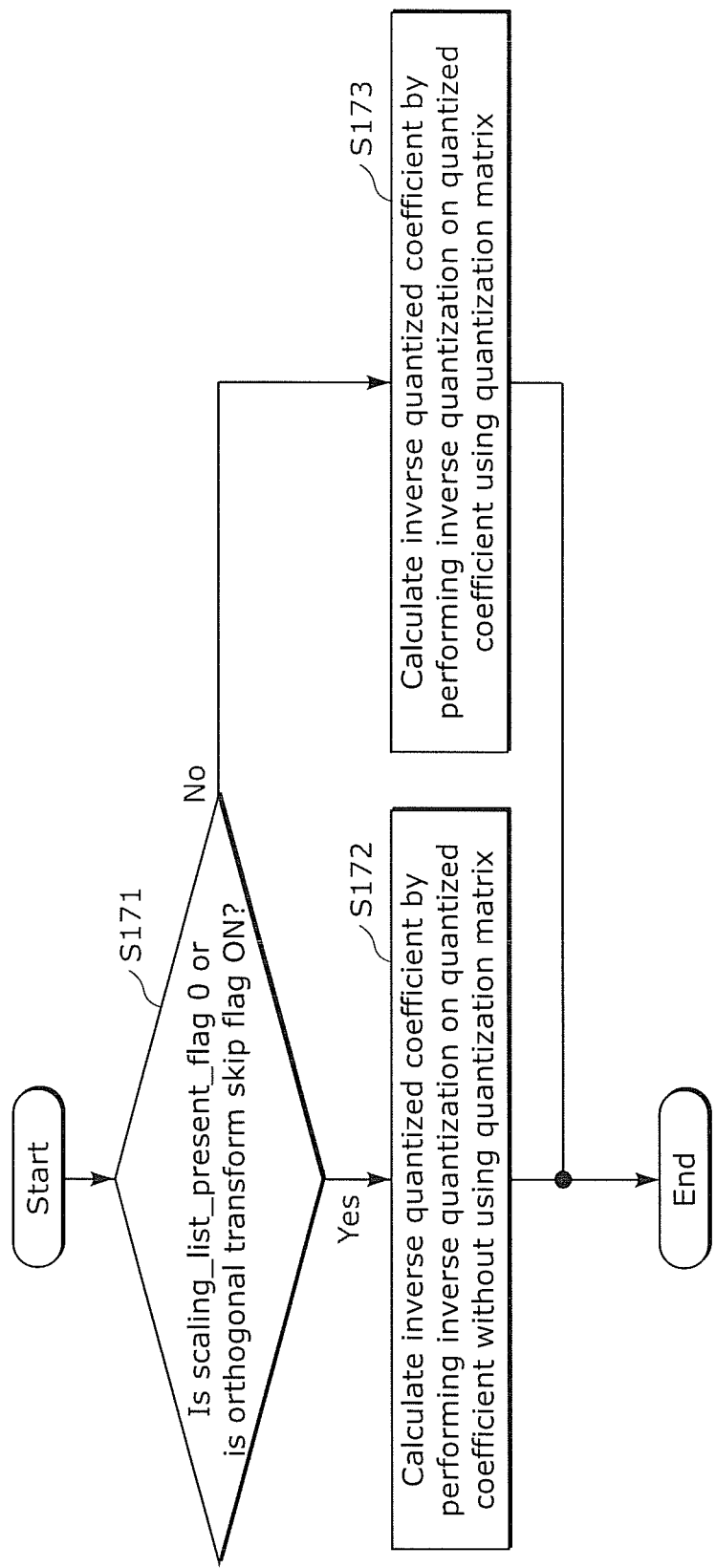
FIG. 7 is a flowchart illustrating a detailed process of Step S108 of FIG. 2 according to Embodiment 1.

FIG. 7 is a flowchart illustrating a detailed process of Step S108 of FIG. 2. Specifically, FIG. 7 is a flowchart illustrating a method of calculating an inverse quantized coefficient according to a value of the orthogonal transform skip flag. The following explains FIG. 12.

In Step S171, whether or not scaling_list_present_flag is 0 or whether or not the orthogonal transform skip flag is ON, that is, this flag has a value of 1, is determined. When the result of this determination is true (Yes in Step S171), the inverse quantization process is performed on the quantized coefficient without the use of the quantization matrix, with the result that an inverse quantized coefficient is calculated in Step S172. When the result of the determining in Step S171 is false (No), that is, when scaling_list_present_flag has a value of 1 and the orthogonal transform skip flag has a value of 0, the inverse quantization process is performed on the quantized coefficient with the use of the quantization matrix, with the result that an inverse quantized coefficient is calculated in Step S173.

Thus, when scaling_list_present_flag has a value of 0 or the orthogonal transform skip flag has a value of 1, the quantized coefficient is inversely quantized without the use of the quantization matrix, with the result that an inverse quantized coefficient is calculated. By doing so, it is possible to control the operation so that the quantization matrix is not applied when the orthogonal transformation is not applied. The quantization matrix is a parameter that is used to perform, after the orthogonal transformation, the quantization during which important frequency components are maintained while unnecessary frequency components are reduced. The use of the quantization matrix after the orthogonal transformation can efficiently increase coding efficiency. Therefore, the operation is controlled so that the quantization matrix is applied only when the orthogonal transform skip flag has a value of 0, that is, when the orthogonal transformation is applied, while, the quantization matrix is not applied when the orthogonal transform skip flag has a value of 1, that is, when the orthogonal transformation is not applied. This makes it possible to appropriately apply the quantization matrix, thereby allowing an increase in coding efficiency.

Figure 8:
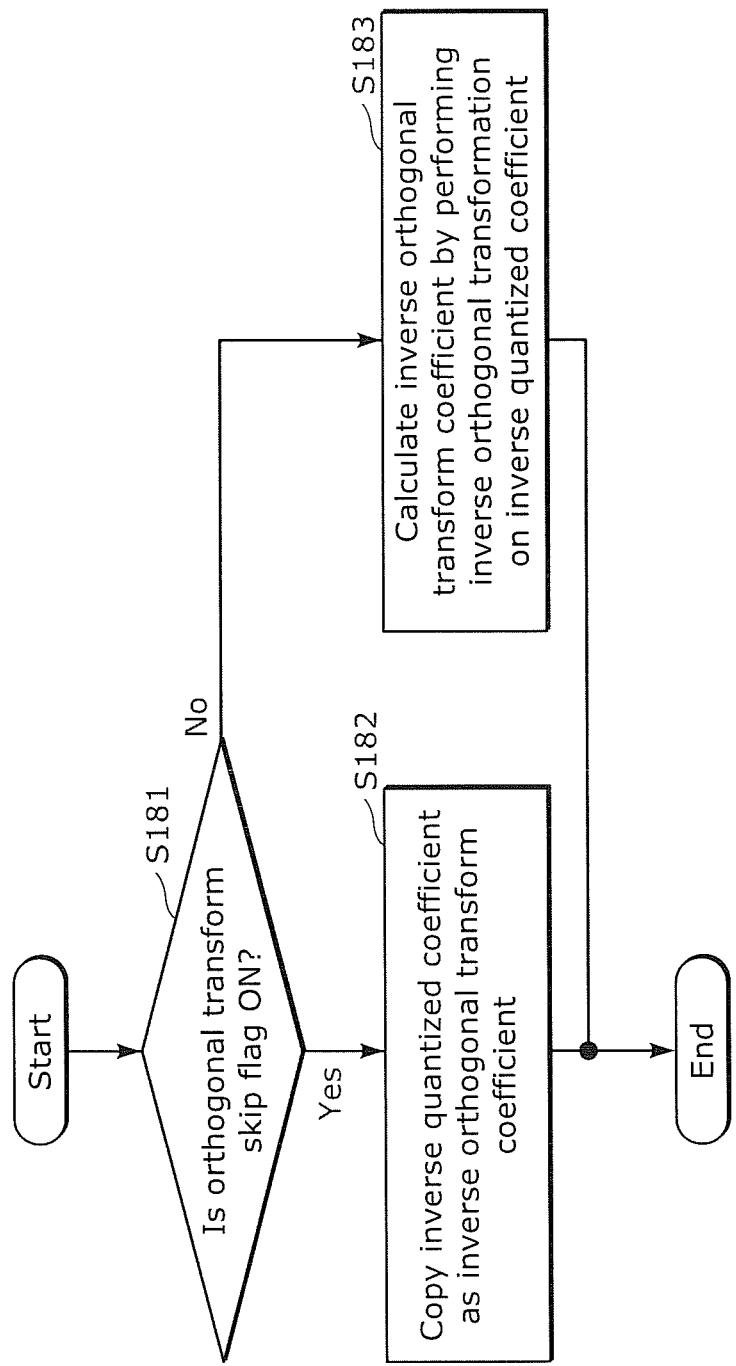
FIG. 8 is a flowchart illustrating a detailed process of Step S109 of FIG. 2 according to Embodiment 1.

FIG. 8 is a flowchart illustrating a detailed process of Step S109 of FIG. 2. Specifically, FIG. 8 is a flowchart illustrating a method of calculating an inverse orthogonal transform coefficient according to a value of the orthogonal transform skip flag. The following explains FIG. 8.

In Step S181, whether or not the orthogonal transform skip flag is ON, that is, this flag has a value of 1, is determined, and when this is true (Yes), an inverse quantized coefficient is copied as the inverse orthogonal transform coefficient in Step S182 so that the inverse orthogonal transform coefficient is calculated without application of the inverse orthogonal transformation. Meanwhile, when the result of the determining in Step S181 is false (No), the inverse orthogonal transformation is applied to the inverse quantized coefficient to calculate the inverse orthogonal transform coefficient in Step S183.

Thus, when the orthogonal transform skip flag is 1, the inverse quantized coefficient is directly copied as the inverse orthogonal transform coefficient, with the result that the inverse orthogonal transform coefficient can be calculated without application of the inverse orthogonal transformation. It should be noted that although the inverse quantized coefficient is copied as the inverse orthogonal transform coefficient to calculate the inverse orthogonal transform coefficient without application of the inverse orthogonal transformation in Step S182 in this embodiment, this is not necessarily the only example; any method is possible as long as it is a method of calculating the inverse orthogonal transform coefficient without applying the inverse orthogonal transformation to the inverse quantized coefficient.

Thus, according to this embodiment, a mode in which no orthogonal transformation is performed but the quantization is performed becomes selectable, allowing an increase in coding efficiency. More specifically, the orthogonal transform skip flag indicating whether or not the orthogonal transformation is to be applied is introduced, and in the case of a certain prediction mode or a certain orthogonal transformation size, the cost imposed when the orthogonal transformation is applied and the cost imposed when the orthogonal transformation is not applied are compared. When the cost imposed when the orthogonal transformation is not applied is smaller than the cost imposed when the orthogonal transformation is applied, the orthogonal transform skip flag is set to 1 so that the orthogonal transformation is not applied. By doing so, coding efficiency can increase. Furthermore, the operation is controlled so that the quantization matrix is applied only when the orthogonal transform skip flag has a value of 0, that is, when the orthogonal transformation is applied, while, the quantization matrix is not applied when the orthogonal transform skip flag has a value of 1, that is, when the orthogonal transformation is not applied. This makes it possible to appropriately apply the quantization matrix, thereby allowing an increase in coding efficiency.

Embodiment 2

Figure 9:
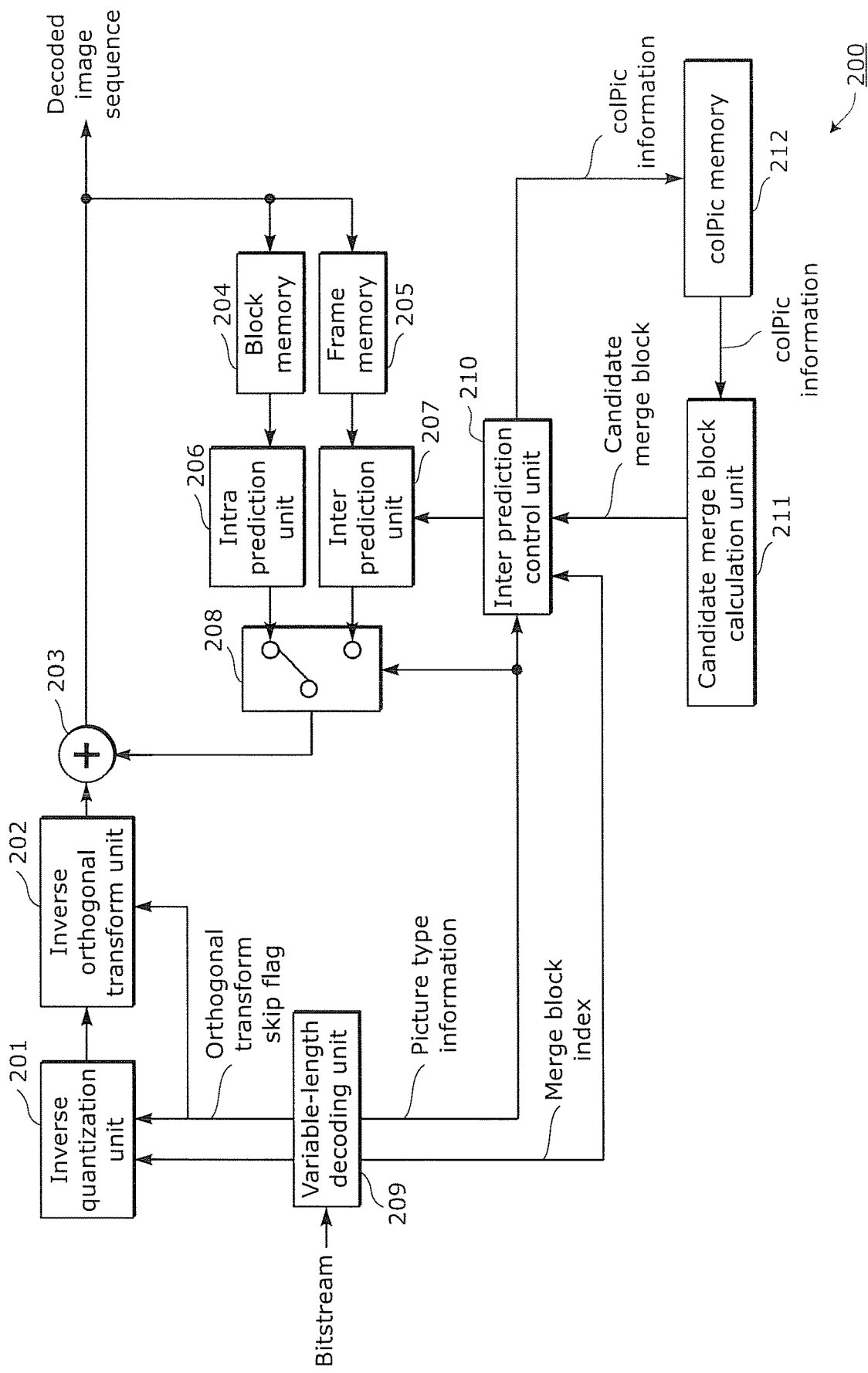
FIG. 9 is a block diagram illustrating a structure of a moving picture decoding apparatus that uses a moving picture decoding method according to Embodiment 2.

FIG. 9 is a block diagram illustrating a structure of a moving picture decoding apparatus that uses a moving picture decoding method according to this embodiment.

A moving picture decoding apparatus 200 includes, as illustrated in FIG. 9, a variable-length decoding unit 209, an inverse quantization unit 201, an inverse orthogonal transform unit 202, an adder 203, a block memory 204, a frame memory 205, an intra prediction unit 206, an inter prediction unit 207, a switch 208, an inter prediction control unit 210, a candidate merge block calculation unit 211, and a colPic memory 212.

The variable-length decoding unit 209 performs a variable-length decoding process on an input bitstream to generate an orthogonal transform skip flag, picture type information, and a quantized coefficient. Furthermore, the variable-length decoding unit 209 calculates a size of the list of the candidate merge blocks and performs a variable-length decoding process on a merge block index.

The inverse quantization unit 201 performs, according to a value of the orthogonal transform skip flag, an inverse quantization process on the quantized coefficient resulting from the variable-length decoding process. In other words, the inverse quantization process is performed on the quantized coefficient included in coefficient data resulting from the quantization process. The inverse orthogonal transform unit 202 generates a decoded prediction residual including the inverse orthogonal transform coefficient, by transforming, from the frequency domain to the image domain, the coefficient data resulting from the inverse quantization process and including the quantized coefficient, according to a value of the orthogonal transform skip flag. The adder 203 generates a reconstructed image by adding up the decoded prediction residual and the prediction image. This reconstructed image is output from the moving picture decoding apparatus 200 as a decoded image sequence.

The block memory 204 stores the reconstructed image as a reference image per block. The frame memory 205 stores the reconstructed image as a reference image per frame. The intra prediction unit 206 performs intra prediction using the per-block reference image stored in the block memory 204, thereby generating a prediction image of a current block to be decoded. The inter prediction unit 207 performs inter prediction using the per-frame reference image stored in the frame memory 205, thereby generating a prediction image of the current block.

The switch 208 switches, based on the picture type information generated by the variable-length decoding unit 209, the prediction image that is to be output to the adder 203, between the prediction image generated by the intra prediction unit 206 and the prediction image generated by the inter prediction unit 207.

The candidate merge block calculation unit 115 derives a candidate merge block in a merge mode by using an adjacent block of the current block and colPic information, such as a motion vector of a co-located block, stored in the colPic memory 212. Furthermore, the candidate merge block calculation unit 211 assigns a value of a merge block index to each candidate merge block derived and sends the candidate merge bock to the inter prediction control unit 210.

The inter prediction control unit 210 decodes information on a motion vector detection mode or the merge mode and causes the inter prediction unit 207 to generate a prediction image. Furthermore, the inter prediction control unit 210 transfers colPic information including a motion vector of the current block to the colPic memory 212.

Figure 10:
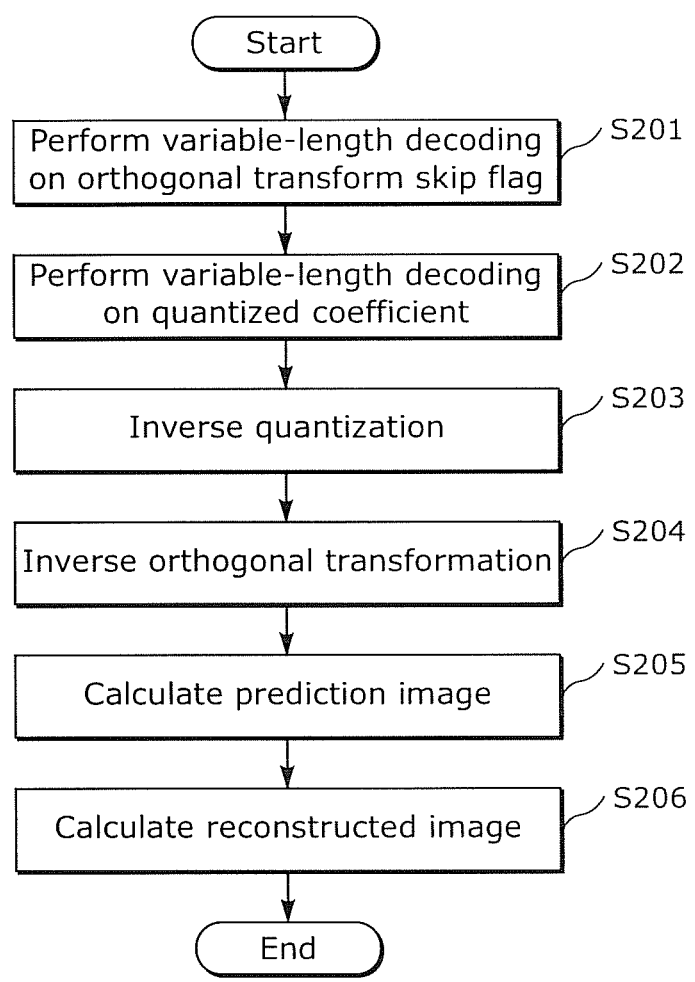
FIG. 10 is a flowchart illustrating an outline process of a moving picture decoding method according to Embodiment 2.

FIG. 10 is a flowchart illustrating an outline process of a moving picture decoding method according to this embodiment.

In Step S201, variable-length decoding is performed on the orthogonal transform skip flag in the hereinafter-described manner. In Step S202, variable-length decoding is performed on the quantized coefficient. In Step S203, the inverse quantization process is performed on the quantized coefficient according to a value of the orthogonal transform skip flag in the same or like manner as in Step S108 of FIG. 2, with the result that an inverse quantized coefficient is calculated. In Step S204, the inverse orthogonal transform process is applied to the inverse quantized coefficient according to the orthogonal transform skip flag in the same or like manner as in Step S109 of FIG. 2, with the result that an inverse orthogonal transform coefficient is calculated. In Step S205, a prediction image of the current block is calculated in the same or like manner as in Step S101 of FIG. 2. For example, in the case of decoding the current block in the intra prediction mode, a prediction image is generated using a reference pixel adjacent to the current block. In the case of the inter prediction mode, a prediction image is generated using a value of a pixel in a reference block that is specified by the decoded motion vector and is located inside a reference picture that is a decoded picture different from a current picture to be decoded. In Step S206, the prediction image calculated in Step S205 and the decoded prediction residual including the inverse orthogonal transform coefficient calculated in Step S204 are added up, with the result that a reconstructed image is calculated.

Figure 11:
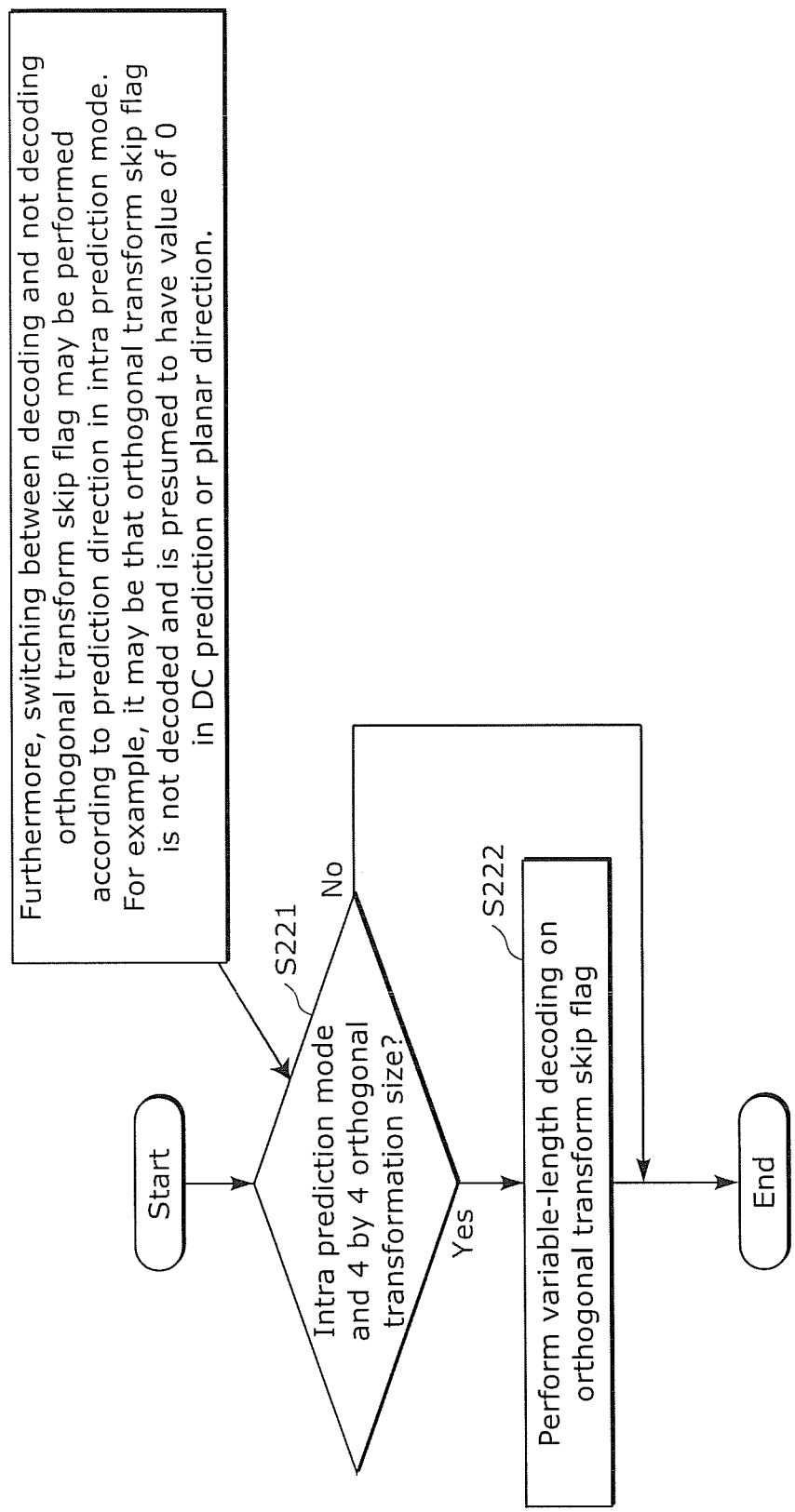
FIG. 11 is a flowchart illustrating a detailed process of Step S201 of FIG. 10 according to Embodiment 2.

FIG. 11 is a flowchart illustrating a detailed process of Step S201 of FIG. 10. Specifically, FIG. 11 is a flowchart illustrating a method of performing variable-length decoding on the orthogonal transform skip flag. The following explains FIG. 11.

In Step S221, whether or not the intra prediction mode is used for the current block and the orthogonal transformation size is 4 by 4 is determined. When the result of this determination is true (Yes in S221), the variable-length decoding is performed on the orthogonal transform skip flag in the bitstream in Step S222.

Thus, the variable-length decoding is performed on the orthogonal transform skip flag only in the case of a certain prediction mode or a certain orthogonal transformation size, with the result that the bitstream obtained with increased coding efficiency can be appropriately decoded. It should be noted that although the orthogonal transform skip flag is decoded only in the case where Step S221 shows the intra prediction mode and the 4 by 4 orthogonal transformation size in this embodiment, this is not the only example. For example, the orthogonal transform skip flag may be decoded in the case of the inter prediction mode as well. Likewise, the orthogonal transform skip flag may be decoded also in the case where the orthogonal transformation size is larger than 4 by 4. This makes it possible to appropriately decode a bitstream obtained with further increased coding efficiency. Furthermore, switching between decoding and not decoding the orthogonal transform skip flag may be performed based on a prediction direction in the intra or inter prediction or the like. For example, it may be set that the orthogonal transform skip flag is not decoded in the case of DC or planar prediction in the intra prediction mode. By doing so, it is possible to appropriately decode the bitstream obtained with increased coding efficiency the header information of which includes reduced overhead.

Thus, according to this embodiment, a mode in which no orthogonal transformation is performed but the quantization is performed becomes selectable, making it possible to appropriately decode the bitstream obtained with increased coding efficiency. More specifically, the orthogonal transform skip flag indicating whether or not the orthogonal transformation is to be applied is introduced, and in the case of a certain prediction mode or a certain orthogonal transformation size, the cost imposed when the orthogonal transformation is applied and the cost imposed when the orthogonal transformation is not applied are compared. When the cost imposed when the orthogonal transformation is not applied is smaller than the cost imposed when the orthogonal transformation is applied, the orthogonal transform skip flag is set to 1 so that the orthogonal transformation is not applied. By doing so, it is possible to appropriately decode the bitstream obtained with increased coding efficiency.

Furthermore, the operation is controlled so that the quantization matrix is applied only when the orthogonal transform skip flag has a value of 0, that is, when the orthogonal transformation is applied, while, the quantization matrix is not applied when the orthogonal transform skip flag has a value of 1, that is, when the orthogonal transformation is not applied. This makes it possible to appropriately apply the quantization matrix, with the result that the bitstream obtained with increased coding efficiency can be decoded.

Embodiment 3

In this embodiment, the quantization matrix is appropriately applied according to a value of the orthogonal transform skip flag, and furthermore, a scan order for the quantized coefficients in the case of skipping the orthogonal transformation is appropriately controlled. This allows a further increase in coding efficiency. Hereinafter, this embodiment is described with reference to the Drawings.

Figure 12:
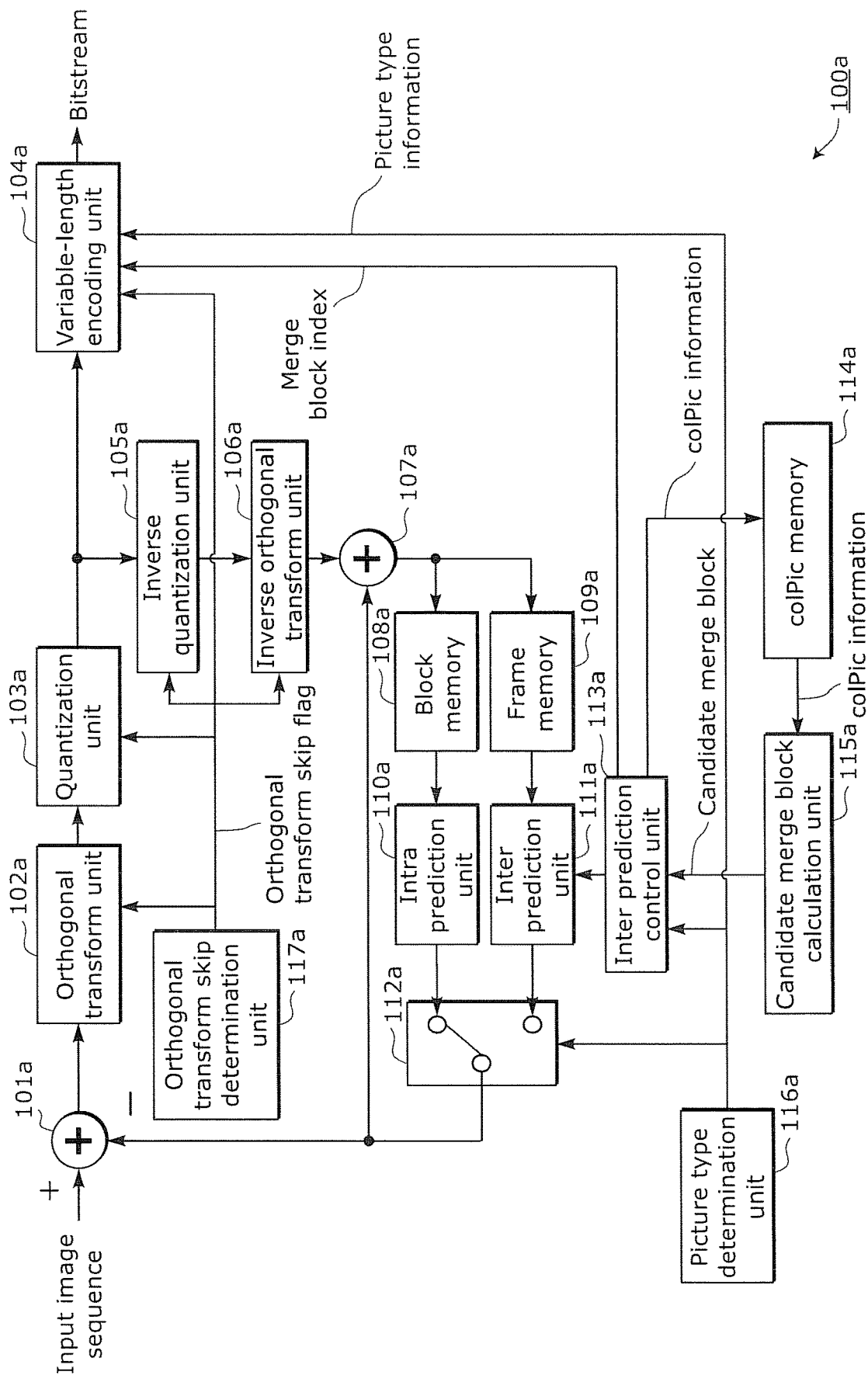
FIG. 12 is a block diagram illustrating a structure of a moving picture encoding apparatus that uses a moving picture encoding method according to Embodiment 3.

FIG. 12 is a block diagram illustrating a structure of a moving picture encoding apparatus that uses a moving picture encoding method according to this embodiment.

A moving picture encoding apparatus 100a includes, as illustrated in FIG. 12, an orthogonal transform skip determination unit 117a, a subtractor 101a, an orthogonal transform unit 102a, a quantization unit 103a, an inverse quantization unit 105a, an inverse orthogonal transform unit 106a, an adder 107a, a block memory 108a, a frame memory 109a, an intra prediction unit 110a, an inter prediction unit 111a, a switch 112a, an inter prediction control unit 113a, a picture type determination unit 116a, a candidate merge block calculation unit 115a, a colPic memory 114a, and a variable-length encoding unit 104a.

The subtractor 101a generates a prediction residual by subtracting a prediction image from an input image included in an input image sequence.

The orthogonal transform skip determination unit 117a determines, in the hereinafter-described manner, whether or not an orthogonal transformation is to be applied to a prediction residual calculated using a current block to be encoded, and when the orthogonal transformation is to be applied, sets an orthogonal transform skip flag to 0, while, when the orthogonal transformation is not to be applied, sets the orthogonal transform skip flag to 1.

The orthogonal transform unit 102a transforms the prediction residual from an image domain to a frequency domain according to a value of the orthogonal transform skip flag. The quantization unit 103a performs, according to the value of the orthogonal transform skip flag, a quantization process on coefficient data which is a prediction residual resulting from the transformation to the frequency domain. The inverse quantization unit 105a performs, according to the value of the orthogonal transform skip flag, an inverse quantization processing on coefficient data resulting from the quantization process performed by the quantization unit 103a. The inverse orthogonal transform unit 106a generates a decoded prediction residual by transforming, from the frequency domain to the image domain, coefficient data resulting from the inverse quantization process, according to the value of the orthogonal transform skip flag. The adder 107a generates a reconstructed image by adding the prediction image to the decoded prediction residual.

The block memory 108a stores the reconstructed image as a reference image per block. The frame memory 109a stores the reconstructed image as a reference image per frame. The picture type determination unit 116a determines into which one of the picture types including I-picture, B-picture, and P-picture, the input image is to be encoded, and generates picture type information. The intra prediction unit 110a performs intra prediction on the current block using the per-block reference image stored in the block memory 108a, thereby generating a prediction image. The inter prediction unit 111a performs inter prediction on the current block using the per-frame reference image stored in the frame memory 109a and a motion vector derived through motion estimation or the like, thereby generating a prediction image.

The switch 112a switches, based on the picture type information generated by the picture type determination unit 116a, the prediction image that is to be output to the subtractor 101a and the adder 107a, between the prediction image generated by the intra prediction unit 110a and the prediction image generated by the inter prediction unit 111a.

The candidate merge block calculation unit 115a derives a candidate merge block in a merge mode and a skip mode by using an adjacent block of the current block and colPic information, such as a motion vector of a co-located block, stored in the colPic memory 114a, and calculates a size of a list of candidate merge blocks. Furthermore, the candidate merge block calculation unit 115a assigns a value of a merge block index to the derived candidate merge block. The candidate merge block calculation unit 115a then sends the candidate merge bock and the merge block index to the inter prediction control unit 113a.

The inter prediction control unit 113a controls whether or not the current block is to be encoded in the merge mode or a motion vector encoding mode in which a motion vector derived through motion estimation is used. Furthermore, the inter prediction control unit 113a transfers colPic information including a motion vector of the current block to the colPic memory 114a.

The variable-length encoding unit 104a performs, in the hereinafter-described manner, variable-length encoding on the orthogonal transform skip flag and furthermore, performs a variable-length encoding process on the coefficient data resulting from the quantization process, according to a value of the orthogonal transform skip flag, thereby generating a bitstream. Furthermore, the variable-length encoding unit 104a performs variable-length encoding on the picture type information. Moreover, the variable-length encoding unit 104a assigns, to the merge block index that is to be used in encoding, a bit sequence that corresponds to a size of the list of the candidate merge blocks, and performs variable-length encoding on that bit sequence.

Figure 13:
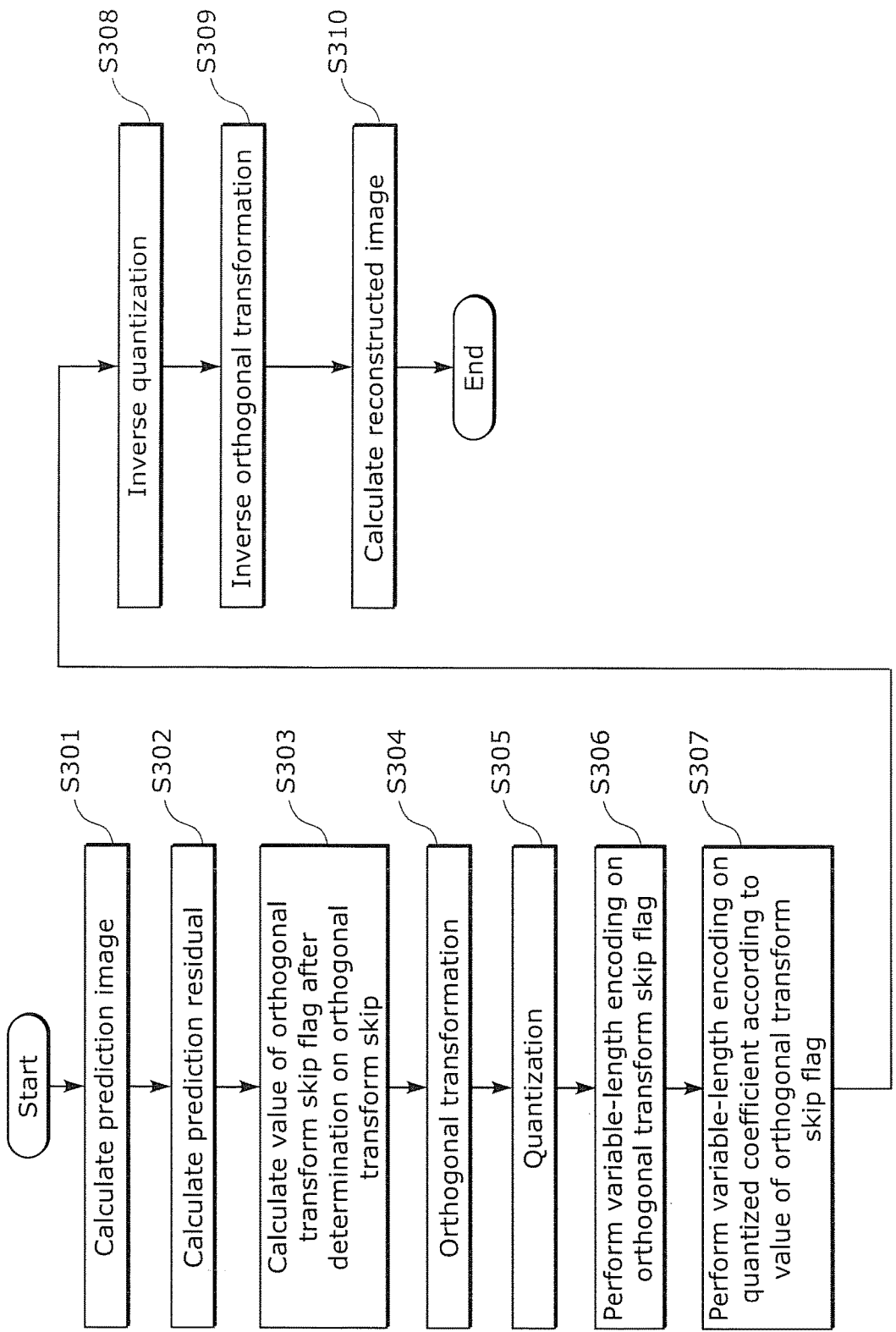
FIG. 13 is a flowchart illustrating an outline process of a moving picture encoding method according to Embodiment 3.

FIG. 13 is a flowchart illustrating an outline process of a moving picture encoding method according to this embodiment.

In step S301, a prediction image of the current block is calculated. For example, in the case of encoding the current block in an intra prediction mode, a prediction image is generated using a reference pixel adjacent to the current block. In the case of an inter prediction mode, a prediction image is generated using a value of a pixel in a reference block that is specified through motion estimation or the like and is located inside a reference picture which is an encoded picture different from a current picture to be encoded.

In Step S302, a prediction residual (prediction difference) is calculated by calculating a difference between the current block and the prediction image calculated in Step S301. In Step S303, whether or not to apply the orthogonal transformation to the prediction residual is determined, and a value of the orthogonal transform skip flag is calculated, in the same or like manner as in Step S103 of FIG. 2.

In Step S304, the orthogonal transform process is performed in the same or like manner as in Step S104 of FIG. 2, with the result that coefficient data including an orthogonal transform coefficient is calculated. In Step S305, whether or not to perform quantization using a quantization matrix is determined according to the value of orthogonal transform skip flag, and when the quantization is determined to be performed, the quantization process using the quantization matrix is performed, in the same or like manner as in Step S105 of FIG. 2, with the result that quantized coefficient data including a quantized coefficient is calculated. In Step S306, variable-length encoding is performed on the orthogonal transform skip flag in the same or like manner as in Step S106 of FIG. 2. In Step S307, variable-length encoding is performed on the quantized coefficient while the scan order for the quantized coefficients is adaptively changed according to the orthogonal transform skip flag in the hereinafter-described manner.

In Step S308, the inverse quantization process is performed on the quantized coefficient in the same or like manner as in Step S108 of FIG. 2, with the result that coefficient data including an inverse quantized coefficient is calculated. In Step S309, the inverse orthogonal transform process is applied to the inverse quantized coefficient according to the orthogonal transform skip flag in the same or like manner as in Step S109 of FIG. 2, with the result that a decoded prediction residual including the inverse orthogonal transform coefficient is calculated. In Step S310, the prediction image calculated in Step S301 and the decoded prediction residual including the inverse orthogonal transform coefficient calculated in Step S309 are added up, with the result that a reconstructed image is calculated.

Figure 14:
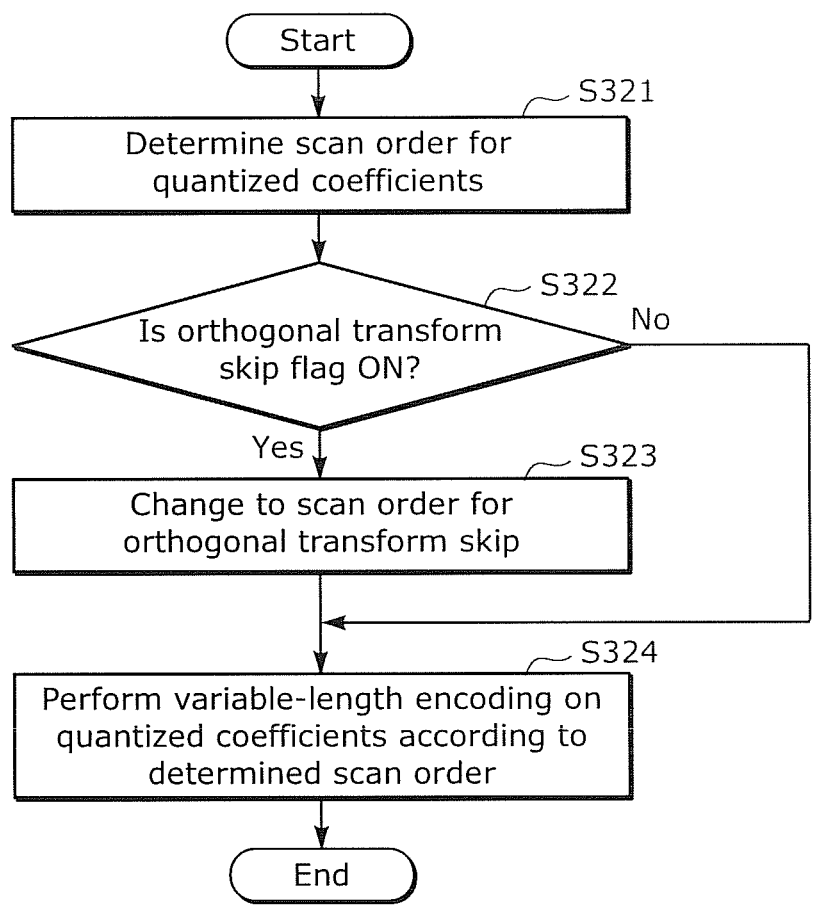
FIG. 14 is a flowchart illustrating a detailed process of Step S307 of FIG. 13 according to Embodiment 3.

FIG. 14 is a flowchart illustrating a detailed process of Step S307 of FIG. 13. Specifically, FIG. 14 is a flowchart illustrating a method of performing variable-length encoding on the quantized coefficient according to the orthogonal transform skip flag. The following explains FIG. 14.

In Step S321, the scan order for the quantized coefficients of the current block, that is applied in performing variable-length encoding thereon, is determined in the hereinafter-described manner. Here, the scan order represents the order for the quantized coefficients of the current block that is applied in performing variable-length encoding thereon. In Step S322, whether or not the orthogonal transform skip flag is ON, that is, this flag has a value of 1, is determined, and when this is true (Yes), the scan order determined in Step S321 is changed to a scan order for orthogonal transform skip in Step S323 in the hereinafter-described manner. In Step S324, variable-length encoding is performed on the quantized coefficients according to the determined scan order.

It should be noted that although the scan order is once determined in Step S321 and when the orthogonal transform skip flag is ON, then is changed to the scan order for orthogonal transform skip in Step S323 in this embodiment, this sequence is not necessarily the only example. For example, in the case where the orthogonal transform skip flag is ON when determining the scan order in Step S321, the scan order for orthogonal transform skip may be directly determined to be applied. Thus, the scan order for orthogonal transform skip is applied when the orthogonal transform skip flag is ON, that is, this flag has a value of 1, with the result that the coding efficiency can increase.

Figure 15:
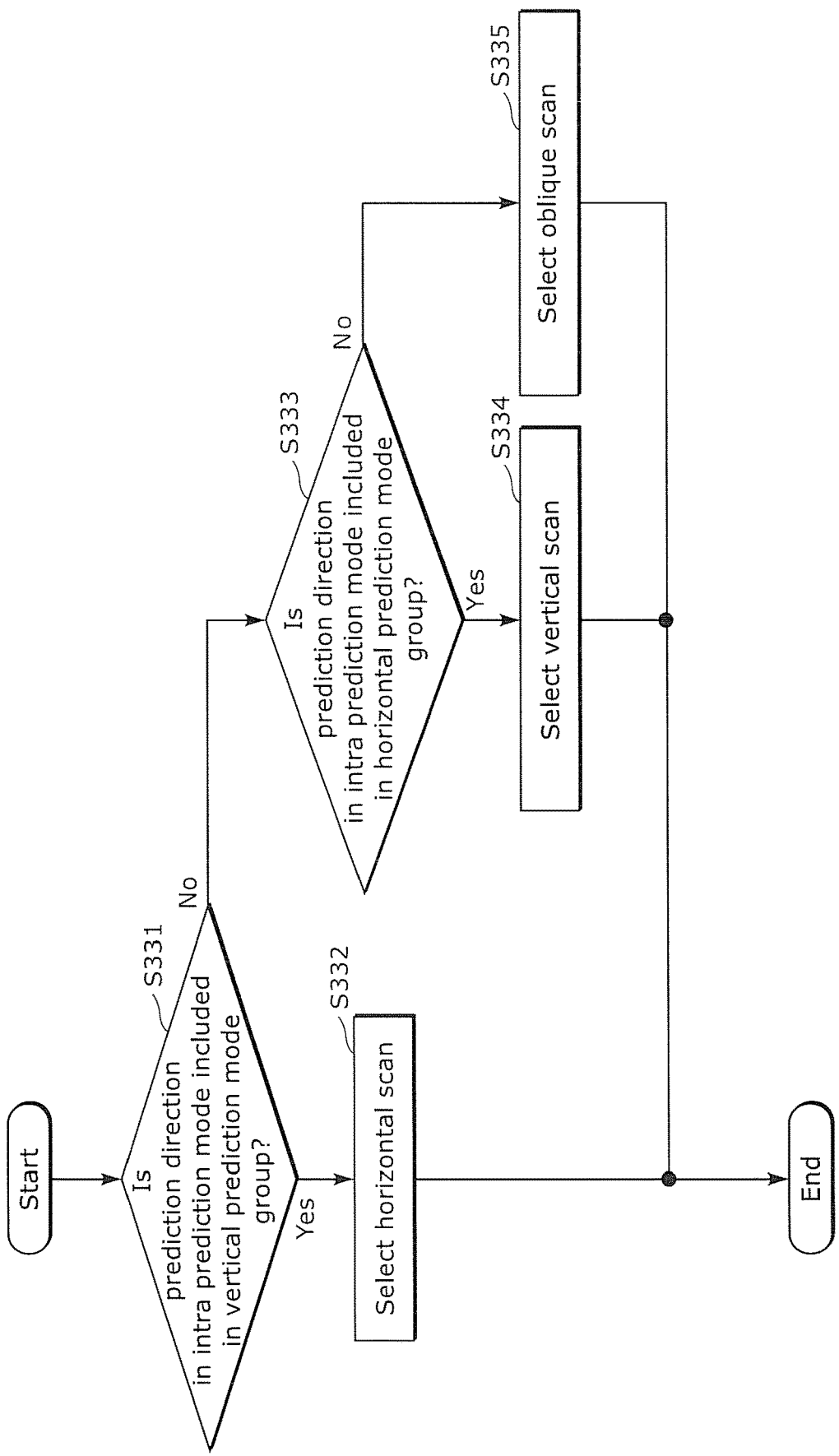
FIG. 15 is a flowchart illustrating a detailed process of Step S321 of FIG. 14 according to Embodiment 3.

FIG. 15 is a flowchart illustrating a detailed process of Step S321 of FIG. 14. Specifically, FIG. 15 is a flowchart representing an example of determining the scan order for the quantized coefficients. The following explains FIG. 15.

In Step S331, whether or not the prediction direction in the intra prediction mode is included in a vertical prediction mode group, and when this is true (Yes), a horizontal scan is selected as the scan order in Step S332.

Figure 16:
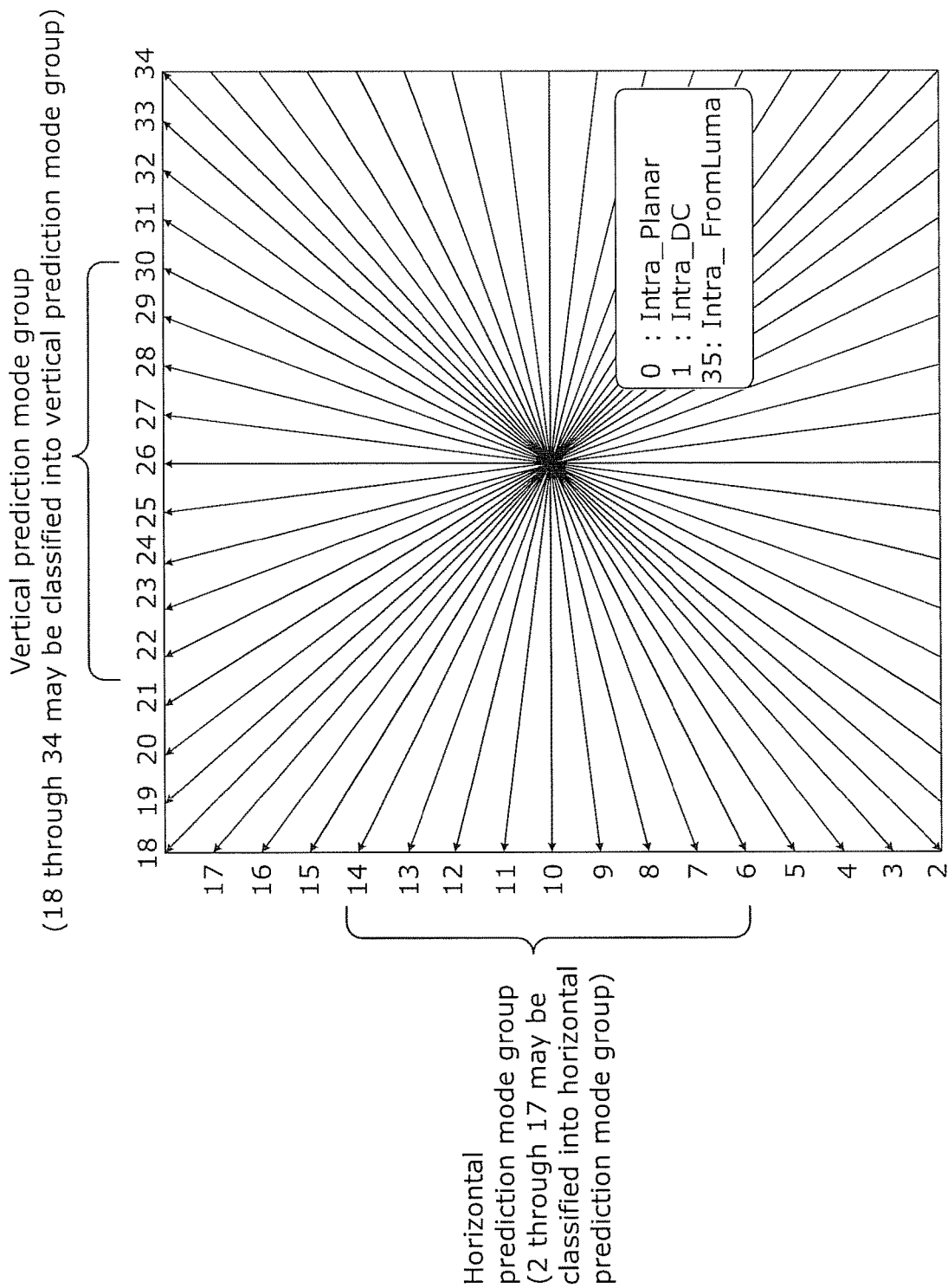
FIG. 16 illustrates a prediction direction in an intra prediction mode according to Embodiment 3.
Figure 17:
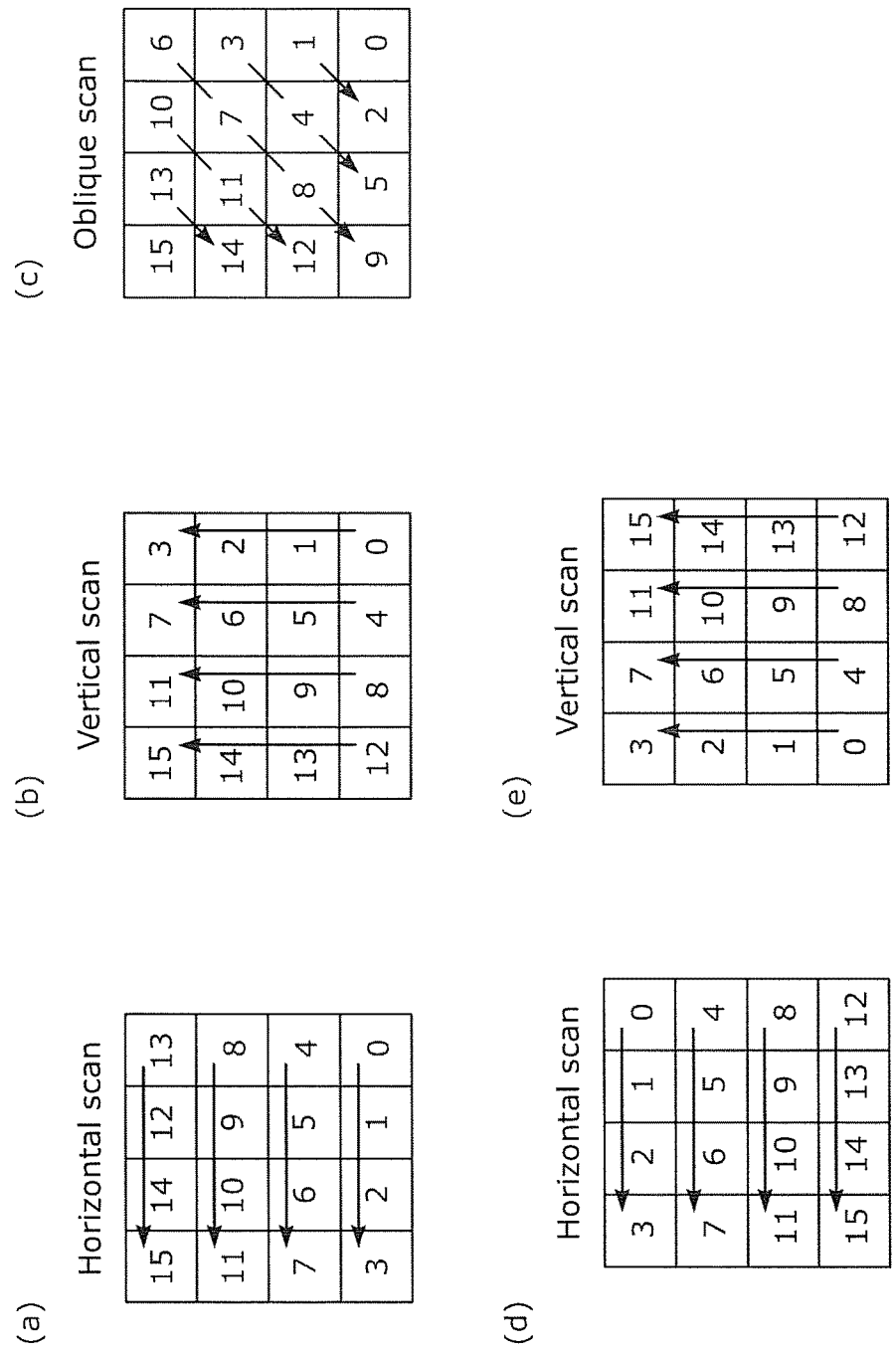
FIG. 17 illustrates a scan order for a quantized coefficient according to Embodiment 3.

Here, the vertical prediction mode group means, for example, prediction directions denoted by values 22 through 30 among prediction directions in the intra prediction mode indicated in FIG. 16. It should be noted that although the prediction directions denoted by the values 22 through 30 are assumed to be the vertical prediction mode group in this embodiment, this is not the only example. For example, prediction directions denoted by values 18 through 34 may be assumed to be the vertical prediction mode group. Here, the horizontal scan means, for example, the scan order illustrated in (a) of FIG. 17. In the horizontal scan in (a) of FIG. 17, the quantized coefficients are scanned in the horizontal direction from the bottom right quantized coefficient (the quantized coefficient denoted by a numeric value of 0) in the order of assigned numeric values as illustrated, to perform variable-length encoding on these quantized coefficients.

When the result of the determining in Step S331 is false (No), whether or not the prediction direction in the intra prediction mode is included in the horizontal prediction mode group is determined in Step S333, and when this is true (Yes), a vertical scan is selected as the scan order in Step S334.

Here, the horizontal prediction mode group means, for example, prediction directions denoted by values 6 through 14 among prediction directions in the intra prediction mode indicated in FIG. 16. It should be noted that although the prediction directions denoted by the values 6 through 14 are assumed to be the horizontal prediction mode group in this embodiment, this is not the only example. For example, prediction directions denoted by values 2 through 17 may be assumed to be the horizontal prediction mode group. Here, the vertical scan means, for example, the scan order illustrated in (b) of FIG. 17. In the vertical scan in (b) of FIG. 17, the quantized coefficients are scanned in the vertical direction from the bottom right quantized coefficient (the quantized coefficient denoted by a numeric value of 0) in the order of assigned numeric values as illustrated, to perform variable-length encoding on these quantized coefficients.

When the result of the determining in Step S333 is false (No), an oblique scan is selected as the scan order in Step S335. Here, the oblique scan means, for example, the scan order illustrated in (c) of FIG. 17. In the oblique scan in (c) of FIG. 17, the quantized coefficients are scanned in the oblique direction from the bottom right quantized coefficient (the quantized coefficient denoted by a numeric value of 0) in the order of assigned numeric values as illustrated, to perform variable-length encoding on these quantized coefficients. Thus, adaptively changing the scan order according to the prediction mode for the current block allows an increase in coding efficiency.

Figure 18:
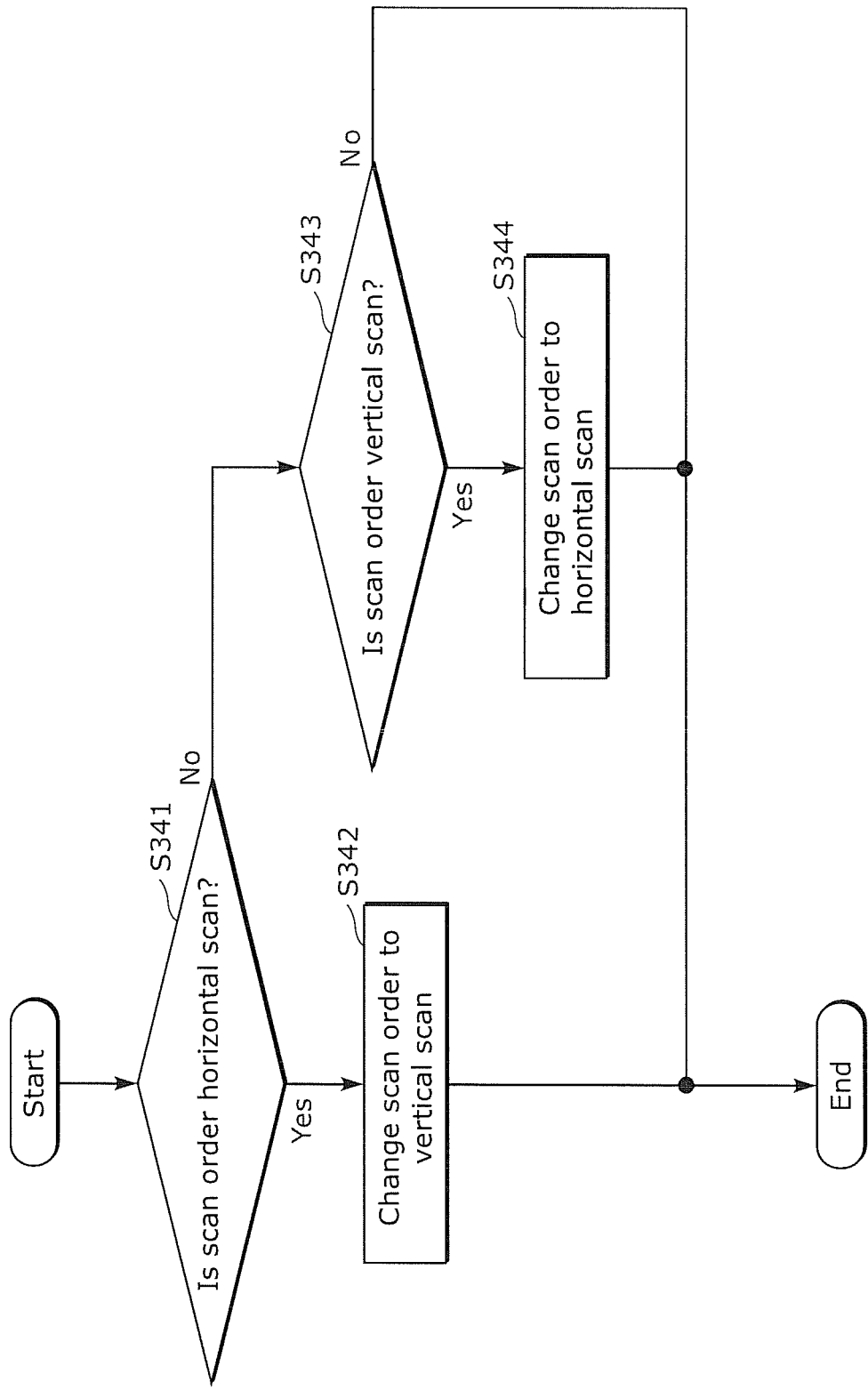
FIG. 18 is a flowchart illustrating a detailed process of Step S323 of FIG. 14 according to Embodiment 3.

FIG. 18 is a flowchart illustrating a detailed process of Step S323 of FIG. 14. Specifically, FIG. 18 is a flowchart representing an example of determining the scan order for the quantized coefficients for orthogonal transform skip. The following explains FIG. 18.

In Step S341, whether or not the scan order determined in Step S321 of FIG. 14 is the horizontal scan, and when this is true (Yes), the scan order is changed to the vertical scan in Step S342. When the result of the determining in Step S341 is false (No), whether or not the scan order determined in Step S321 of FIG. 14 is the vertical scan is determined in Step S343. When the result of this determination is true (Yes in Step S343), the scan order is changed to the horizontal scan in Step S344.

Thus, the scan order for orthogonal transform skip is used when the orthogonal transform skip flag is ON, with the result that the coding efficiency can increase. More specifically, when the scan order determined in Step S321 of FIG. 14 is the horizontal scan, that is, the prediction direction in the intra prediction is included in the vertical prediction mode group, a change is made to use the vertical scan as the scan order for orthogonal transform skip. When the scan order determined in Step S321 of FIG. 14 is the vertical scan, that is, the prediction direction in the intra prediction is included in the horizontal prediction mode group, a change is made to use the horizontal scan as the scan order for orthogonal transform skip. This allows an increase in coding efficiency.

Generally, when the prediction mode included in the vertical prediction mode group is selected as the prediction direction in the intra prediction, the application of the orthogonal transformation and the quantization using the quantization matrix results in a higher likelihood of generating many frequency components in the horizontal direction, which means an increased possibility that the coefficients having a value of 0 are arranged in series in the horizontal direction; therefore, the application of the horizontal scan increases coding efficiency. However, when the orthogonal transformation and the quantization using the quantization matrix are not applied, there is an increased possibility that the coefficients having a value of 0 are arranged in series in the vertical direction, which means that the selection of the vertical scan allows the quantized coefficients to be encoded more efficiently. Meanwhile, when a prediction method included in the horizontal prediction mode group is selected as the prediction direction in the intra prediction, the application of the orthogonal transformation and the quantization using the quantization matrix results in a higher likelihood of generating many frequency components in the vertical direction, which means an increased possibility that the coefficients having a value of 0 are arranged in series in the vertical direction; therefore, the application of the vertical scan increases coding efficiency. However, when the orthogonal transformation and the quantization using the quantization matrix are not applied, there is an increased possibility that the coefficients having a value of 0 are arranged in series in the horizontal direction, which means that the selection of the horizontal scan allows the quantized coefficients to be encoded more efficiently.

Thus, it is possible to increase coding efficiency by changing the scan order to the scan order for orthogonal transform skip when the orthogonal transform skip flag is ON and the quantization using the quantization matrix is not applied.

It should be noted that although a change is made in this embodiment to use the vertical scan as the scan order for orthogonal transform skip when the scan order determined in Step S321 of FIG. 14 is the horizontal scan, that is, when the prediction direction in the intra prediction is a prediction method included in the vertical prediction mode group, this is not the only example. For example, the start position of the horizontal scan may be changed as illustrated in (d) of FIG. 17. In (d) of FIG. 17, the start position of the horizontal scan is the top right position in the block, and according to the order of assigned numerical values, the horizontal scan is performed toward the bottom left position in the block. When a prediction method included in the vertical prediction mode group is selected as the prediction method in the intra prediction, the block more likely has zero coefficients arranged in series at upper positions unless the orthogonal transformation and the quantization using the quantization matrix are applied. Therefore, it is possible to increase coding efficiency by applying the scan order illustrated in (d) of FIG. 17.

Furthermore, although a change is made in this embodiment to use the horizontal scan as the scan order for orthogonal transform skip when the scan order determined in Step S321 of FIG. 14 is the vertical scan, that is, when the prediction direction in the intra prediction is a prediction method included in the horizontal prediction mode group, this is not the only example. For example, the start position of the vertical scan may be changed as illustrated in (e) of FIG. 17. In (e) of FIG. 17, the start position of the vertical scan is the bottom left position in the block, and according to the order of assigned numerical values, the vertical scan is performed toward the top right position in the block. When a prediction method included in the horizontal prediction mode group is selected as the prediction method in the intra prediction, the block more likely has zero coefficients arranged in series at more leftward positions unless the orthogonal transformation and the quantization using the quantization matrix are performed. Therefore, it is possible to increase coding efficiency by applying the scan order illustrated in (e) of FIG. 17. Fixing the scan order to one of the scan orders when the orthogonal transformation and the quantization using the quantization matrix are not applied allows an increase in coding efficiency while reducing the processing load for changing the scan orders.

Thus, according to this embodiment, it is possible to increase coding efficiency by changing the scan order to the scan order for orthogonal transform skip when the orthogonal transform skip flag is ON and the quantization using the quantization matrix is not applied. More specifically, when the scan order determined in Step S321 of FIG. 14 is the horizontal scan, that is, the prediction direction in the intra prediction is included in the vertical prediction mode group in the case where the orthogonal transform skip flag is ON and the quantization using the quantization matrix is not applied, a change is made to use the vertical scan as the scan order for orthogonal transform skip. On the other hand, when the scan order determined in Step S321 of FIG. 14 is the vertical scan, that is, the prediction direction in the intra prediction is included in the vertical prediction mode group, a change is made to use the horizontal scan as the scan order for orthogonal transform skip. This allows an increase in coding efficiency.

Embodiment 4

Figure 19:
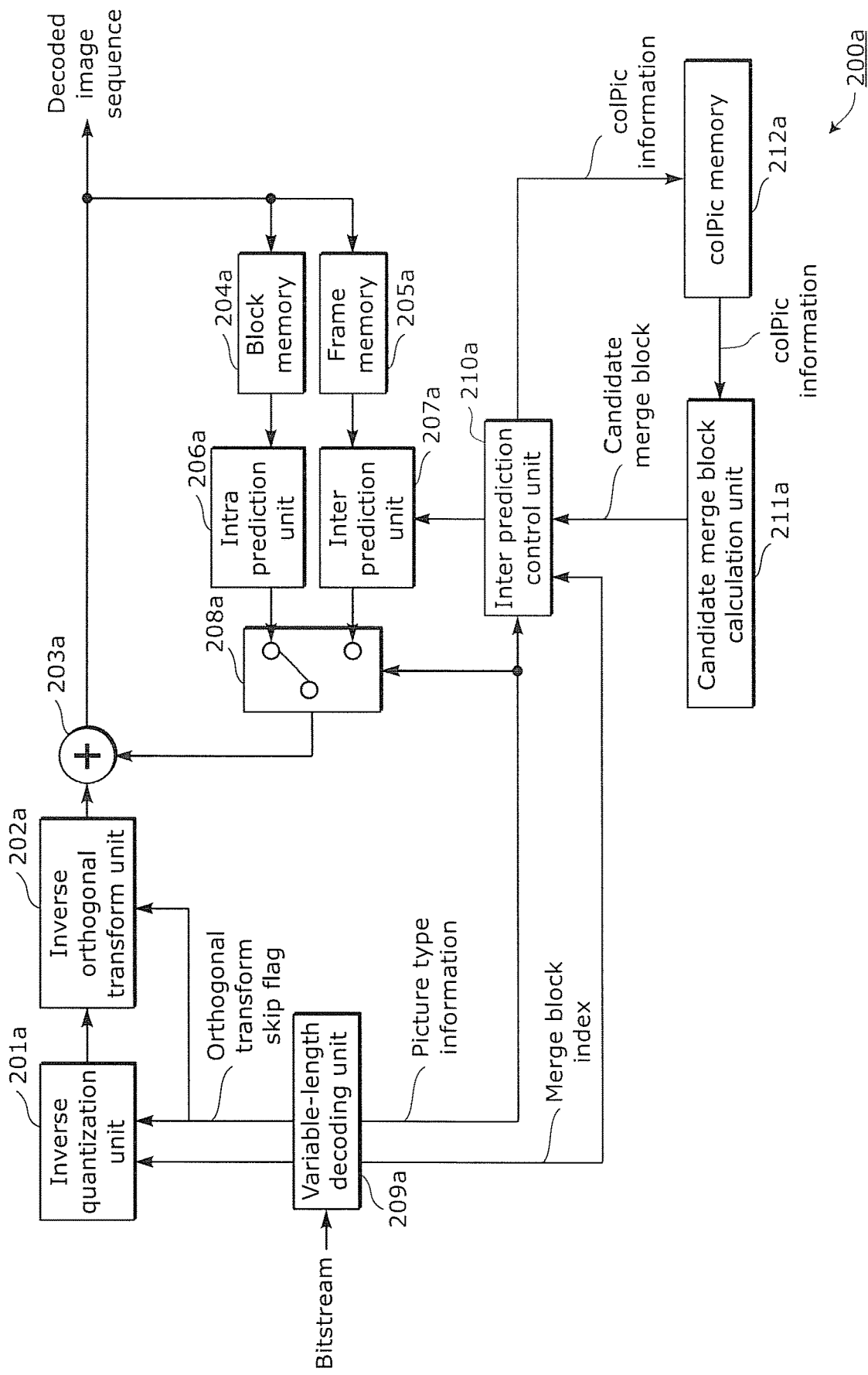
FIG. 19 is a block diagram illustrating a structure of a moving picture decoding apparatus that uses a moving picture decoding method according to Embodiment 4.

FIG. 19 is a block diagram illustrating a structure of a moving picture decoding apparatus that uses a moving picture decoding method according to this embodiment.

A moving picture decoding apparatus 200a includes, as illustrated in FIG. 19, a variable-length decoding unit 209a, an inverse quantization unit 201a, an inverse orthogonal transform unit 202a, an adder 203a, a block memory 204a, a frame memory 205a, an intra prediction unit 206a, an inter prediction unit 207a, a switch 208a, an inter prediction control unit 210a, a candidate merge block calculation unit 211a, and a colPic memory 212a.

The variable-length decoding unit 209a performs a variable-length decoding process on an input bitstream to generate an orthogonal transform skip flag, picture type information, and a quantized coefficient. Furthermore, the variable-length decoding unit 209a calculates a size of the list of the candidate merge blocks and performs a variable-length decoding process on a merge block index.

The inverse quantization unit 201a performs, according to a value of the orthogonal transform skip flag, an inverse quantization process on the quantized coefficient resulting from the variable-length decoding process. In other words, the inverse quantization process is performed on the quantized coefficient included in coefficient data resulting from the quantization process. The inverse orthogonal transform unit 202a generates a decoded prediction residual including the inverse orthogonal transform coefficient, by transforming, from the frequency domain to the image domain, the coefficient data resulting from the inverse quantization process and including the quantized coefficient, according to a value of the orthogonal transform skip flag. The adder 203a generates a reconstructed image by adding up the decoded prediction residual and the prediction image. This reconstructed image is output from the moving picture decoding apparatus 200a as a decoded image sequence.

The block memory 204a stores the reconstructed image as a reference image per block. The frame memory 205a stores the reconstructed image as a reference image per frame. The intra prediction unit 206a performs intra prediction using the per-block reference image stored in the block memory 204a, thereby generating a prediction image of a current block to be decoded. The inter prediction unit 207a performs inter prediction using the per-frame reference image stored in the frame memory 205a, thereby generating a prediction image of the current block.

The switch 208a switches, based on the picture type information generated by the variable-length decoding unit 209a, the prediction image that is to be output to the adder 203a, between the prediction image generated by the intra prediction unit 206a and the prediction image generated by the inter prediction unit 207a.

The candidate merge block calculation unit 211a derives a candidate merge block in a merge mode by using an adjacent block of the current block and colPic information, such as a motion vector of a co-located block, stored in the colPic memory 212a. Furthermore, the candidate merge block calculation unit 211a assigns a value of a merge block index to each candidate merge block derived and sends the candidate merge bock to the inter prediction control unit 210a.

The inter prediction control unit 210a decodes information on a motion vector detection mode or the merge mode and causes the inter prediction unit 207a to generate a prediction image. Furthermore, the inter prediction control unit 210a transfers colPic information including a motion vector of the current block to the colPic memory 212a.

Figure 20:
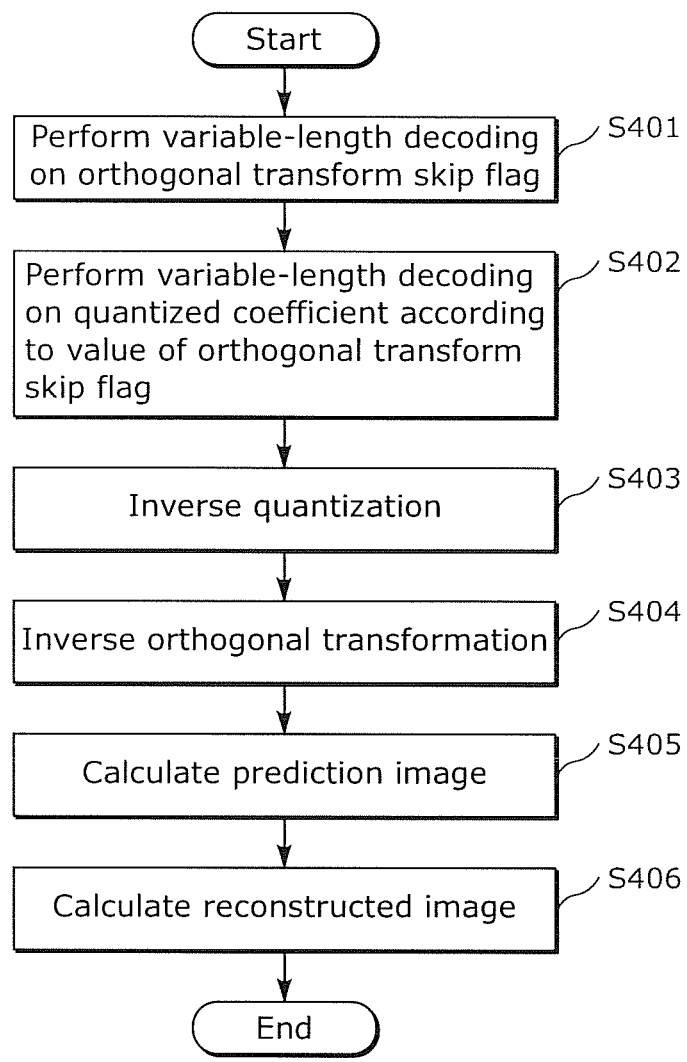
FIG. 20 is a flowchart illustrating an outline process of a moving picture decoding method according to Embodiment 4.

FIG. 20 is a flowchart illustrating an outline process of a moving picture decoding method according to this embodiment.

In Step S401, variable-length decoding is performed on the orthogonal transform skip flag in the same or like manner as in Step S201 of FIG. 10. In Step S402, variable-length decoding is performed on the quantized coefficient while the scan order for the quantized coefficients is adaptively changed according to the orthogonal transform skip flag in the hereinafter-described manner. In Step S403, the inverse quantization process is performed on the quantized coefficient according to a value of the orthogonal transform skip flag in the same or like manner as in Step S308 of FIG. 13, with the result that an inverse quantized coefficient is calculated. In Step S404, the inverse orthogonal transform process is applied to the inverse quantized coefficient according to the orthogonal transform skip flag in the same or like manner as in Step S309 of FIG. 13, with the result that an inverse orthogonal transform coefficient is calculated. In Step S405, the prediction image of the current block is calculated in the same or like manner as in Step S301 of FIG. 13. For example, in the case of decoding the current block in the intra prediction mode, a prediction image is generated using a reference pixel adjacent to the current block. In the case of the inter prediction mode, a prediction image is generated using a value of a pixel in a reference block that is specified by the decoded motion vector and is located inside a reference picture that is a decoded picture different from a current picture to be decoded. In Step S406, the prediction image calculated in Step S405 and the decoded prediction residual including the inverse orthogonal transform coefficient calculated in Step S404 are added up, with the result that a reconstructed image is calculated.

Figure 21:
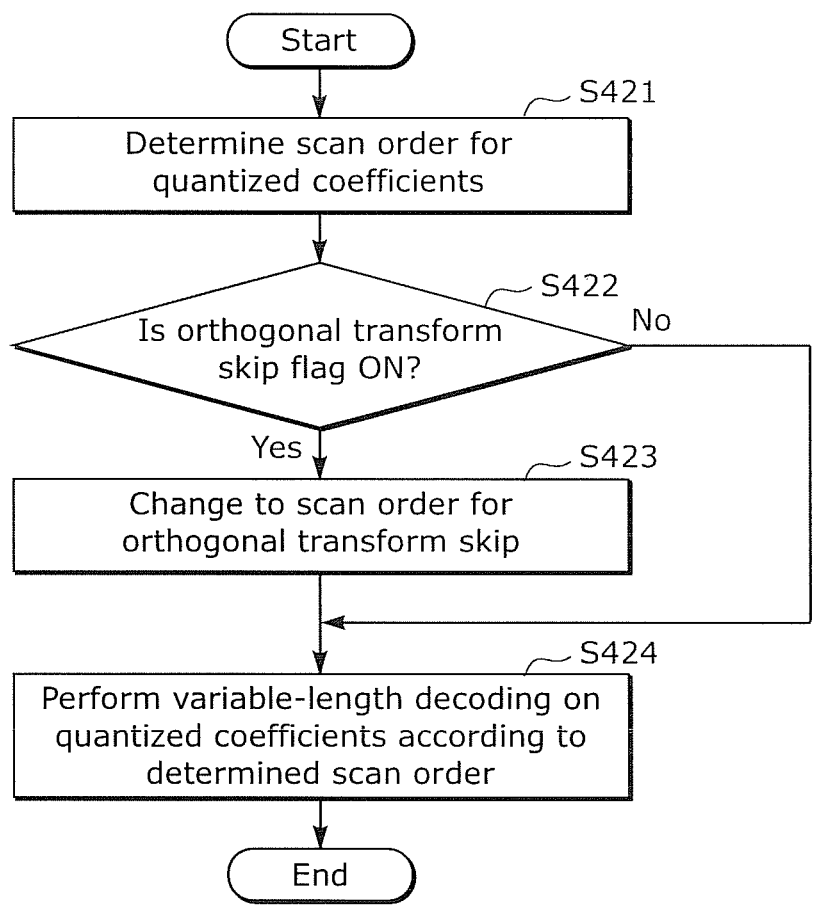
FIG. 21 is a flowchart illustrating a detailed process of Step S402 of FIG. 20 according to Embodiment 4.

FIG. 21 is a flowchart illustrating a detailed process of Step S402 of FIG. 20. Specifically, FIG. 21 is a flowchart illustrating a method of performing variable-length decoding on the quantized coefficient according to the orthogonal transform skip flag. The following explains FIG. 21.

In Step S421, the scan order for the quantized coefficients of the current block, that is applied in performing variable-length decoding thereon, is determined in the same or like manner as in Step S321 of FIG. 14. Here, the scan order represents the order for the quantized coefficients of the current block that is applied in performing variable-length decoding thereon. In Step S422, whether or not the orthogonal transform skip flag is ON, that is, this flag has a value of 1, is determined, and when this is true (Yes), the scan order determined in Step S421 is changed to a scan order for orthogonal transform skip in Step S423 in the same or like manner as in Step S323 of FIG. 14. In Step S424, variable-length decoding is performed on the quantized coefficients according to the determined scan order.

It should be noted that although the scan order is once determined in Step S421 and when the orthogonal transform skip flag is ON, then is changed to the scan order for orthogonal transform skip in Step S423 in this embodiment, this sequence is not necessarily the only example. For example, in the case where the orthogonal transform skip flag is ON when determining the scan order in Step S421, the scan order for orthogonal transform skip may be directly determined to be applied. Thus, the scan order for orthogonal transform skip is applied when the orthogonal transform skip flag is ON, that is, this flag has a value of 1, with the result that a bitstream obtained with increased coding efficiency can be appropriately decoded.

Thus, according to this embodiment, it is possible to appropriately decode a bitstream obtained with increased coding efficiency, by changing the scan order to the scan order for orthogonal transform skip when the orthogonal transform skip flag is ON and the quantization using the quantization matrix is not applied. More specifically, when the scan order determined in Step S421 of FIG. 21 is the horizontal scan, that is, the prediction direction in the intra prediction is included in the vertical prediction mode group in the case where the orthogonal transform skip flag is ON and the quantization using the quantization matrix is not applied, a change is made to use the vertical scan as the scan order for orthogonal transform skip. When the scan order determined in Step S421 of FIG. 21 is the vertical scan, that is, the prediction direction in the intra prediction is included in the horizontal prediction mode group, a change is made to use the horizontal scan as the scan order for orthogonal transform skip. This makes it possible to appropriately decode a bitstream obtained with increased coding efficiency.

Although the moving picture encoding method and the moving picture decoding method according to one or more aspects of the inventive concepts have been described above, the present disclosure is to be considered descriptive and illustrative only. Those skilled in the art will readily appreciate that the present disclosure is intended to cover and encompass not only the particular embodiments disclosed, but also equivalent structures, methods, and/or uses which are obtained by making various modifications in the embodiments and by arbitrarily combining the structural elements in the embodiments, without materially departing from the principles and spirit of the inventive concept.

Figure 22A:
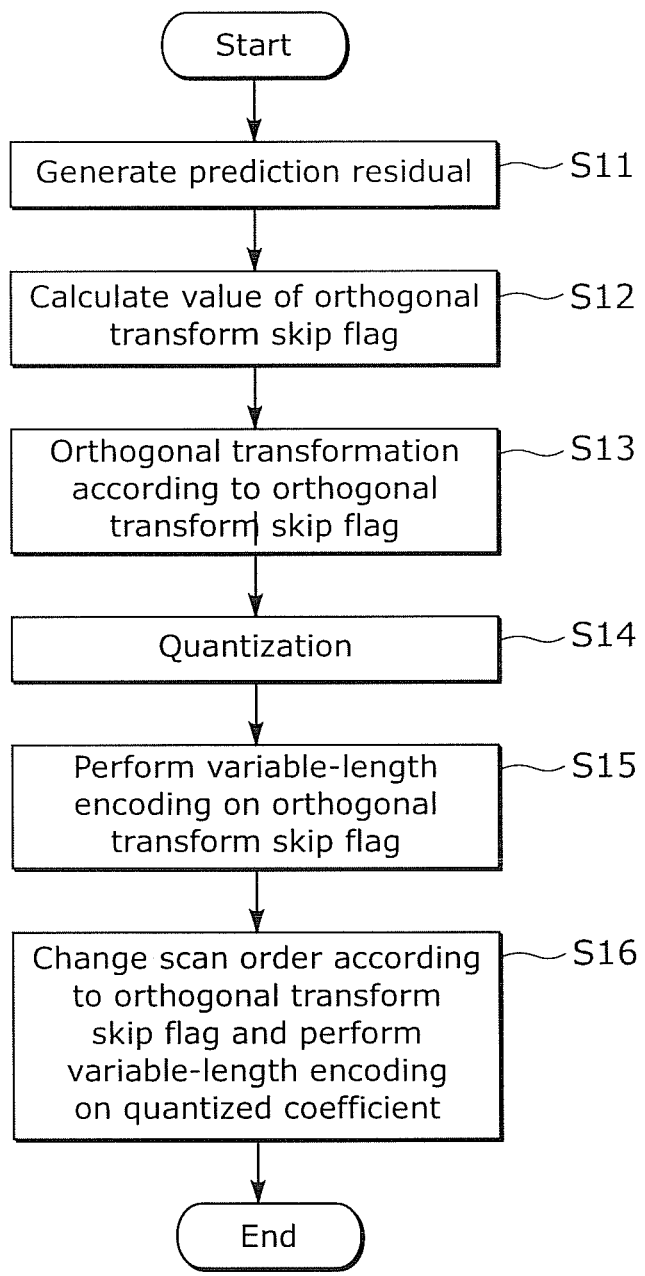
FIG. 22A is a flowchart illustrating a moving picture encoding method according to an aspect of the present disclosure.

FIG. 22A is a flowchart illustrating a moving picture encoding method according to an aspect of the present disclosure.

The moving picture encoding method according to an aspect of the present disclosure is to encode a moving picture per block and includes Steps S11 to S16. Specifically, this moving picture encoding method is a moving picture includes: Step S11 of generating a prediction image of a current block to be encoded, using a reference block that is adjacent to the current block or included in a reference picture different from a current picture to be encoded, and generating a prediction residual which is a difference between the current block and the prediction image; Step S12 of determining whether or not to apply orthogonal transformation to the prediction residual, to calculate a value of an orthogonal transform skip flag; Step S13 of performing the orthogonal transformation on the prediction residual according to the value of the orthogonal transform skip flag, to calculate at least one orthogonal transform coefficient; Step S14 of performing quantization on the at least one orthogonal transform coefficient, to calculate at least one quantized coefficient; Step S15 of performing variable-length encoding on the orthogonal transform skip flag; and Step S16 of changing a scan order for the at least one quantized coefficient according to the value of the orthogonal transform skip flag, and performing variable-length encoding on the at least one quantized coefficient in the scan order after the change.

Figure 22B:
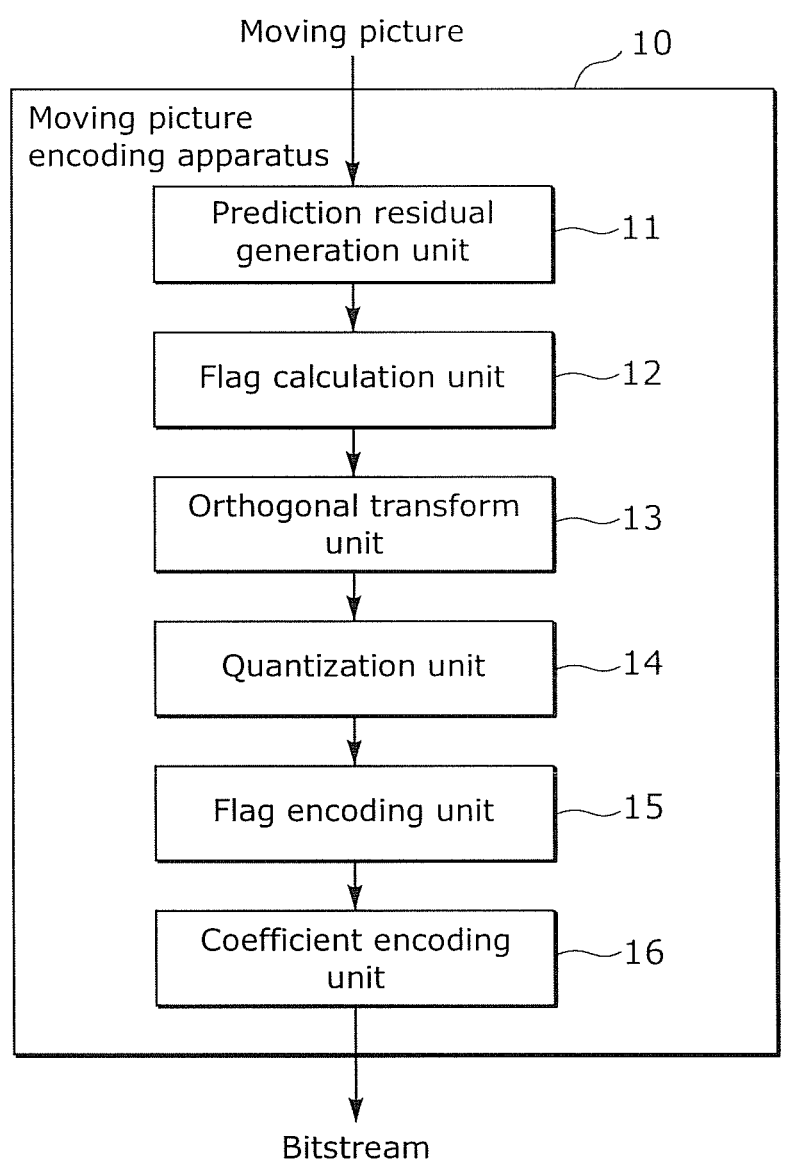
FIG. 22B is a block diagram illustrating a moving picture encoding apparatus according to an aspect of the present disclosure.

FIG. 22B is a block diagram illustrating a moving picture encoding apparatus according to an aspect of the present disclosure.

According to an exemplary embodiment disclosed herein, a moving picture encoding apparatus 10 encodes a moving picture per block and includes structural elements 11 to 16. Specifically, this moving picture encoding apparatus 10 includes: a prediction residual generation unit 1 configured to generate a prediction image of a current block to be encoded, using a reference block that is adjacent to the current block or included in a reference picture different from a current picture to be encoded, and generate a prediction residual which is a difference between the current block and the prediction image; a flag calculation unit 12 configured to determine whether or not to apply orthogonal transformation to the prediction residual, to calculate a value of an orthogonal transform skip flag; an orthogonal transform unit 13 configured to perform the orthogonal transformation on the prediction residual according to the value of the orthogonal transform skip flag, to calculate at least one orthogonal transform coefficient; a quantization unit 14 configured to perform quantization on the at least one orthogonal transform coefficient, to calculate at least one quantized coefficient; a flag encoding unit 15 configured to perform variable-length encoding on the orthogonal transform skip flag; and a coefficient encoding unit 16 configured to change a scan order for the at least one quantized coefficient according to the value of the orthogonal transform skip flag, and perform variable-length encoding on the at least one quantized coefficient in the scan order after the change.

Accordingly, in the moving picture encoding method and the moving picture encoding apparatus according to an aspect of the present disclosure, the orthogonal transformation is performed according to a value of the orthogonal transform skip flag, which means that switching between applying and not applying the orthogonal transformation can be performed, and furthermore, the scan order for the quantized coefficients is changed according to a value of the orthogonal transform skip flag, which means that appropriate variable-length encoding can be performed on the quantized coefficients. As a result, coding efficiency can be increased.

It should be noted that although the quantization or the inverse quantization is performed according to a value of the orthogonal transform skip flag in the above embodiments, the quantization or the inverse quantization may be performed regardless of a value of the orthogonal transform skip flag. Even in this case, it is possible to produce the same or like advantageous effect as the above-described advantageous effect.

Figure 22C:
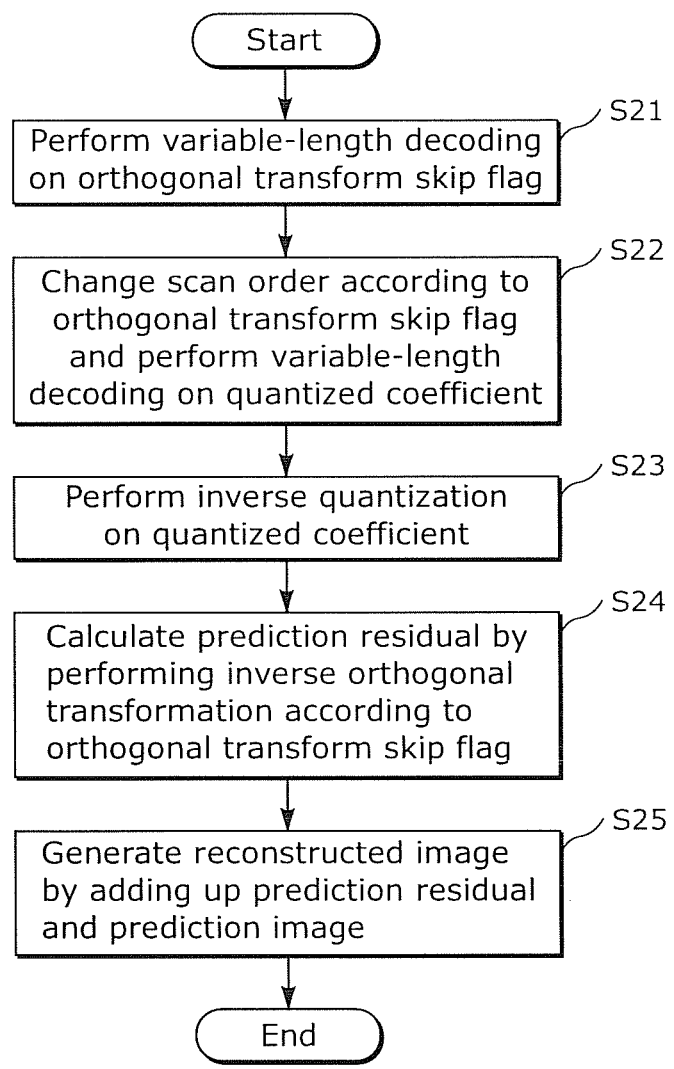
FIG. 22C is a flowchart illustrating a moving picture decoding method according to an aspect of the present disclosure.

FIG. 22C is a flowchart illustrating a moving picture decoding method according to an aspect of the present disclosure.

According to an exemplary embodiment disclosed herein, a moving picture decoding method is to decode an encoded moving picture per block and includes Steps S21 to S25. Specifically, this moving picture decoding method includes: S21 of performing variable-length decoding on an orthogonal transform skip flag indicating whether or not to apply inverse orthogonal transformation to a current block to be decoded; S22 of changing a scan order for at least one quantized coefficient included in the current block, according to a value of the orthogonal transform skip flag, and performing variable-length decoding on the at least one quantized coefficient in the scan order after the change; S23 of performing inverse quantization on the at least one quantized coefficient after the variable-length decoding, to calculate at least one inverse quantized coefficient; S24 of performing inverse orthogonal transformation on the at least one inverse quantized coefficient according to the value of the orthogonal transform skip flag, to calculate a prediction residual of the current block; and S25 of generating a prediction image of the current block using a reference block that is adjacent to the current block or included in a reference picture different from a current picture to be decoded, and generating a reconstructed image by adding up the prediction residual and the prediction image.

Figure 22D:
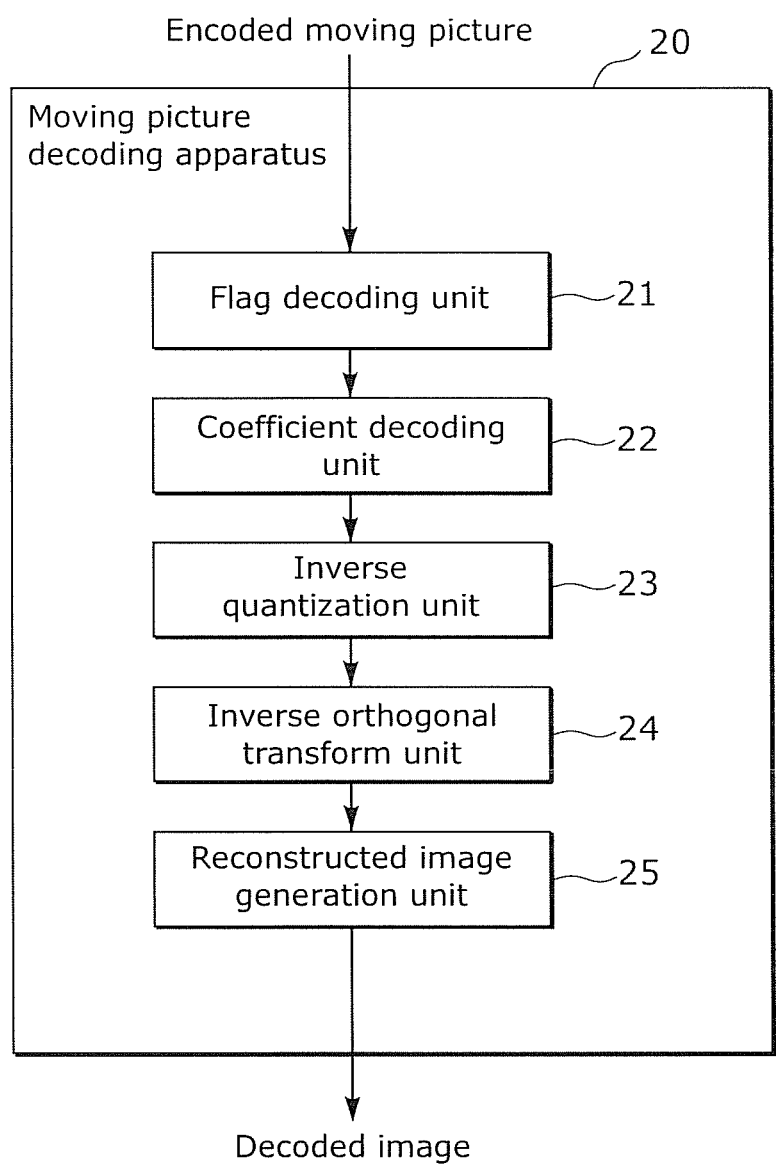
FIG. 22D is a block diagram illustrating a moving picture decoding apparatus according to an aspect of the present disclosure.

FIG. 22D is a block diagram illustrating a moving picture decoding apparatus according to an aspect of the present disclosure.

According to an exemplary embodiment disclosed herein, a moving picture decoding apparatus 20 decodes an encoded moving picture per block and includes structural elements 21 to 25. Specifically, this moving picture encoding apparatus 20 includes: a flag decoding unit 21 configured to perform variable-length decoding on an orthogonal transform skip flag indicating whether or not to apply inverse orthogonal transformation to a current block to be decoded; a coefficient decoding unit 22 configured to change a scan order for at least one quantized coefficient included in the current block, according to a value of the orthogonal transform skip flag, and perform variable-length decoding on the at least one quantized coefficient in the scan order after the change; an inverse quantization unit 23 configured to perform inverse quantization on the at least one quantized coefficient after the variable-length decoding, to calculate at least one inverse quantized coefficient; an inverse orthogonal transform unit 24 configured to perform inverse orthogonal transformation on the at least one inverse quantized coefficient according to the value of the orthogonal transform skip flag, to calculate a prediction residual of the current block; and a reconstructed image generation unit 25 configured to generate a prediction image of the current block using a reference block that is adjacent to the current block or included in a reference picture different from a current picture to be decoded, and generate a reconstructed image by adding up the prediction residual and the prediction image.

Accordingly, in the moving picture decoding method and the moving picture decoding apparatus according to an aspect of the present disclosure, the inverse orthogonal transformation is performed according to a value of the orthogonal transform skip flag, which means that switching between applying and not applying the inverse orthogonal transformation can be performed, and furthermore, the scan order for the quantized coefficients is changed according to a value of the orthogonal transform skip flag, which means that appropriate variable-length decoding can be performed on the quantized coefficients. As a result, it is possible to appropriately decode a bitstream of encoded moving pictures with increased encoding efficiency.

It should be noted that although the inverse quantization is performed according to a value of the orthogonal transform skip flag in the above embodiments, the inverse quantization may be performed regardless of a value of the orthogonal transform skip flag. Even in this case, it is possible to produce the same or like advantageous effect as the above-described advantageous effect.

Each of the structural elements in each of the above embodiments may be configured in the form of dedicated hardware, or may be realized by executing a software program suitable for the structural element. Each of the structural elements may be realized by means of a program executing unit, such as a CPU and a processor, reading and executing the software program recorded on a recording medium such as a hard disk or a semiconductor memory.

In other words, the moving picture encoding apparatus and the moving picture decoding apparatus include control circuitry and storage electrically connected to the control circuitry (i.e., accessible by the control circuitry). The control circuitry includes at least one of dedicated hardware and a program executing unit. In the case where the control circuitry includes the program executing unit, the storage stores a software program that is executed by the program executing unit. Here, software that realizes the moving picture encoding apparatus in each of the above embodiments is a program that causes a computer to execute Steps S11 to S16 in the flowchart of FIG. 22A. Software that realizes the moving picture decoding apparatus in each of the above embodiments is a program that causes a computer to execute Steps S21 to S25 in the flowchart of FIG. 22C.

Embodiment 5

The processing described in each of the above embodiments can be simply implemented in an independent computer system, by recording, in a recording medium, one or more programs for implementing the configurations of the moving picture encoding method (image encoding method) and the moving picture decoding method (image decoding method) described in each of the above embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of the above embodiments and systems using thereof will be described. The system has a feature of having an image encoding apparatus that includes an image encoding apparatus using the image encoding method and an image decoding apparatus using the image decoding method. Other configurations in the system can be changed as appropriate depending on the cases.

Figure 23:
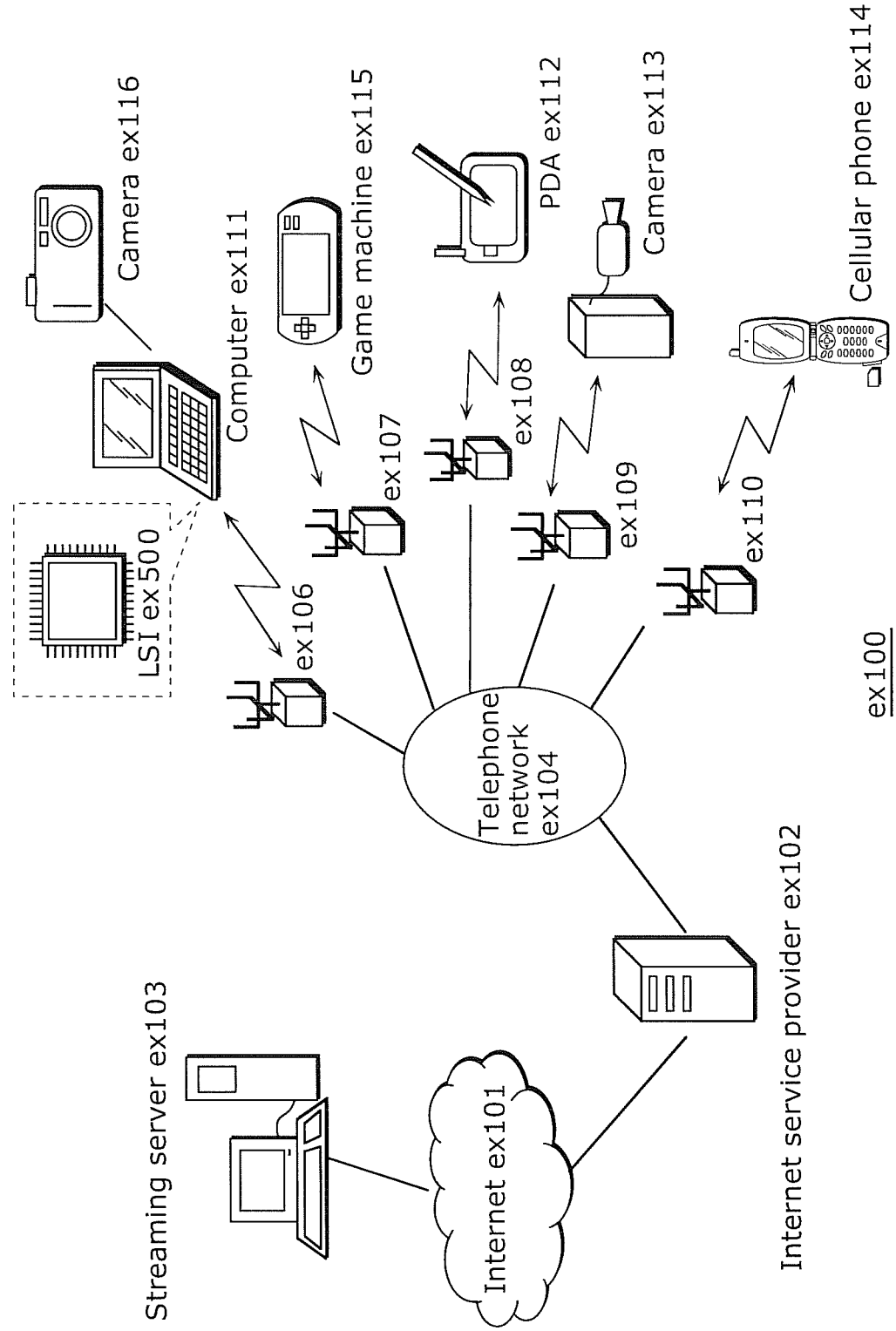
FIG. 23 shows an overall configuration of a content providing system for implementing content distribution services.

FIG. 23 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 23, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of the above embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 24:
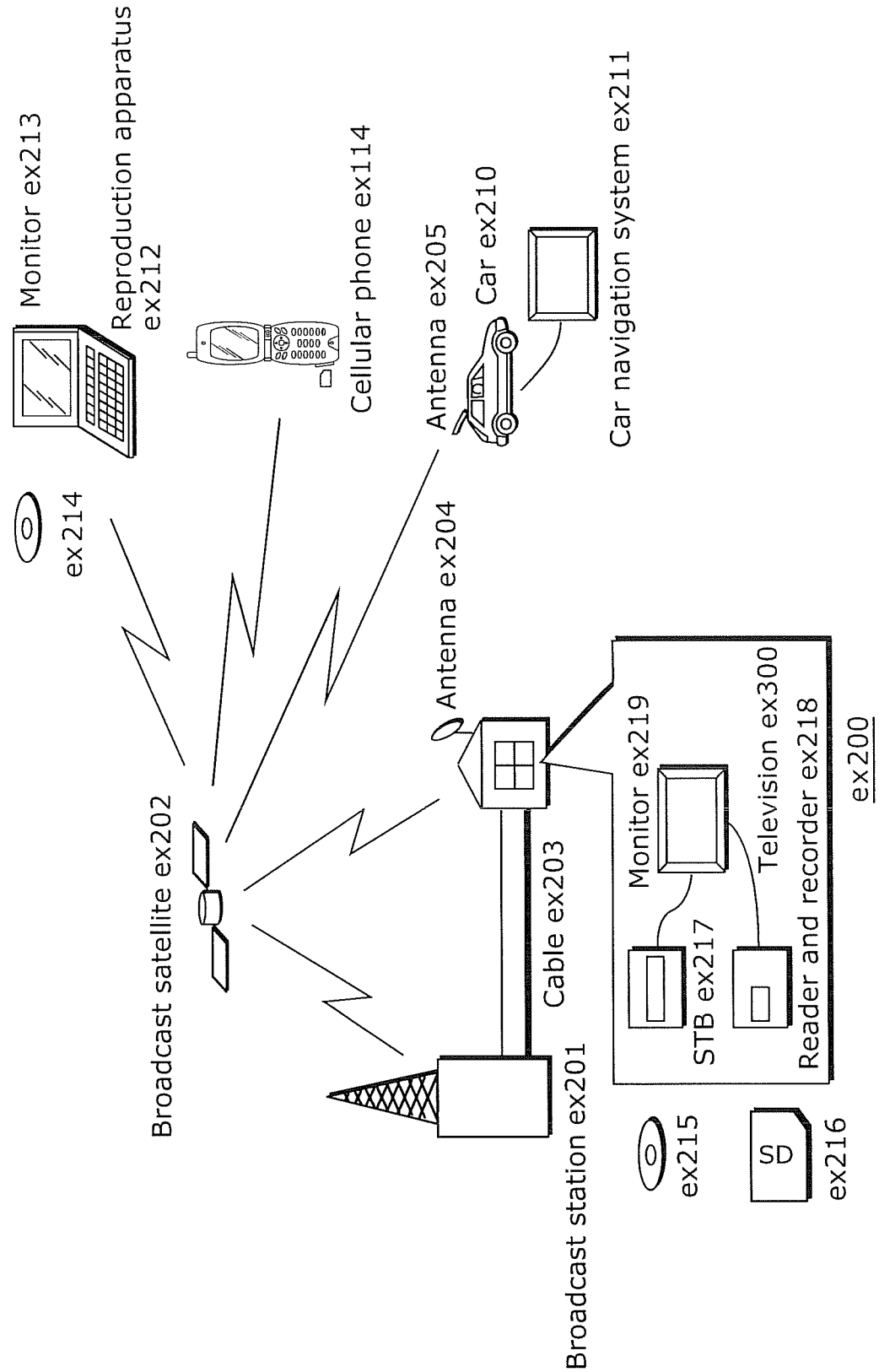
FIG. 24 shows an overall configuration of a digital broadcasting system.

Aside from the example of the content providing system ex100, at least one of the moving picture encoding apparatus (image encoding apparatus) and the moving picture decoding apparatus (image decoding apparatus) described in each of the above embodiments may be implemented in a digital broadcasting system ex200 illustrated in FIG. 24. More specifically, a broadcast station ex201 communicates or transmits, via radio waves to a broadcast satellite ex202, multiplexed data obtained by multiplexing audio data and others onto video data. The video data is data encoded by the moving picture encoding method described in each of the above embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (ii) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of the above embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 25:
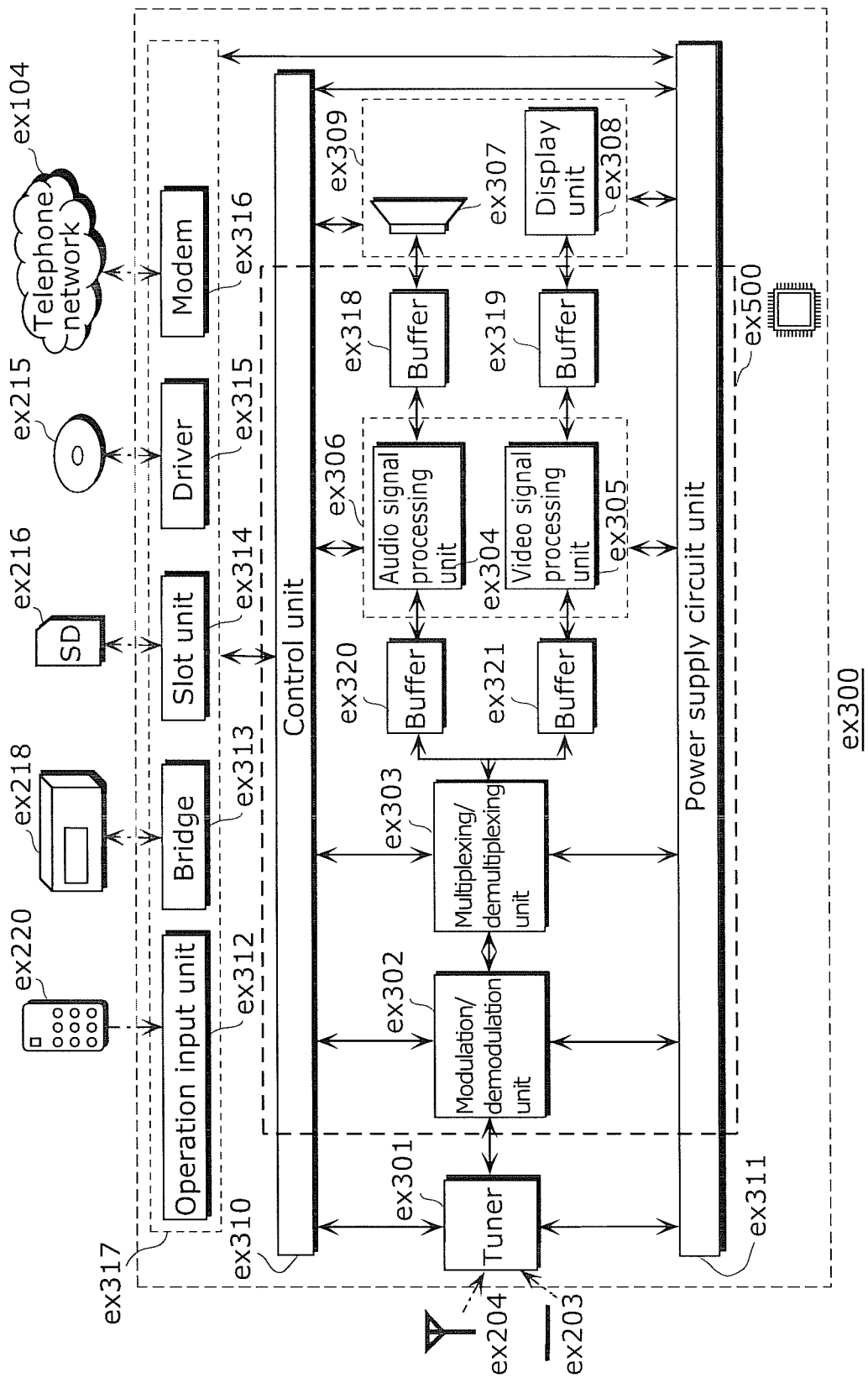
FIG. 25 is a block diagram illustrating an example of a configuration of a television.

FIG. 25 illustrates the television (receiver) ex300 that uses the moving picture encoding method and the moving picture decoding method described in each of the above embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image encoding apparatus or the image decoding apparatus according to an aspect of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of the above embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of the above embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, other than that illustrated, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 26:
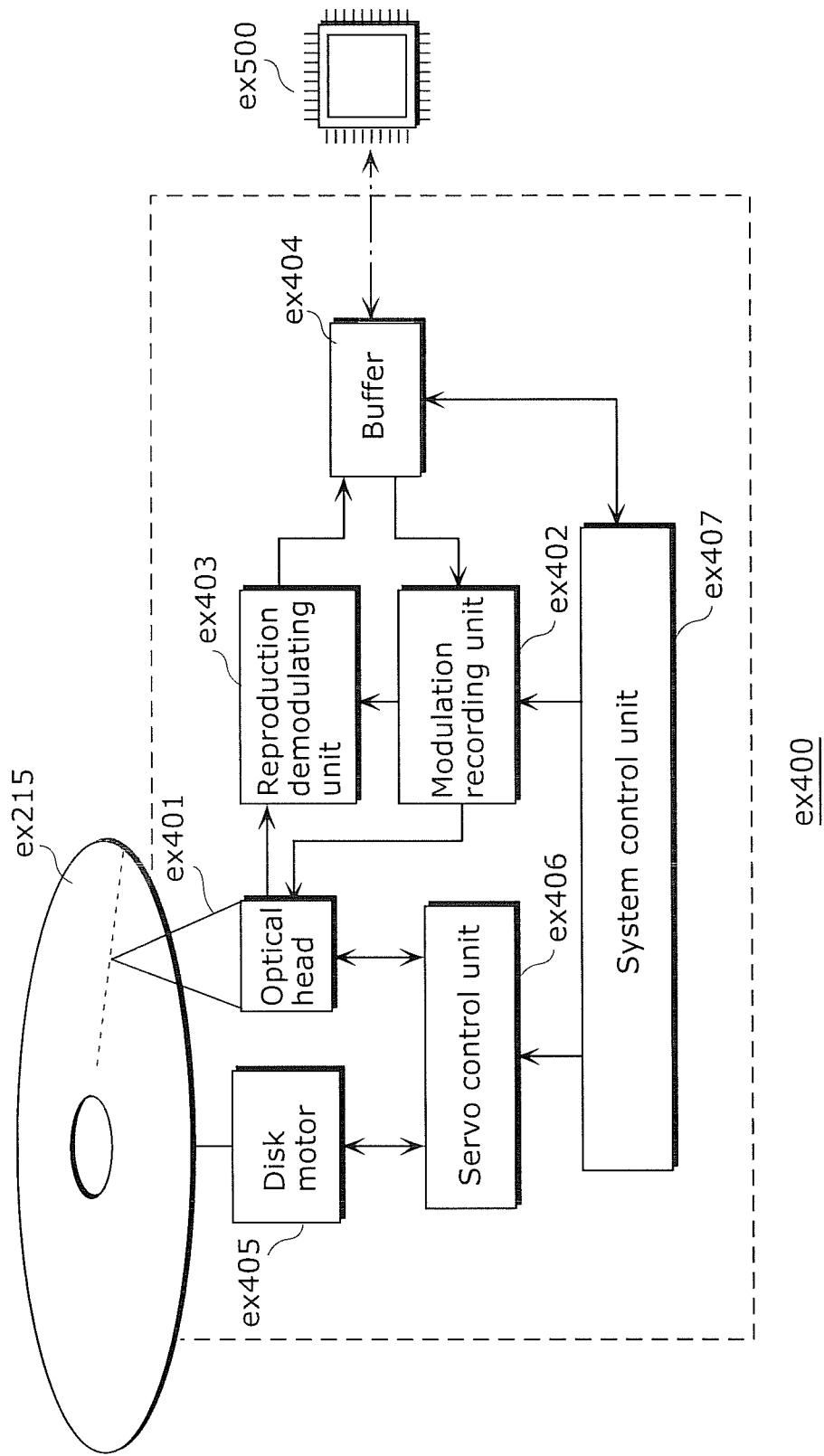
FIG. 26 is a block diagram illustrating an example of a configuration of an information reproducing/recording unit that reads and writes information from and on a recording medium that is an optical disk.

As an example, FIG. 26 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
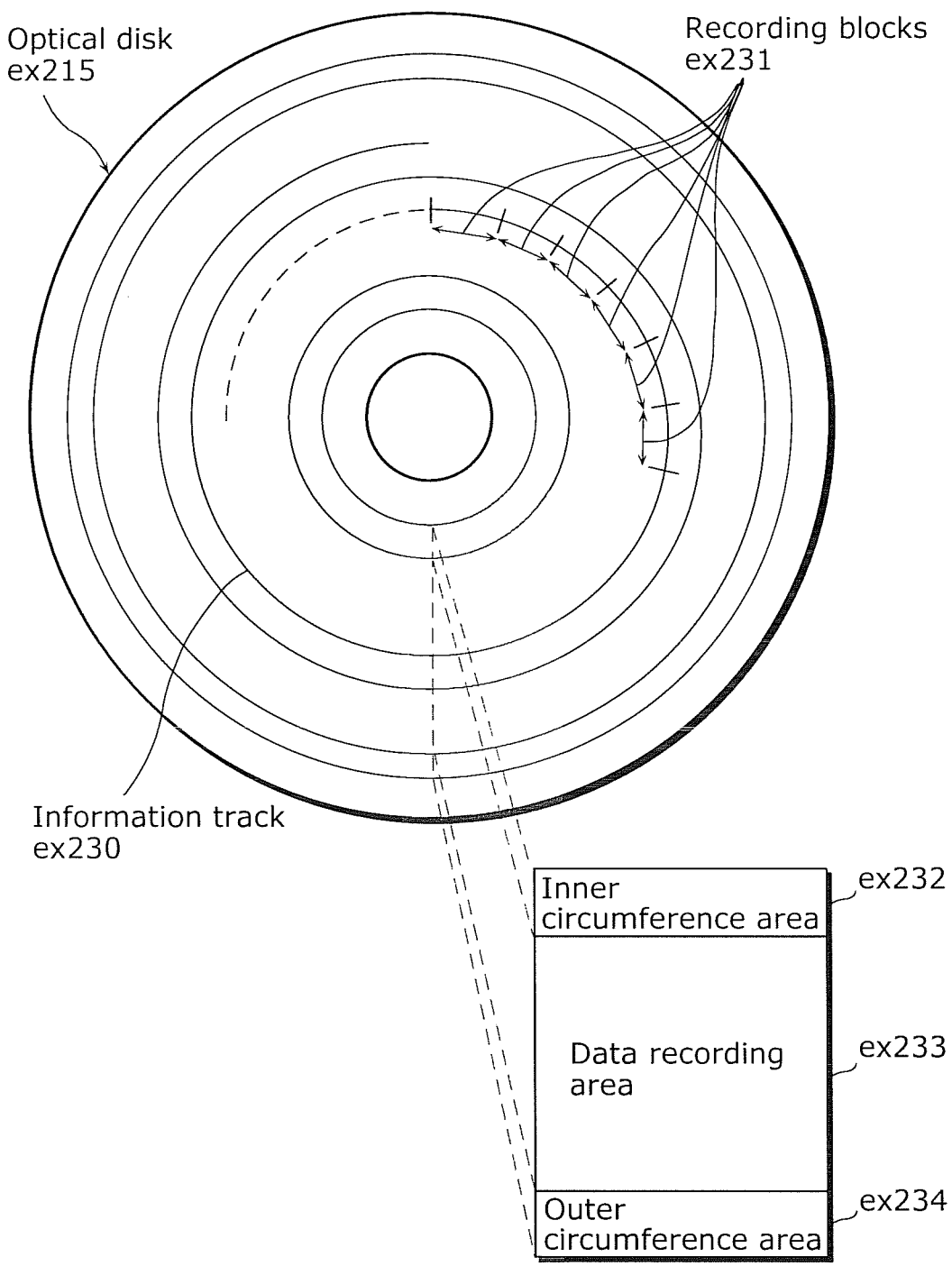
FIG. 27 shows an example of a configuration of a recording medium that is an optical disk.

FIG. 27 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit in the configuration illustrated in FIG. 25. The same will be true for the configuration of the computer ex111, the cellular phone ex114, and others.

Figure 28A:
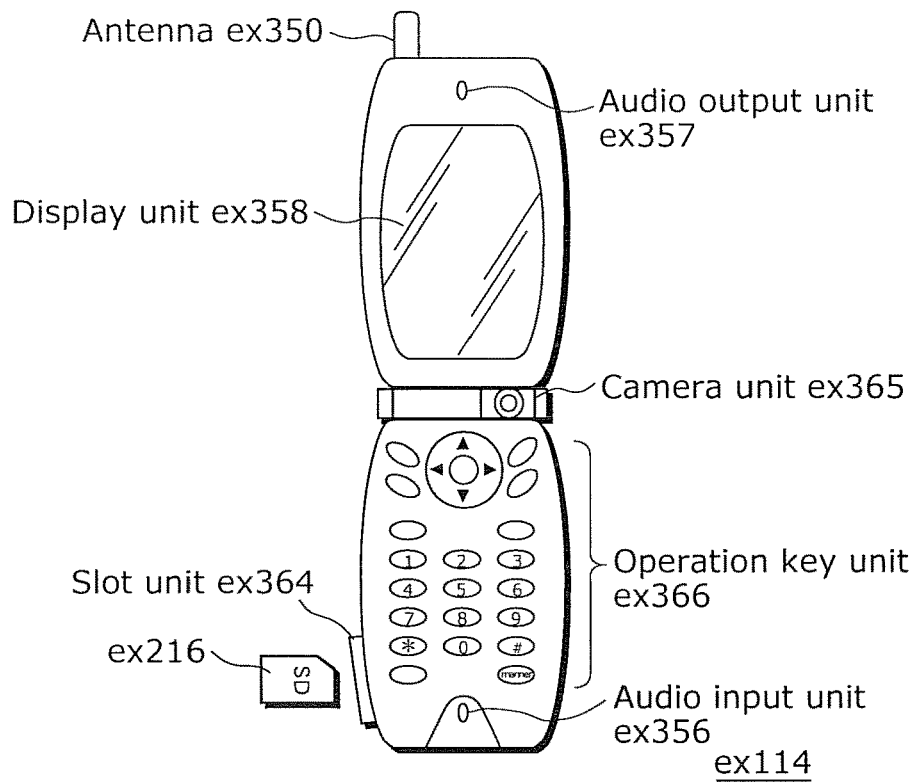
FIG. 28A shows an example of a cellular phone.

FIG. 28A illustrates the cellular phone ex114 that uses the moving picture encoding method and the moving picture decoding method described in the above embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 28B:
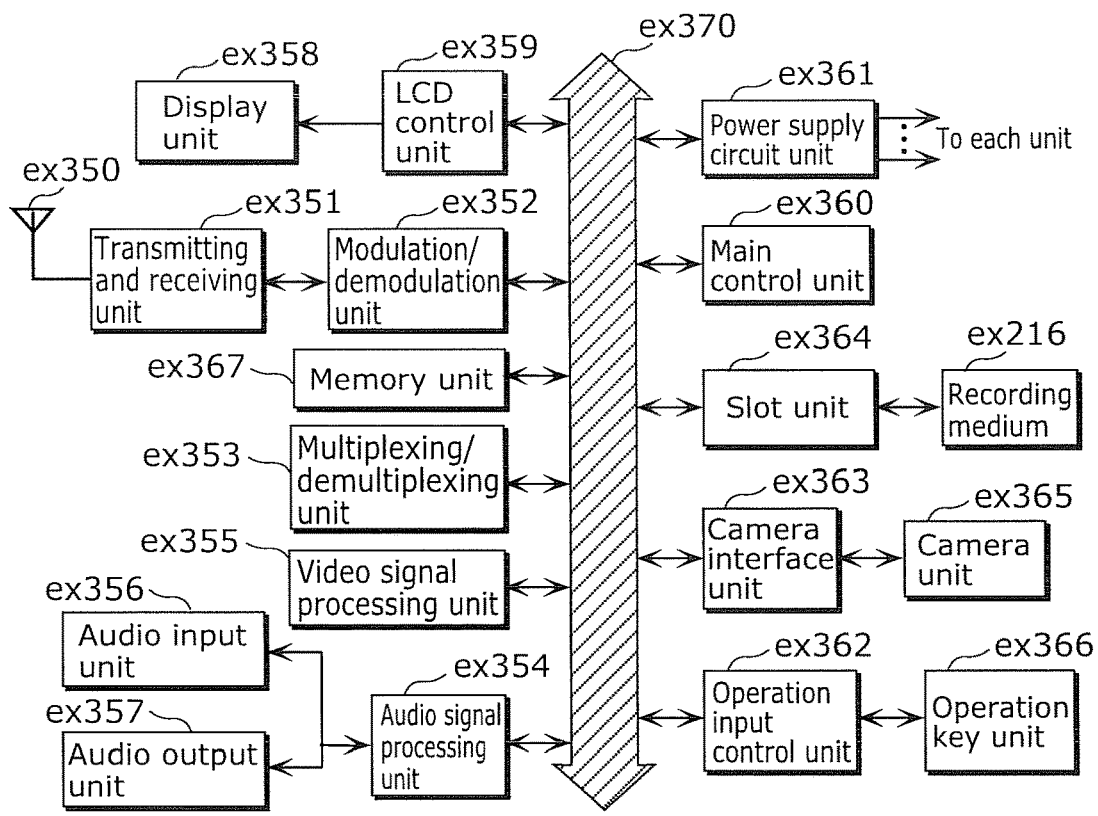
FIG. 28B is a block diagram illustrating an example of a configuration of a cellular phone.

Next, an example of a configuration of the cellular phone ex114 will be described with reference to FIG. 28B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of the above embodiments (i.e., functions as the image encoding apparatus according to an aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of the above embodiments (i.e., functions as the image decoding apparatus according to an aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture encoding method or the moving picture decoding method in each of the above embodiments can be used in any of the devices and systems described. Thus, the advantages described in each of the above embodiments can be obtained.

Furthermore, various modifications and revisions can be made in any of the above embodiments in the present disclosure.

Embodiment 6

Video data can be generated by switching, as necessary, between (i) the moving picture encoding method or the moving picture encoding apparatus shown in each of the above embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of the above embodiments will be hereinafter described. The multiplexed data is a digital stream in the MPEG-2 Transport Stream format.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of the above embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 30:
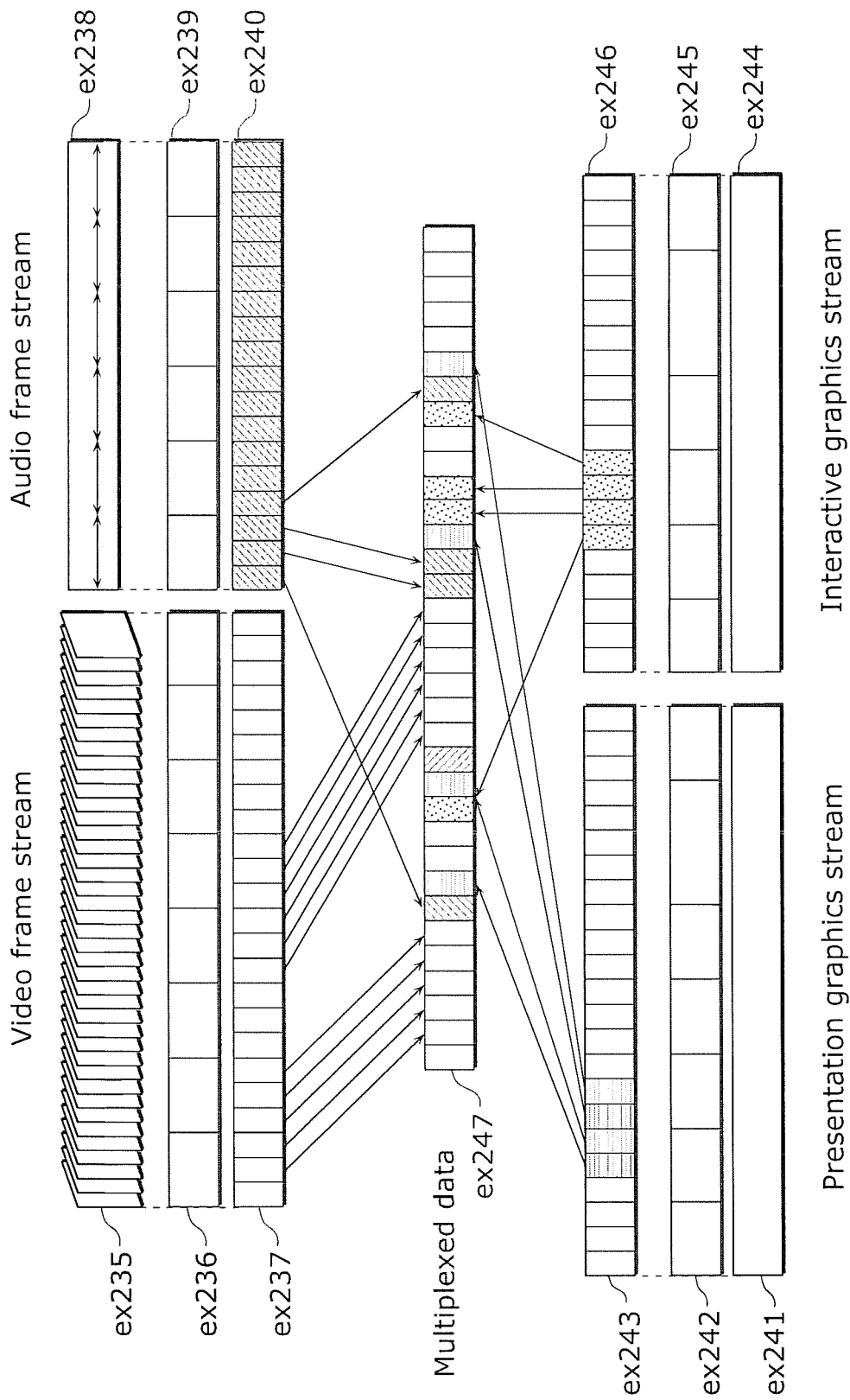
FIG. 30 schematically shows how each stream is multiplexed in multiplexed data.

FIG. 30 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 31:
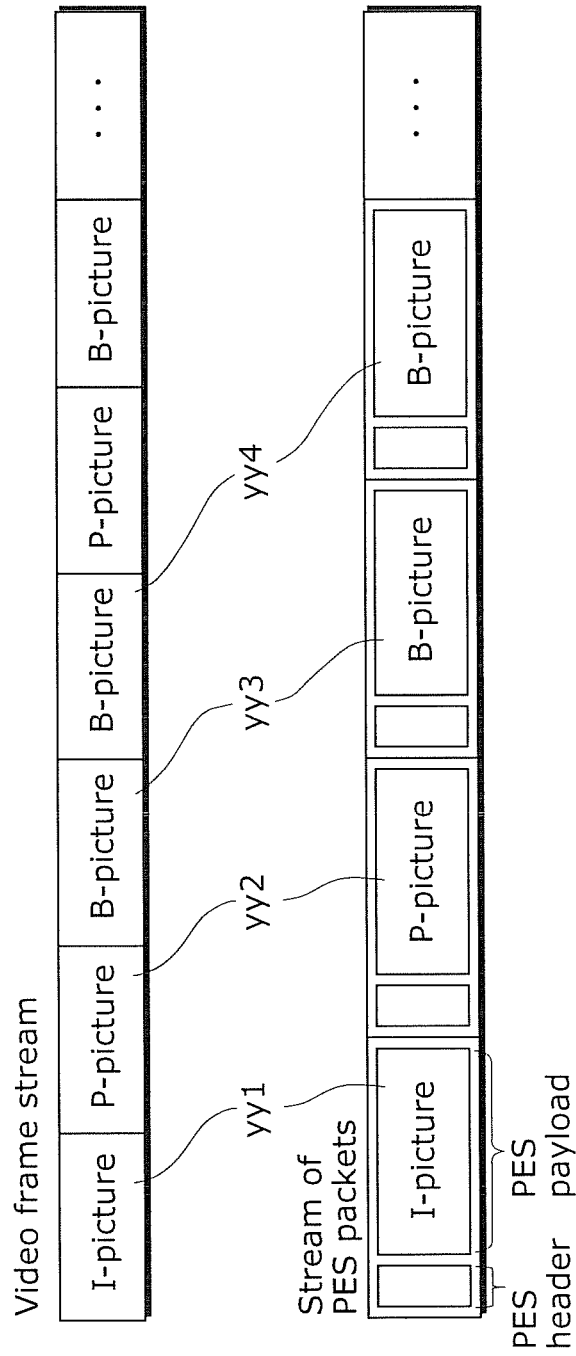
FIG. 31 shows how a video stream is stored in a stream of PES packets in more detail.

FIG. 31 illustrates how a video stream is stored in a stream of PES packets in more detail. The first bar in FIG. 31 shows a video frame stream in a video stream. The second bar shows the stream of PES packets. As indicated by arrows denoted as yy1, yy2, yy3, and yy4 in FIG. 31, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 32:
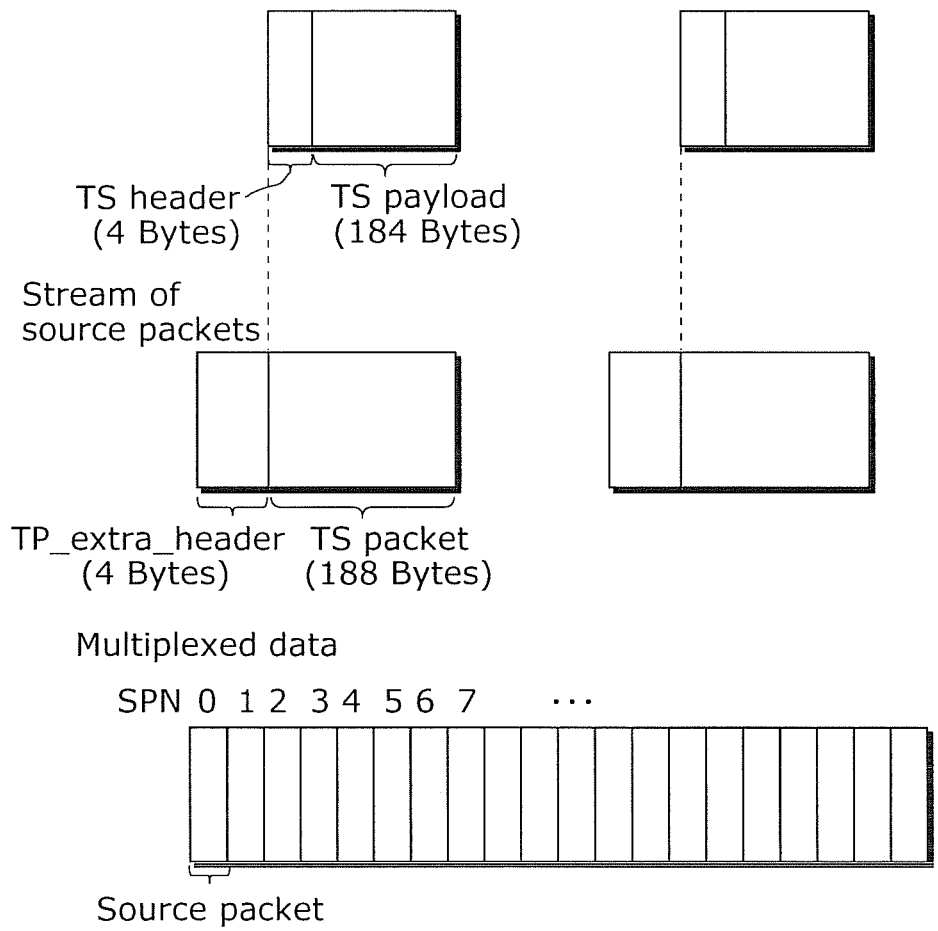
FIG. 32 shows a structure of TS packets and source packets in the multiplexed data.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 33:
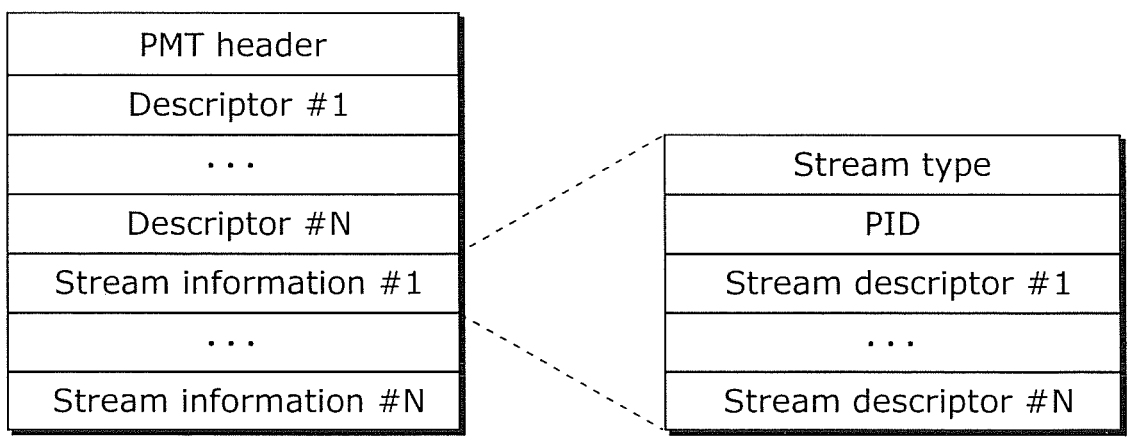
FIG. 33 shows a data structure of a PMT.

FIG. 33 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 34:
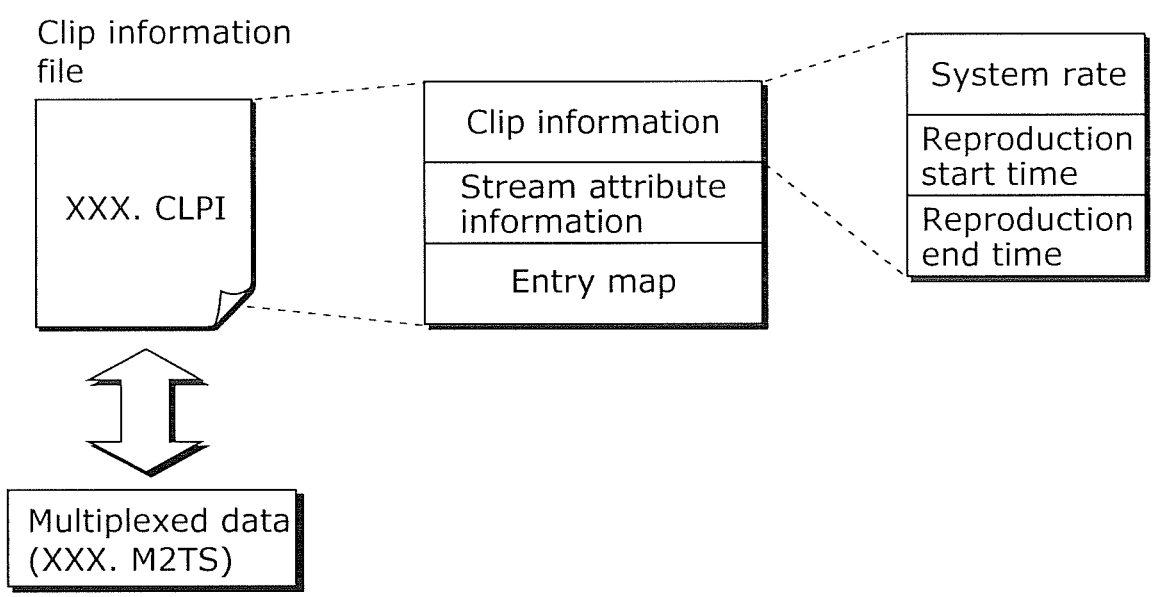
FIG. 34 shows an internal structure of multiplexed data information.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 35:
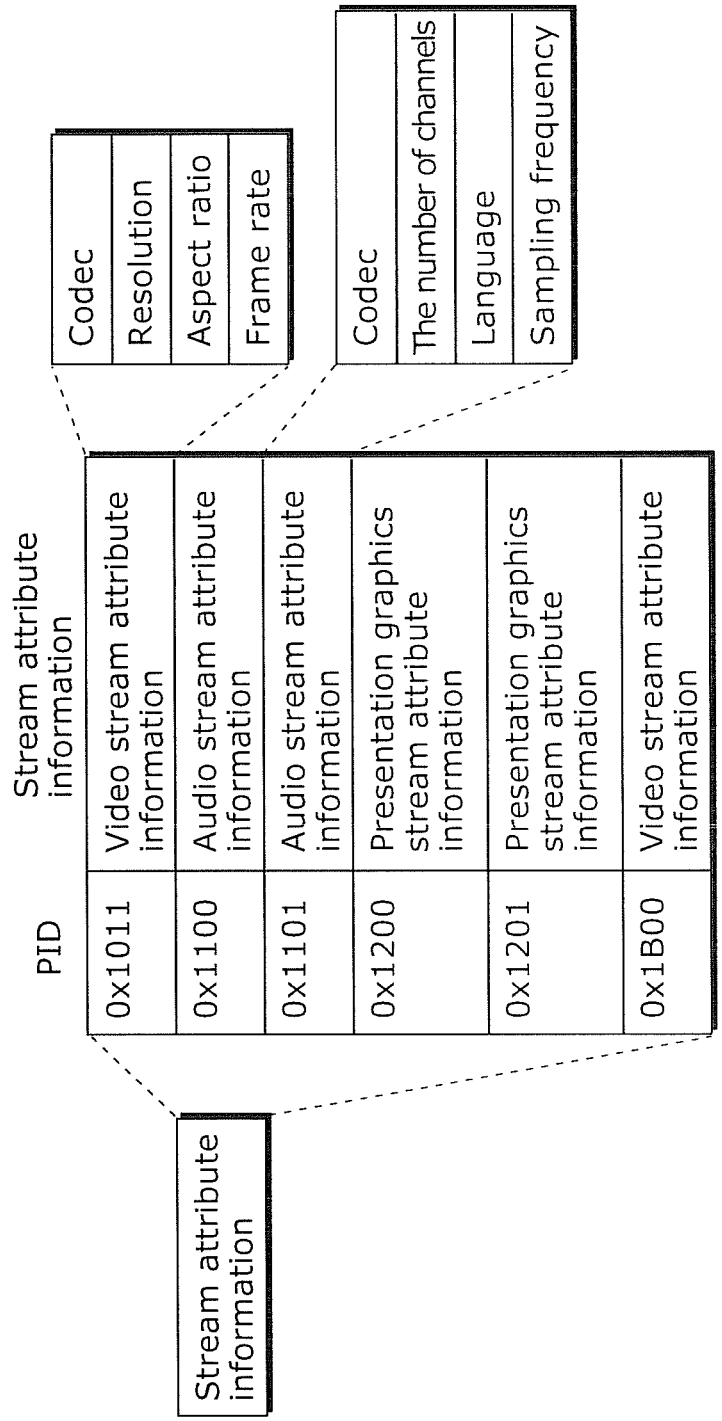
FIG. 35 shows an internal structure of stream attribute information.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of the above embodiments includes a step or a unit for allocating unique information indicating video data generated by the moving picture encoding method or the moving picture encoding apparatus in each of the above embodiments, to the stream type included in the PMT or the video stream attribute information. With the configuration, the video data generated by the moving picture encoding method or the moving picture encoding apparatus described in each of the above embodiments can be distinguished from video data that conforms to another standard.

Figure 36:
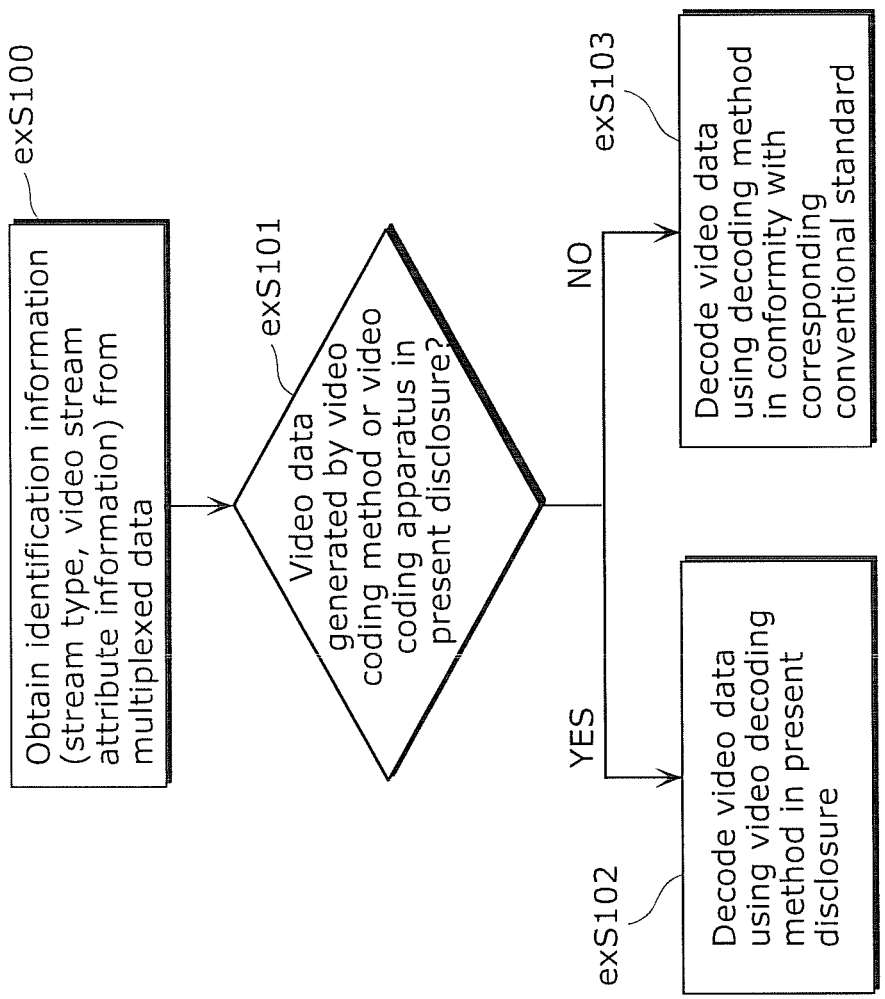
FIG. 36 shows steps for identifying video data.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of the above embodiments. When it is determined that the stream type or the video stream attribute information indicates that the multiplexed data is generated by the moving picture encoding method or the moving picture encoding apparatus in each of the above embodiments, in Step exS102, decoding is performed by the moving picture decoding method in each of the above embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination on whether or not the moving picture decoding method or the moving picture decoding apparatus that is described in each of the above embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 7

Figure 37:
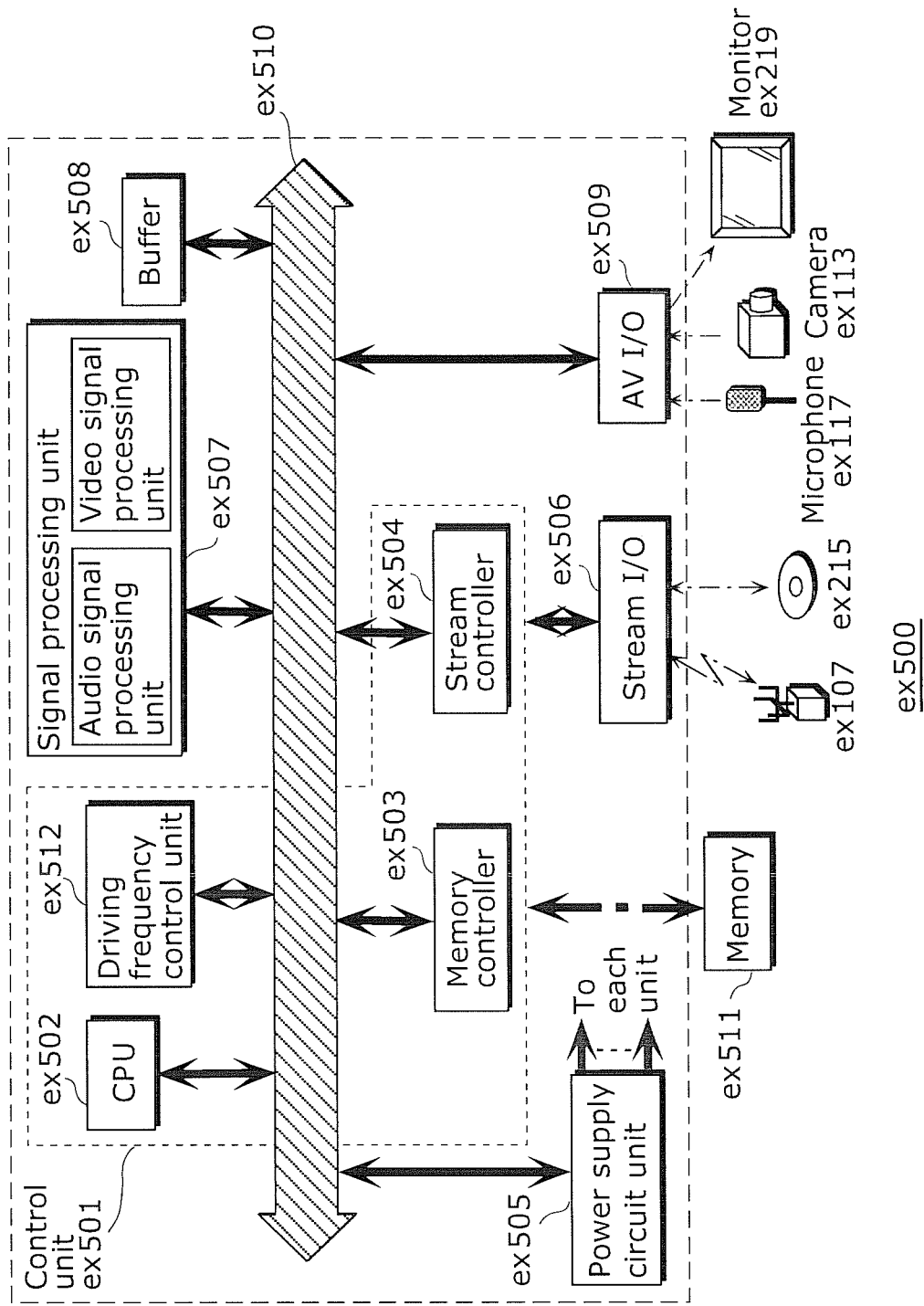
FIG. 37 is a block diagram illustrating an example of a configuration of an integrated circuit for implementing a moving picture encoding method and a moving picture decoding method according to each of embodiments.

Each of the moving picture encoding method, the moving picture encoding apparatus, the moving picture decoding method, and the moving picture decoding apparatus in each of the above embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of the above embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture encoding method or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture encoding method or by the moving picture encoding apparatus described in each of the above embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, there is a problem that the power consumption increases when the driving frequency is set higher.

Figure 38:
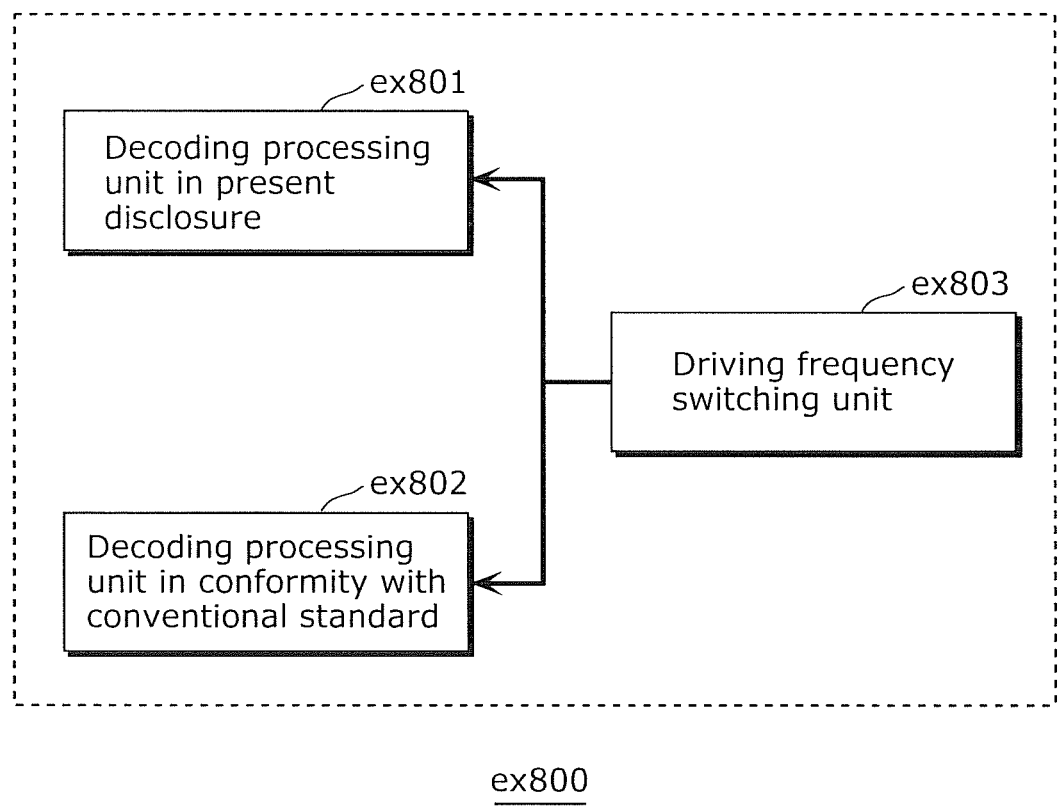
FIG. 38 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture encoding method or the moving picture encoding apparatus described in each of the above embodiments. Then, the driving frequency switching unit ex803 instructs a decoding processing unit ex801 that executes the moving picture decoding method described in each of the above embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of the above embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 37. Here, each of the decoding processing unit ex801 that executes the moving picture decoding method described in each of the above embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

Figure 39:
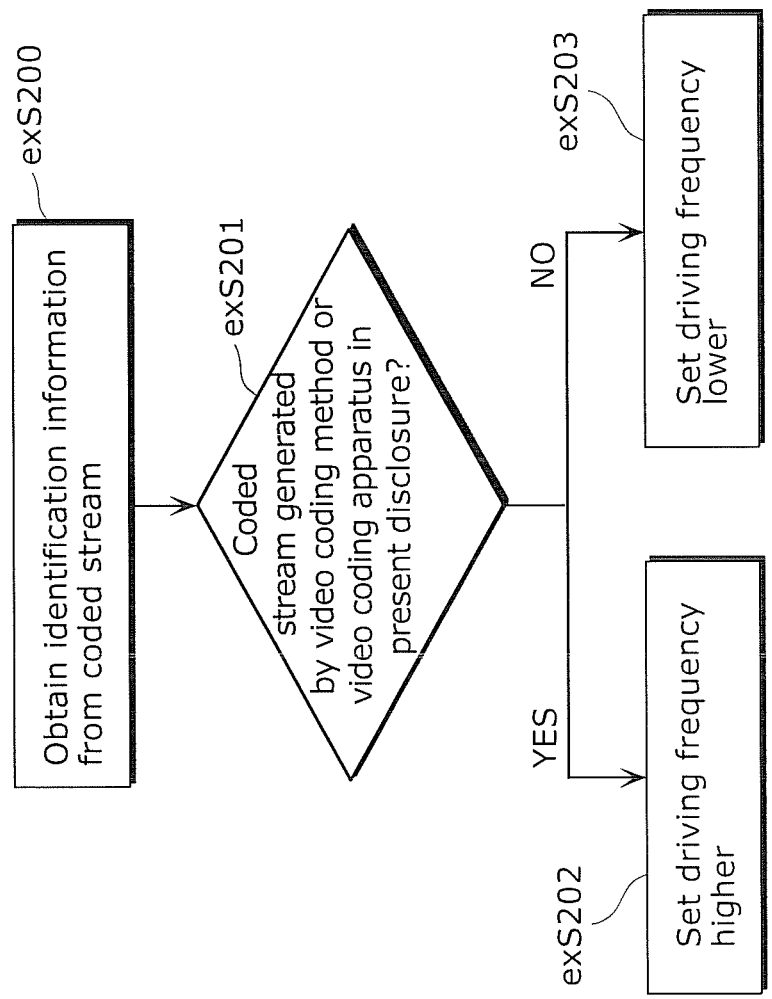
FIG. 39 shows steps for identifying video data and switching between driving frequencies.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of the above embodiments, based on the identification information. When the video data is generated by the encoding method and the encoding apparatus described in each of the above embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the encoding method and the encoding apparatus described in each of the above embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of the above embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of the above embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of the above embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of the above embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

In view of this, what is conceived is a configuration in which the decoding processing unit for implementing the moving picture decoding method described in each of the above embodiments and the decoding processing unit that conforms to the conventional standard, such as MPEG-2, MPEG-4 AVC, and VC-1 are partly shared. Ex900 in FIG. 41A shows an example of the configuration. For example, the moving picture decoding method described in each of the above embodiments and the moving picture decoding method that conforms to MPEG-4 AVC have, partly in common, the details of processing, such as entropy encoding, inverse quantization, deblocking filtering, and motion compensation. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of the above embodiments may be shared for the processing to be shared, and a dedicated decoding processing unit may be used for processing unique to that of MPEG-4 AVC.

Furthermore, ex1000 in FIG. 41B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to an aspect of the present disclosure and the conventional moving picture decoding method. Here, the dedicated decoding processing units ex1001 and ex1002 are not necessarily specialized for the processing according to an aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to an aspect of the present disclosure and the moving picture decoding method in conformity with the conventional standard.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The moving picture encoding method and the moving picture decoding method according to the present disclosure are applicable to various multimedia data and allow an increase in error tolerance for moving picture encoding and moving picture decoding; for example, these methods are usable as a moving picture encoding method and a moving picture decoding method for storage, transmission, communication, etc., that use a cellular phone, a DVD device, a personal computer, or the like.

The invention claimed is:
1. A decoder, comprising:
  processing circuitry; and
  storage connected to the processing circuitry,
  wherein the processing circuitry, in operation of executing programming stored in the storage,
    obtains a transform skip flag,
    performs variable-length decoding on quantized coefficients of a current block according to a value of the transform skip flag by (i) when the value of the transform skip flag is a first value, (a) determining a first order of applying the variable-length decoding to the quantized coefficients and (b) performing the variable-length decoding according to the first order on the quantized coefficients, and (ii) when the value of the transform skip flag is a second value different from the first value, (a) determining a second order of applying the variable-length decoding to the quantized coefficients, the second order being different from the first order, and (b) performing the variable-length decoding according to the second order on the quantized coefficients,
    after performing the variable-length decoding on the quantized coefficients, performs inverse quantization on the quantized coefficients according to the value of the transform skip flag to generate transform coefficients by (i) when the value of the transform skip flag is the first value, performing the inverse quantization on the quantized coefficients using a quantization matrix to generate the transform coefficients and (ii) when the value of the transform skip flag is the second value, performing the inverse quantization on the quantized coefficients without using the quantization matrix to generate the transform coefficients,
    obtains a decoded prediction residual of the current block by (i) when the value of the transform skip flag is the first value, performing inverse transform on the transform coefficients to generate the decoded prediction residual of the current block and (ii) when the value of the transform skip flag is the second value, setting the transform coefficients as the decoded prediction residual of the current block, and
    generates a reconstructed image using a prediction image and the decoded prediction residual of the current block,
  wherein in the determining the first order of applying the variable-length decoding to the quantized coefficients, the processor:
    determines whether or not a prediction direction in an intra prediction mode is included in a vertical prediction group;
    when the prediction direction in the intra prediction mode is included in the vertical prediction group, a horizontal order is determined as the first order of applying the variable-length decoding to the quantized coefficients; and
    when the prediction direction in the intra prediction mode is not included in the vertical prediction group, (i) determines whether or not the prediction direction in the intra prediction mode is included in a horizontal prediction group, (ii) when the prediction direction in the intra prediction mode is included in the horizontal prediction group, a vertical order is determined as the first order of applying the variable-length decoding to the quantized coefficients, and (iii) when the prediction direction in the intra prediction mode is not included in the horizontal prediction group, an order different from the vertical order and the horizontal order is determined as the first order of applying the variable-length decoding to the quantized coefficients.

* * * * *